United States Patent
Kim et al.

(10) Patent No.: US 12,317,263 B2
(45) Date of Patent: May 27, 2025

(54) METHOD FOR PERFORMING UPLINK TRANSMISSION USING PRECONFIGURED RESOURCE IN WIRELESS COMMUNICATION SYSTEM, AND APPARATUS THEREFOR

(71) Applicant: LG Electronics Inc., Seoul (KR)

(72) Inventors: Jaehyung Kim, Seoul (KR); Joonkui Ahn, Seoul (KR); Changhwan Park, Seoul (KR); Seokmin Shin, Seoul (KR); Seunggye Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 776 days.

(21) Appl. No.: 17/431,014

(22) PCT Filed: Feb. 17, 2020

(86) PCT No.: PCT/KR2020/002254
§ 371 (c)(1),
(2) Date: Apr. 14, 2022

(87) PCT Pub. No.: WO2020/167098
PCT Pub. Date: Aug. 20, 2020

(65) Prior Publication Data
US 2022/0312406 A1    Sep. 29, 2022

(30) Foreign Application Priority Data

Feb. 15, 2019 (KR) .......................... 10-2019-0018245
Mar. 28, 2019 (KR) .......................... 10-2019-0036401
(Continued)

(51) Int. Cl.
H04W 72/00 (2023.01)
H04L 5/00 (2006.01)
(Continued)

(52) U.S. Cl.
CPC ........... *H04W 72/21* (2023.01); *H04L 5/0053* (2013.01); *H04W 72/0446* (2013.01); *H04W 72/0453* (2013.01); *H04W 76/20* (2018.02)

(58) Field of Classification Search
None
See application file for complete search history.

(56) References Cited

U.S. PATENT DOCUMENTS

2005/0176455 A1* 8/2005 Krishnan ............... H04W 52/08
455/522
2017/0230961 A1* 8/2017 Park ........................ H04W 72/23
(Continued)

FOREIGN PATENT DOCUMENTS

CN           102148672 A   *  8/2011  ............ H04W 72/04
WO       WO2016045094           3/2016

OTHER PUBLICATIONS

Extended European Search Report in European Appln. No. 20755846.1, dated Jun. 2, 2022, 5 pages.
(Continued)

*Primary Examiner* — Abdelillah Elmejjarmi
(74) *Attorney, Agent, or Firm* — Fish & Richardson P.C.

(57) ABSTRACT

The present specification relates to a method for performing preconfigured uplink resource (PUR) transmission using a PUR in a wireless communication system, wherein the method performed by a terminal comprises the steps of: receiving, from a base station, PUR configuration information for the PUR transmission in an RRC connected state; and performing the PUR transmission to the base station in an RRC idle state on the basis of the PUR configuration information, the PUR configuration information comprising channel information for transmitting an ACK or NACK regarding downlink feedback.

15 Claims, 32 Drawing Sheets

(30) Foreign Application Priority Data

May 3, 2019 (KR) ........................ 10-2019-0052613
Oct. 4, 2019 (KR) ........................ 10-2019-0123432

(51) Int. Cl.
*H04W 72/0446* (2023.01)
*H04W 72/0453* (2023.01)
*H04W 72/21* (2023.01)
*H04W 76/20* (2018.01)

(56) References Cited

U.S. PATENT DOCUMENTS

2020/0170069 A1\* 5/2020 Shih ...................... H04W 76/19
2020/0396039 A1\* 12/2020 Baldemair ............ H04L 1/1812
2022/0104176 A1\* 3/2022 Takeda .................. H04W 76/28

OTHER PUBLICATIONS

Sierra Wireless, "NB-IOT Pre-configured UL Resources Design Considerations," R1-1810490, Presented at 3GPP TSG RAN WG1 Meeting #94bis, Chengdu, China, Oct. 8-12, 2018, 9 pages.
LG Electronics, "Discussion on preconfigured UL resources in MTC," R1-1812528, Presented at 3GPP TSG RAN WG1 Meeting #95, Spokane, USA, Nov. 12-16, 2018, 9 pages.
Sierra Wireless, "LTE-M Pre-configured UL Resources Design Considerations," R1-1812724, Presented at 3GPP TSG RAN WG1 Meeting #95, Spokane, USA, Nov. 12-16, 2018, 11 pages.
Sierra Wireless, "LTE-M Preconfigured UL Resources Summary RAN1 #95," R1-183725, Presented at 3GPPTSG RAN WG1 Meeting #95, Spokane, USA, Nov. 12-16, 2018, 9 pages.
Sony, "Considerations on Pre-configured Uplink Resource," R1-1812754, Presented at 3GPP TSG RAN WG1 Meeting #95, Spokane, USA, Nov. 12-16, 2018, 6 pages.

\* cited by examiner

FIG. 16
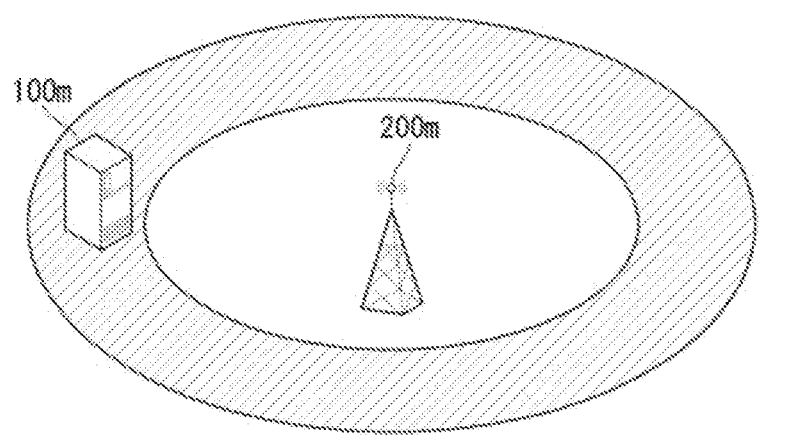
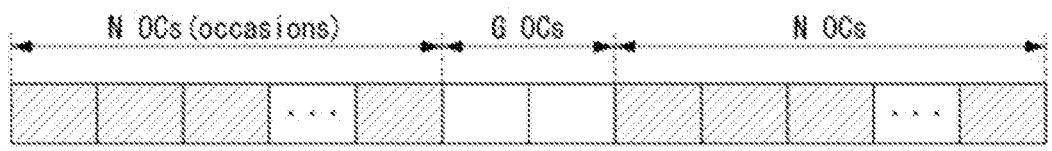

FIG.22
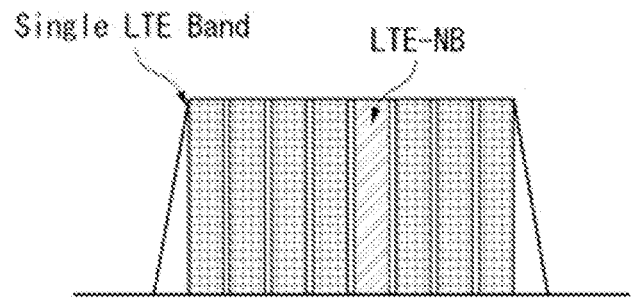
(a) In-band system
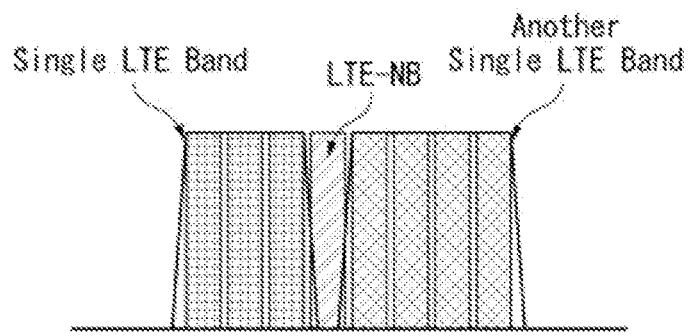
(b) Guard-band system
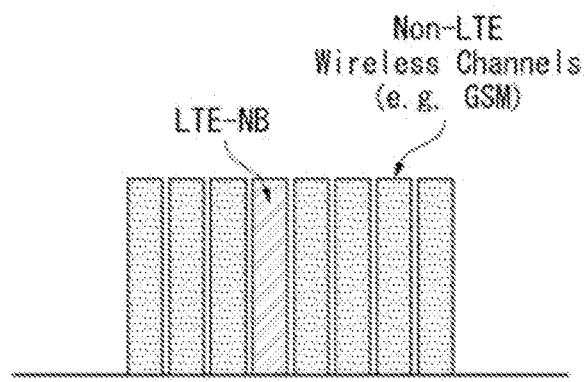
(c) Stand-alone system

METHOD FOR PERFORMING UPLINK TRANSMISSION USING PRECONFIGURED RESOURCE IN WIRELESS COMMUNICATION SYSTEM, AND APPARATUS THEREFOR

CROSS-REFERENCE TO RELATED APPLICATIONS

This application is a National Stage application under 35 U.S.C. § 371 of International Application No. PCT/KR2020/002254, filed on Feb. 17, 2020, which claims the benefit of earlier filing date and right of priority to Korean Application 10-2019-0018245, filed on Feb. 15, 2019, Korean Application 10-2019-0036401, filed on Mar. 28, 2019, Korean Application 10-2019-0052613, filed on May 3, 2019, and Korean Application 10-2019-0123432, filed on Oct. 4, 2019. The disclosures of the prior applications are incorporated by reference in their entirety.

TECHNICAL FIELD

The present disclosure relates to a wireless communication system, and to a method and apparatus for performing uplink transmission using a preconfigured resource.

BACKGROUND

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

SUMMARY

An object of the present disclosure is to provide a method for performing uplink transmission using a preconfigured uplink resource (PUR).

In addition, an object of the present disclosure is to provide information related to an uplink channel transmitted to a base station after performing uplink transmission using PUR.

In addition, an object of the present disclosure is to provide a method of determining transmission power for performing uplink transmission using PUR.

The technical objects to be achieved by the present disclosure are not limited to the above-described technical objects, and other technical objects which are not described herein will be clearly understood by those skilled in the pertinent art from the following description.

The present disclosure is to provide a method of performing PUR transmission using a preconfigured uplink resource.

Specifically, the method performed by a user equipment (UE) may comprise receiving, from a base station, PUR configuration information for the PUR transmission in a RRC connected state; and performing the PUR transmission to the base station based on the PUR configuration information in a RRC idle state and the PUR configuration information may include channel information for transmitting ACK or NACK for downlink feedback.

And, the present disclosure may further comprise transmitting, to the base station, the ACK or the NACK based on the channel information.

And, in the present disclosure, the channel information may be information on a channel through which the ACK or the NACK is transmitted, and the channel information may include information on a number of repeated transmission of the channel.

And, in the present disclosure, the channel information may further include information on a format of the channel and information on a resource index value of the channel.

And, in the present disclosure, the channel may be Physical Uplink Shared Channel (PUSCH) or Physical Uplink Control Channel (PUCCH).

And, in the present disclosure, a transmission power for transmitting the ACK or the NACK to the base station is determined by resetting regardless of a transmit power control (TPC) accumulation value.

And, in the present disclosure, the PUR configuration information may include at least one of information on a resource for the PUR transmission, information on a transmission period of the PUR configuration information, information related to a transport block size (TBS), information related to a modulation coding scheme (MCS).

And, in the present disclosure, a user equipment (UE) for performing preconfigured uplink resource (PUR) transmission using a PUR in a wireless communication system may include at least one transceiver; at least one processor; and at least one memory for storing instructions for operations executed by the at least one processor and coupled to the at least one processor. And the operations may comprise: receiving, from a base station, PUR configuration information for the PUR transmission in a RRC connected state; and performing the PUR transmission to the base station based on the PUR configuration information in a RRC idle state; and wherein the PUR configuration information includes channel information for transmitting ACK or NACK for downlink feedback.

And, in the present disclosure, the operations may further comprise transmitting, to the base station, the ACK or NACK based on the channel information.

In the present disclosure, the channel information may be information on a channel through which the ACK or the NACK is transmitted, and the channel information may include information on a repetition transmission number of the channel.

And, in the present disclosure, a transmission power for transmitting the ACK or the NACK to the base station may be determined by resetting regardless of a transmit power control (TPC) accumulation value.

And, in the present disclosure, a method of receiving preconfigured uplink resource (PUR) transmission using a PUR by a base station in a wireless communication system may include transmitting PUR configuration information for the PUR transmission to a user equipment (UE) in a RRC connected state; and receiving, from the base station, the PUR transmission based on the PUR configuration information in a RRC idle state and the PUR configuration information may include channel information for transmitting ACK or NACK for downlink feedback.

And, in the present disclosure, a base station of receiving preconfigured uplink resource (PUR) transmission using a PUR in a wireless communication system may include at least one transceiver; at least one processor; and at least one memory for storing instructions for operations executed by the at least one processor and coupled to the at least one processor, and the operations may comprise: transmitting, to a user equipment (UE), PUR configuration information for the PUR transmission in a RRC connected state; and receiving, from the base station, the PUR transmission based on the PUR configuration information in a RRC idle state; and the PUR configuration information may include channel information for transmitting ACK or NACK for downlink feedback.

And, in the present disclosure, an apparatus may comprise at least one memory and at least one processor operatively coupled to the at least one memory, and the at least one processor may be configured to: receive, from a base station, preconfigured uplink resource (PUR) configuration information for performing PUR transmission using a PUR in a RRC connected state; and perform the PUR transmission to the base station based on the PUR configuration information in a RRC idle state; and the PUR configuration information may include channel information for transmitting ACK or NACK for downlink feedback.

And, in the present disclosure, in at least one non-transitory computer-readable medium storing at least one instruction, the at least one instruction executable by at least one processor may comprise receiving, from a base station, preconfigured uplink resource (PUR) configuration information for performing PUR transmission using a PUR in a RRC connected state; and performing the PUR transmission to the base station based on the PUR configuration information in a RRC idle state; and the PUR configuration information may include channel information for transmitting ACK or NACK for downlink feedback.

In the present disclosure, there is an effect that power consumption may be reduced by performing uplink transmission in a user equipment (UE) in the RRC_IDLE state without transitioning to the RRC_CONNECTED state due to performing uplink transmission using a preconfigured uplink resource (PUR).

In addition, in the present disclosure, there is an effect that efficient PUR transmission is possible by providing a method for determining transmission power to perform uplink transmission using PUR.

The technical effects of the present disclosure are not limited to the above-described effects, and other effects not mentioned herein may be understood to those skilled in the art from the following description.

BRIEF DESCRIPTION OF THE DRAWINGS

The accompanying drawings, which are included herein as a part of the description for help understanding the present disclosure, provide embodiments of the present disclosure, and describe the technical features of the present disclosure with the description below.

FIG. 16 is a diagram illustrating cell coverage enhancement in MTC to which the present disclosure may be applied.

FIG. 22 is a diagram illustrating three operation modes in NB-IoT.

DETAILED DESCRIPTION

Figure 1:
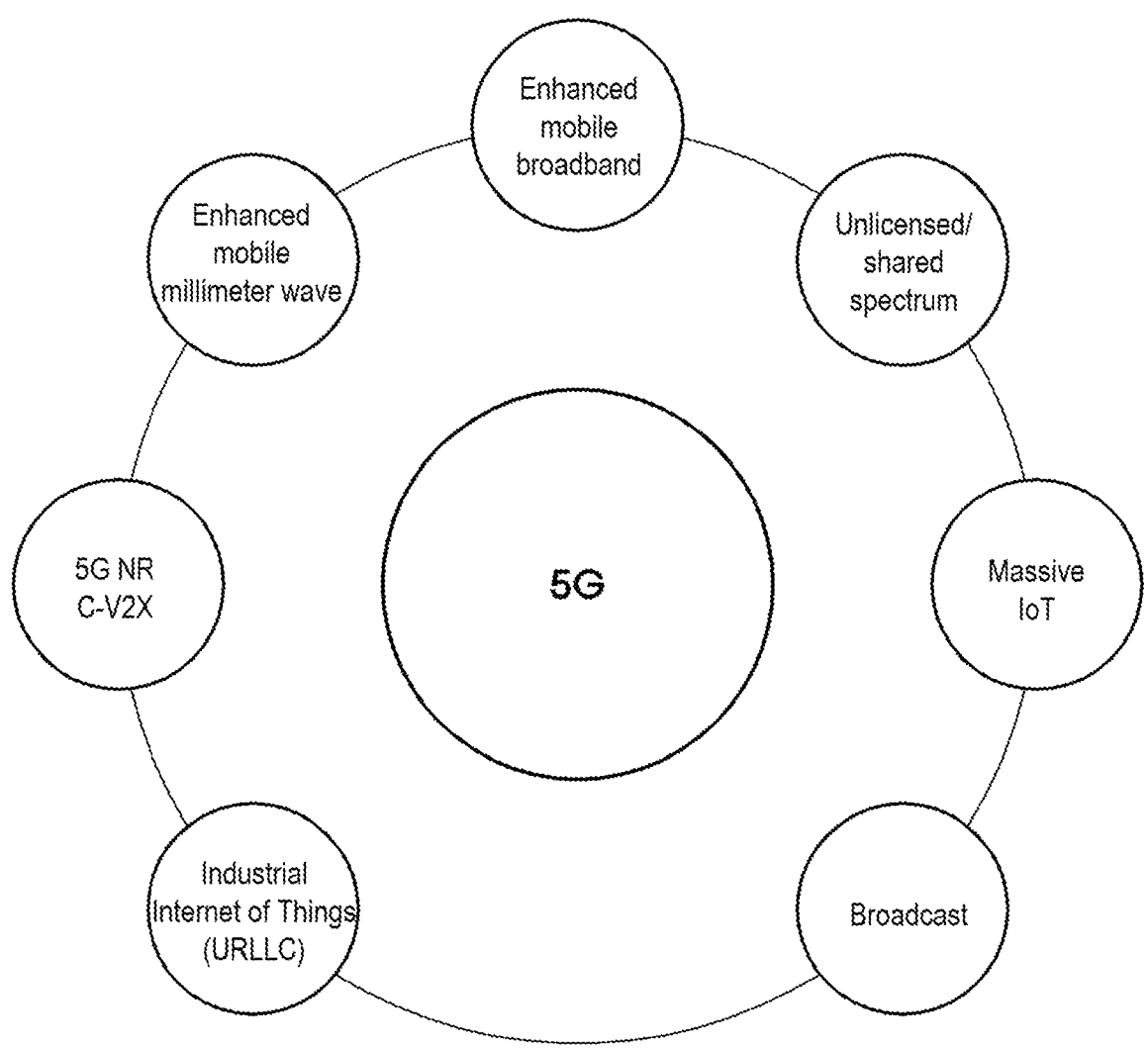
FIG. 1 is a diagram illustrating an example of a 5G scenario to which the present disclosure may be applied.

Some embodiments of the present disclosure are described in detail with reference to the accompanying drawings. A detailed description to be disclosed along with the accompanying drawings are intended to describe some exemplary embodiments of the present disclosure and are not intended to describe a sole embodiment of the present disclosure. The following detailed description includes more details in order to provide full understanding of the present disclosure. However, those skilled in the art will understand that the present disclosure may be implemented without such more details.

In some cases, in order to avoid that the concept of the present disclosure becomes vague, known structures and devices are omitted or may be shown in a block diagram form based on the core functions of each structure and device.

In this specification, a base station has the meaning of a UE node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), an access point (AP), a remote radio head (RRH), a transmission point (TP), a reception point (RP), a relay station (relay). Furthermore, the apparatus may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present disclosure, and the use of such specific terms may be changed in various forms without departing from the technical sprit of the present disclosure.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A/NR (New Radio) is chiefly described, but the technical characteristics of the present disclosure are not limited thereto.

In addition, 'A and/or B' described in the present disclosure may be interpreted as having the same meaning as 'including at least one of A or B'.

Hereinafter, an embodiment of 5G usage scenarios to which the methods proposed in the present disclosure may be applied will be described.

The three main requirements areas of 5G include (1) Enhanced Mobile Broadband (eMBB) area, (2) Massive Machine Type Communication (mMTC) area, and (3) Ultra-reliable and Low Latency Communications (URLLC) area.

FIG. 1 is a diagram illustrating an embodiment of 5G usage scenario to which the present disclosure may be applied.

In some use cases, multiple areas may be required for optimization, and other use cases may be focused on only one key performance indicator (KPI). 5G supports these various use cases in a flexible and reliable way.

eMBB goes far beyond basic mobile Internet access, covering rich interactive work, media and entertainment applications in the cloud or augmented reality. Data is one of the key drivers of 5G, and it may not be possible to see dedicated voice services for the first time in the 5G era. In 5G, voice is expected to be processed as an application program simply using the data connection provided by the communication system. The main reasons for the increased traffic volume are the increase in content size and the increase in the number of applications requiring high data rates. Streaming services (audio and video), interactive video and mobile Internet connections will become more widely used as more devices connect to the Internet. Many of these applications require always-on connectivity to push real-time information and notifications to the user. Cloud storage and applications are rapidly increasing in mobile communication platforms, which can be applied to both work and entertainment. And, cloud storage is a special use case that drives the growth of the uplink data rate. 5G is also used for remote work in the cloud and requires much lower end-to-end latency to maintain a good user experience when tactile interfaces are used. Entertainment, for example, cloud gaming and video streaming is another key factor that is increasing the demand for mobile broadband capabilities. Entertainment is essential on smartphones and tablets anywhere, including high mobility environments such as trains, cars and airplanes. Another use case is augmented reality and information retrieval for entertainment. Here, augmented reality requires very low latency and an instantaneous amount of data.

In addition, one of the most anticipated 5G use cases concerns the ability to seamlessly connect embedded sensors in all fields, i.e., mMTC. By 2020, potential IoT devices are expected to reach 20.4 billion. Industrial IoT is one of the areas where 5G plays a major role in enabling smart cities, asset tracking, smart utilities, agriculture, and security infrastructure.

URLLC includes new services that will transform the industry with ultra-reliable/low-latency links such as self-driving vehicles and remote control of critical infrastructure. The level of reliability and delay is essential for smart grid control, industrial automation, robotics, drone control and coordination.

Next, look at a number of examples in more detail.

5G can complement fiber-to-the-home (FTTH) and cable-based broadband (or DOCSIS) as a means of providing streams rated at hundreds of megabits per second to gigabits per second. These high speeds are required to deliver TVs in 4K or higher (6K, 8K and higher) resolutions as well as virtual and augmented reality. Virtual Reality (VR) and Augmented Reality (AR) applications involve almost immersive sports events. Certain application programs may require special network settings. For example, for VR games, game companies may need to integrate the core server with the network operator's edge network server to minimize latency.

Automotive is expected to be an important new driving force in 5G, with many use cases for mobile communication to vehicles. For example, entertainment for passengers demands simultaneous high capacity and high mobility mobile broadband. The reason is that future users will continue to expect high-quality connections, regardless of their location and speed. Another application example in the automotive field is an augmented reality dashboard. It identifies an object in the dark on top of what the driver sees through the front window and displays information that tells the driver about the distance and movement of the object. In the future, wireless modules enable communication between vehicles, exchange of information between the vehicle and supporting infrastructure, and exchange of information between the vehicle and other connected devices (e.g., devices carried by pedestrians). The safety system can lower the risk of an accident by guiding the driver through alternative courses of action to make driving safer. The next step will be a remote controlled or self-driven vehicle. It is very reliable and requires very fast communication between different self-driving vehicles and between the vehicle and the infrastructure. In the future, self-driving vehicles will perform all driving activities, and drivers will be forced to focus only on traffic anomalies that the vehicle itself cannot identify. The technical requirements of self-driving vehicles call for ultra-low latency and ultra-fast reliability to increase traffic safety to levels unachievable by humans.

Smart cities and smart homes, referred to as smart society, will be embedded with high-density wireless sensor networks. A distributed network of intelligent sensors will identify the conditions for cost and energy-efficient maintenance of a city or home. A similar setup can be done for each household. Temperature sensors, window and heating controllers, burglar alarms and appliances are all wirelessly connected. Many of these sensors are typically low data rates, low power and low cost. However, for example, real-time HD video may be required in certain types of devices for surveillance.

The consumption and distribution of energy including heat or gas is highly decentralized, requiring automated control of distributed sensor networks. The smart grid interconnects these sensors using digital information and communication technologies to gather information and act accordingly. This information can include the behavior of suppliers and consumers, allowing smart grids to improve efficiency, reliability, economics, sustainability of production and the distribution of fuels such as electricity in an automated manner. The smart grid can also be viewed as another low-latency sensor network.

The health sector has many applications that can benefit from mobile communications. The communication system can support telemedicine providing clinical care from remote locations. This can help reduce barriers to distance and improve access to medical services that are not consistently available in remote rural areas. It is also used to save lives in critical care and emergencies. A wireless sensor network based on mobile communication may provide sensors and remote monitoring of parameters such as heart rate and blood pressure.

Wireless and mobile communications are becoming increasingly important in industrial applications. Wiring is expensive to install and maintain. Thus, the possibility of replacing cables with reconfigurable wireless links is an attractive opportunity for many industries. However, achieving this requires that the wireless connection operates with a delay, reliability and capacity similar to that of the cable, and its management is simplified. Low latency and very low error probability are new requirements that need to be connected to 5G.

Logistics and freight tracking are important examples of use for mobile communications that enable tracking of inventory and packages from anywhere using location-based information systems. Logistics and freight tracking use cases typically require low data rates, but require a wide range and reliable location information.

Artificial Intelligence (AI)

Artificial intelligence refers to the field of researching artificial intelligence or the methodology to create it, and machine learning refers to the field of researching methodologies to define and solve various problems dealt with in the field of artificial intelligence. do. Machine learning is also defined as an algorithm that improves the performance of a task through continuous experience.

An Artificial neural network (ANN) is a model used in machine learning, and may refer to an overall model with problem-solving ability, which is composed of artificial neurons (nodes) that form a network by combining synapses. The artificial neural network may be defined by a connection pattern between neurons of different layers, a learning process for updating model parameters, and an activation function for generating an output value.

The artificial neural network may include input layer, output layer, and optionally one or more hidden layers. Each layer includes one or more neurons, and the artificial neural network may include neurons and synapses connecting neurons. In an artificial neural network, each neuron can output a function value of an activation function for input signals, weights, and biases input through synapses.

Model parameters refer to parameters that are determined through learning, and include weights of synaptic connections and biases of neurons. In addition, the hyperparameter refers to a parameter that must be set before learning in a machine learning algorithm, and includes a learning rate, iteration count, mini-batch size, and initialization function.

The purpose of learning artificial neural networks can be as determining model parameters that minimize the loss function. The loss function can be used as an index for determining an optimal model parameter in the learning process of the artificial neural network.

Machine learning can be classified into supervised learning, unsupervised learning, and reinforcement learning according to the learning method.

Supervised learning refers to a method of training an artificial neural network when a label for training data is given, and a label may mean the correct answer (or result value) that the artificial neural network must infer when training data is input to the artificial neural network. Unsupervised learning may mean a method of training an artificial neural network in a state where a label for training data is not given. Reinforcement learning may mean a learning method in which an agent defined in a certain environment learns to select an action or action sequence that maximizes the cumulative reward in each state.

Among artificial neural networks, machine learning implemented as a deep neural network (DNN) including a plurality of Hidden Layers is sometimes referred to as deep learning, and deep learning is a part of machine learning. Hereinafter, machine learning is used in the sense including deep learning.
Robot A robot may refer to a machine that automatically processes or operates a task given by its own capabilities. In particular, a robot having a function of recognizing the environment and performing an operation by self-determining may be referred to as an intelligent robot.

Robots can be classified into industrial, medical, household, military, etc. depending on the purpose or field of use.

The robot may be provided with a driving unit including an actuator or a motor to perform various physical operations such as moving a robot joint. In addition, the movable robot includes a wheel, a brake, a propeller, and the like in a driving unit, and can travel on the ground or fly in the air through the driving unit.
Self-Driving, Autonomous-Driving Autonomous driving refers to self-driving technology, and autonomous driving vehicle refers to a vehicle that is driven without a user's manipulation or with a user's minimal manipulation.

For example, in autonomous driving, a technology that maintains a driving lane, a technology that automatically adjusts the speed such as adaptive cruise control, a technology that automatically drives along a specified route, and a technology that automatically sets a route when a destination is set, etc. All of these can be included.

The vehicle includes all vehicles including only an internal combustion engine, a hybrid vehicle including an internal combustion engine and an electric motor, and an electric vehicle including only an electric motor, and may include not only automobiles, but also trains and motorcycles.

In this case, the autonomous vehicle can be viewed as a robot having an autonomous driving function.
Extended Reality (XR)

The extended reality collectively refers to virtual reality (VR), augmented reality (AR), and mixed reality (MR). VR technology provides only CG images of real world objects or backgrounds, AR technology provides virtually created CG images on top of real object images, and MR technology is a computer graphic technology that mixes and combines virtual objects in the real world.

MR technology is similar to AR technology in that it shows real and virtual objects together. However, in AR technology, virtual objects are used in a form that complements real objects, whereas in MR technology, virtual objects and real objects are used with equal characteristics.

XR technology can be applied to HMD (Head-Mount Display), HUD (Head-Up Display), mobile phones, tablet PCs, laptops, desktops, TVs, digital signage, etc., and devices applied with XR technology may be called as XR devices.

Figure 2:
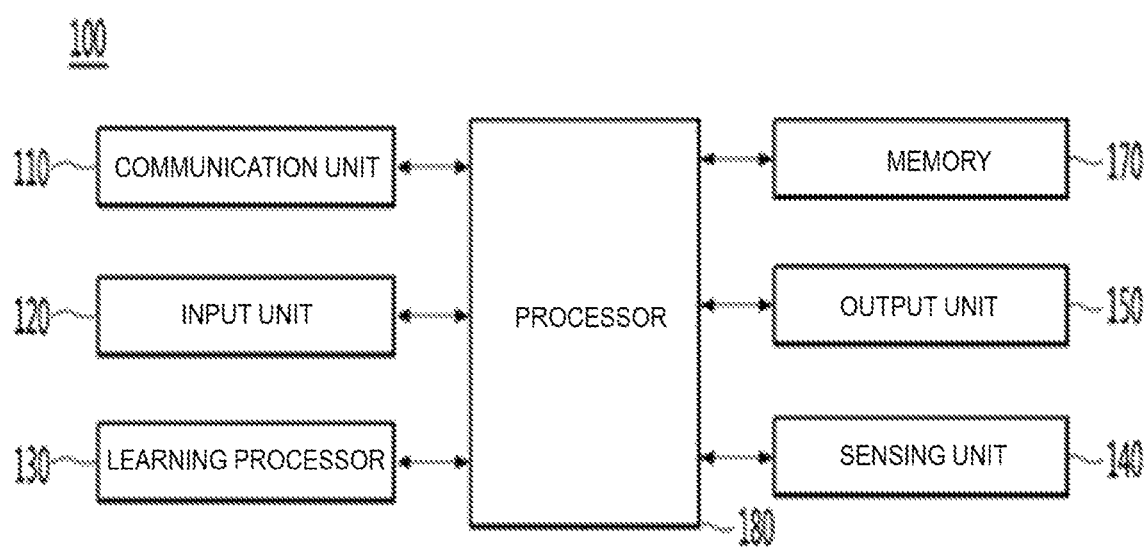
FIG. 2 is a diagram illustrating an AI apparatus to which the method proposed in the present disclosure may be applied.

FIG. 2 illustrates an AI device 100 according to an embodiment of the present disclosure.

The AI device 100 may be implemented as a fixed device or a movable device such as a TV, a projector, a mobile phone, a smartphone, a desktop computer, a laptop computer, a digital broadcasting terminal, a personal digital assistants (PDA), a portable multimedia player (PMP), a navigation, a tablet PC, a wearable device, a set-top box (STB), a DMB receiver, a radio, a washing machine, a refrigerator, a desktop computer, a digital signage, a robot, a vehicle, and the like.

Referring to FIG. 2, a user equipment (UE) 100 may include a communication unit 110, an input unit 120, a learning processor 130, a sensing unit 140, an output unit 150, a memory 170, and a processor 180.

The communication unit 110 may transmit and receive data with external devices such as other AI devices 100a to 100e or the AI server 200 using wired/wireless communication technology. For example, the communication unit 110 may transmit and receive sensor information, a user input, a learning model, and a control signal with external devices.

Here, the communication technologies used by the communication unit 110 include Global System for Mobile communication (GSM), Code Division Multi Access (CDMA), Long Term Evolution (LTE), 5G, Wireless LAN (WLAN), and Wireless-Fidelity (Wi-Fi), Bluetooth™, Radio Frequency Identification (RFID), Infrared Data Association (IrDA), ZigBee, and Near Field Communication (NFC) and the like.

The input unit 120 may acquire various types of data.

Here, the input unit 120 may include a camera for inputting an image signal, a microphone for receiving an audio signal, and a user input unit for receiving information from a user. Here, by treating a camera or microphone as a sensor, a signal acquired from the camera or microphone may be referred to as sensing data or sensor information.

The input unit 120 may acquire input data to be used when acquiring an output by using training data for model training and the training model. The input unit 120 may obtain unprocessed input data, and in this case, the processor 180 or the learning processor 130 may extract an input feature as a pre-process for the input data.

The learning processor 130 may train a model composed of an artificial neural network using the training data. Here, the learned artificial neural network may be referred to as a learning model. The learning model can be used to infer a result value for new input data other than the training data, and the inferred value can be used as a basis for a decision to perform a certain operation.

Here, the learning processor 130 may perform AI processing together with the learning processor 240 of the AI server 200.

Here, the learning processor 130 may include a memory integrated or implemented in the AI device 100. Alternatively, the learning processor 130 may be implemented using the memory 170, an external memory directly coupled to the AI device 100, or a memory maintained in an external device.

The sensing unit 140 may acquire at least one of internal information of the AI device 100, information on the surrounding environment of the AI device 100, and user information by using various sensors.

Here, the sensors included in the sensing unit 140 include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and a lidar, a radar, etc.

The output unit 150 may generate output related to visual, auditory or tactile sense.

Here, the output unit 150 may include a display unit that outputs visual information, a speaker that outputs auditory information, and a haptic module that outputs tactile information.

The memory 170 may store data supporting various functions of the AI device 100. For example, the memory 170 may store input data, training data, a learning model, and a learning history acquired from the input unit 120.

The processor 180 may determine at least one executable operation of the AI device 100 based on information determined or generated using a data analysis algorithm or a machine learning algorithm. Further, the processor 180 may perform a determined operation by controlling the components of the AI device 100.

To this end, the processor 180 may request, search, receive, or utilize data from the learning processor 130 or the memory 170, and may control the components of the AI device 100 to perform a predicted or desirable operation among the at least one executable operation.

Here, if connection of an external device is required to perform the determined operation, the processor 180 may generate a control signal for controlling the corresponding external device and transmit the generated control signal to the corresponding external device.

The processor 180 may obtain intention information for a user input, and determine a user's requirement based on the obtained intention information.

Here, the processor 180 may obtain intention information corresponding to the user input by using at least one of a Speech to Text (STT) engine for converting a speech input into a character string or a Natural Language Processing (NLP) engine for obtaining intention information of a natural language.

Here, at least one or more of the STT engine and the NLP engine may be composed of an artificial neural network at least partially trained according to a machine learning algorithm. In addition, at least one of the STT engine or the NLP engine may be learned by the learning processor 130, learned by the learning processor 240 of the AI server 200, or learned by distributed processing thereof.

The processor 180 may collect history information including user feedback on the operation content or operation of the AI device 100, and store it in the memory 170 or the learning processor 130, or transfer to an external device such as the AI server 200. The collected historical information can be used to update the learning model.

The processor 180 may control at least some of the components of the AI device 100 to drive an application program stored in the memory 170. Further, the processor 180 may operate by combining two or more of the components included in the AI device 100 to drive the application program.

Figure 3:
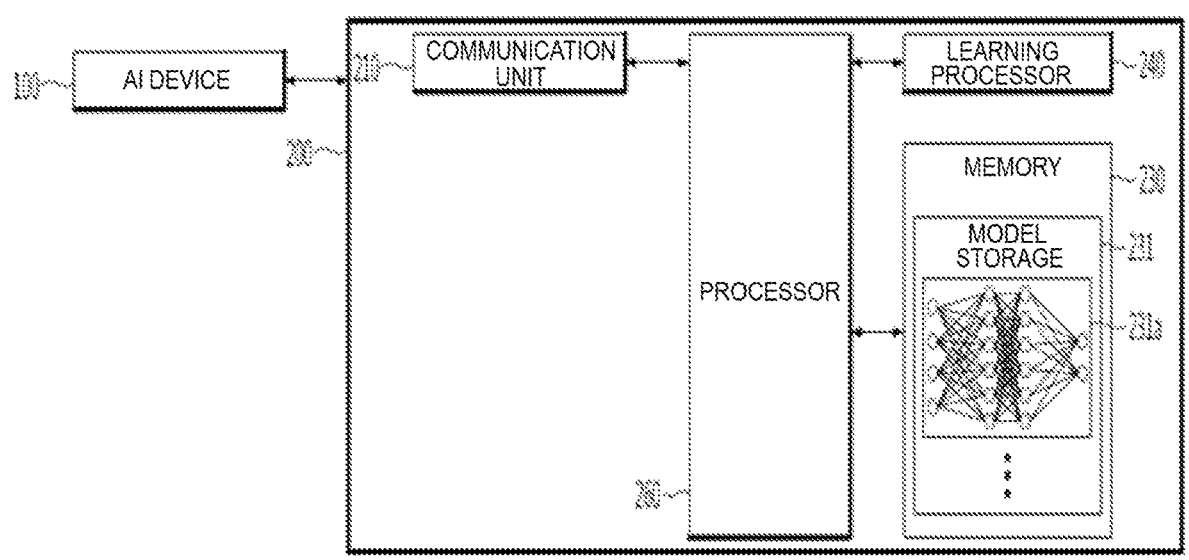
FIG. 3 is a diagram illustrating an AI server to which the method proposed in the present disclosure may be applied.

FIG. 3 illustrates an AI server 200 according to an embodiment of the present disclosure.

Referring to FIG. 3, the AI server 200 may refer to a device that trains an artificial neural network using a machine learning algorithm or uses the learned artificial neural network. Here, the AI server 200 may be composed of a plurality of servers to perform distributed processing, or may be defined as a 5G network. In this case, the AI server 200 may be included as a part of the AI device 100 to perform at least part of AI processing together.

The AI server 200 may include a communication unit 210, a memory 230, a learning processor 240, and a processor 260.

The communication unit 210 may transmit and receive data with an external device such as the AI device 100.

The memory 230 may include a model storage 231. The model storage 231 may store a model (or artificial neural network, 231*a*) being trained or trained through the learning processor 240.

The learning processor 240 may train the artificial neural network 231*a* using the training data. The learning model may be used while being mounted on the AI server 200 of an artificial neural network, or may be mounted on an external device such as the AI device 100 and used.

The learning model can be implemented in hardware, software, or a combination of hardware and software. When part or all of the learning model is implemented in software, one or more instructions constituting the learning model may be stored in the memory 230.

The processor 260 may infer a result value for new input data using the learning model and generate a response or a control command based on the inferred result value.

Figure 4:
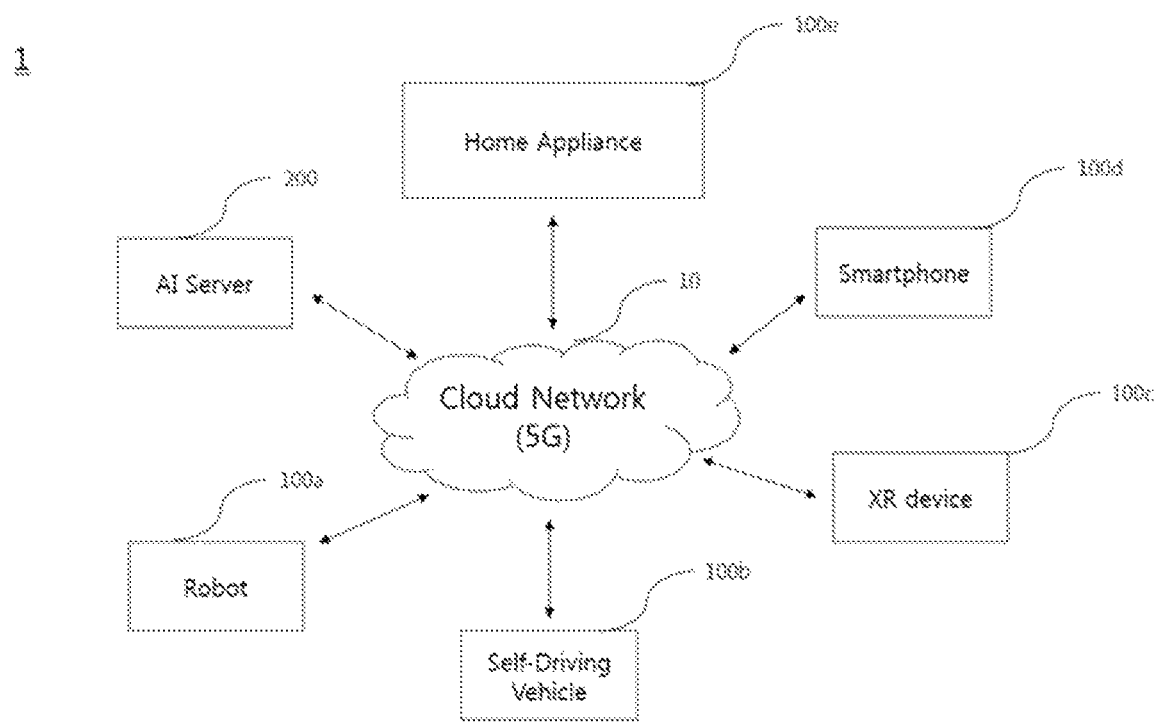
FIG. 4 is a diagram illustrating an AI system to which the method proposed in the present specification may be applied.

FIG. 4 illustrates an AI system 1 according to an embodiment of the present disclosure.

Referring to FIG. 4, the AI system 1 includes at least one of an AI server 200, a robot 100*a*, a self-driving (autonomous) vehicle 100*b*, an XR device 100*c*, a smartphone 100*d*, or a home appliance 100*e*. connected with the cloud network 10. Here, the robot 100*a* to which the AI technology is applied, the self-driving vehicle 100*b*, the XR device 100*c*, the smart phone 100*d*, or the home appliance 100*e* may be referred to as the AI devices 100*a* to 100*e*.

The cloud network 10 may constitute a part of the cloud computing infrastructure or may mean a network that exists in the cloud computing infrastructure. Here, the cloud network 10 may be configured using a 3G network, a 4G or long-term evolution (LTE) network, or a 5G network.

That is, the devices 100*a* to 100*e* and 200 constituting the AI system 1 may be connected to each other through the cloud network 10. In particular, the devices 100*a* to 100*e* and 200 may communicate with each other through a base station but may communicate with each other directly without through a base station.

The AI server 200 may include a server that performs AI processing and a server that performs an operation on big data.

The AI server 200 is connected through the cloud network 10 with at least one of the robot 100*a*, the self-driving vehicle 100*b*, the XR device 100*c*, the smartphone 100*d*, or a the home appliance 100*e*, which are AI devices constituting the AI system 1 and may help at least part of the AI processing of the connected AI devices 100*a* to 100*e*.

In this case, the AI server 200 may train an artificial neural network according to a machine learning algorithm in place of the AI devices 100*a* to 100*e*, and may directly store the learning model or transmit it to the AI devices 100*a* to 100*e*.

At this time, the AI server 200 may receive input data from the AI devices 100*a* to 100*e*, infer a result value for the received input data using a learning model, and generate a response or a control command based on the inferred result value, and transmit it to the AI devices 100*a* to 100*e*.

Alternatively, the AI devices 100*a* to 100*e* may infer a result value for input data using a direct learning model and generate a response or a control command based on the inferred result value.

Hereinafter, various embodiments of the AI devices 100*a* to 100*e* to which the above-described technology is applied will be described. Here, the AI devices 100*a* to 100*e* shown in FIG. 3 may be as a specific example of the AI device 100 shown in FIG. 1.

AI+Robot

The robot 100*a* is applied with AI technology and may be implemented as a guide robot, a transport robot, a cleaning robot, a wearable robot, an entertainment robot, a pet robot, an unmanned flying robot, and the like.

The robot 100*a* may include a robot control module for controlling an operation, and the robot control module may refer to a software module or a chip implementing the same as hardware.

The robot 100*a* may acquire status information of the robot 100*a* using sensor information obtained from various types of sensors, detect (recognizes) surrounding environments and objects, generate map data, decide a moving route and a driving plan, decide a response to user interaction, or decide an action.

Here, the robot 100*a* may use sensor information obtained from at least one sensor among a lidar, a radar, and a camera in order to determine the moving route and the driving plan.

The robot 100*a* may perform the above operations using a learning model composed of at least one artificial neural network. For example, the robot 100*a* may recognize a surrounding environment and an object using a learning model, and may determine an operation using the recognized surrounding environment information or object information. Here, the learning model may be directly learned by the robot 100*a* or learned by an external device such as the AI server 200.

Here, the robot 100*a* may perform an operation by generating a result using a direct learning model, but it may transmit sensor information to an external device such as the AI server 200 and perform the operation by receiving the result generated accordingly.

The robot 100*a* may determine the moving route and the driving plan using at least one of map data, object information detected from sensor information, or object information obtained from an external device, and may control the driving unit to drive the robot 100*a* according to the determined moving route and driving plan.

The map data may include object identification information on various objects arranged in a space in which the robot 100*a* moves. For example, the map data may include object identification information on fixed objects such as walls and doors and movable objects such as flower pots and desks. In addition, the object identification information may include a name, type, distance, and location.

In addition, the robot 100*a* may perform an operation or run by controlling a driving unit based on a user's control/interaction. In this case, the robot 100*a* may acquire interaction intention information according to a user's motion or voice speech, and determine a response based on the obtained intention information to perform the operation.

AI+Autonomous Driving

The self-driving (autonomous) vehicle 100*b* may be implemented as a mobile robot, vehicle, or unmanned aerial vehicle by applying AI technology.

The self-driving vehicle 100*b* may include an autonomous driving control module for controlling an autonomous driving function, and the autonomous driving control module may refer to a software module or a chip implementing the same as hardware. The autonomous driving control module may be included inside as a configuration of the self-driving vehicle 100*b*, but may be configured as separate hardware and connected to the exterior of the self-driving vehicle 100*b*.

The self-driving vehicle 100*b* may acquire status information of the self-driving vehicle 100*b* using sensor information obtained from various types of sensors, detect (recognizes) surrounding environments and objects, generate map data, decide a moving route and a driving plan, decide a response to user interaction, or decide an action.

Here, the self-driving vehicle 100*b* may use sensor information obtained from at least one sensor among a lidar, a radar, and a camera, similar to the robot 100*a*, in order to determine the moving route and the driving plan.

In particular, the self-driving vehicle 100*b* may recognize an environment or object in an area where the field of view is obscured or an area greater than a certain distance by receiving sensor information from external devices or directly recognized information from external devices.

The self-driving vehicle 100*b* may perform the above operations using a learning model composed of at least one artificial neural network. For example, the self-driving vehicle 100*b* may recognize a surrounding environment and an object using a learning model, and may determine a driving path using the recognized surrounding environment information or object information. Here, the learning model may be directly learned by the self-driving vehicle 100*b* or learned by an external device such as the AI server 200.

Here, the self-driving vehicle 100*b* may perform an operation by generating a result using a direct learning model, but it may transmit sensor information to an external device such as the AI server 200 and perform the operation by receiving the result generated accordingly.

The self-driving vehicle 100*b* may determine the moving route and the driving plan using at least one of map data, object information detected from sensor information, or object information obtained from an external device, and may control the driving unit to drive the self-driving vehicle 100*b* according to the determined moving route and driving plan.

The map data may include object identification information on various objects arranged in a space (e.g., road) in which the self-driving (autonomous) vehicle 100*b* moves. For example, the map data may include object identification information on fixed objects such as street lights, rocks, and buildings and movable objects such as vehicles and pedestrians. In addition, the object identification information may include a name, type, distance, and location.

In addition, the self-driving vehicle 100b may perform an operation or drive by controlling a driving unit based on a user's control/interaction. In this case, the self-driving vehicle 100b may acquire interaction intention information according to a user's motion or voice speech, and determine a response based on the obtained intention information to perform the operation.

AI+XR

The XR device 100c is applied with AI technology, and may be implemented as HMD (Head-Mount Display), HUD (Head-Up Display) provided in the vehicle, a TV, a mobile phone, a smart phone, a computer, a wearable device, a home appliance, a digital signage, a vehicle, a fixed robot or a mobile robot.

The XR device 100c may acquire information on a surrounding space or a real object by analyzing 3D point cloud data or image data acquired through various sensors or from an external device to generate location data and attribute data for 3D points, and may render the XR object to be displayed to output. For example, the XR apparatus 100c may output an XR object including additional information on the recognized object corresponding to the recognized object.

The XR apparatus 100c may perform the above operations using a learning model composed of at least one artificial neural network. For example, the XR device 100c may recognize a real object from 3D point cloud data or image data using a learning model, and may provide information corresponding to the recognized real object. Here, the learning model may be directly learned by the XR device 100c or learned by an external device such as the AI server 200.

At this time, the XR device 100c may directly generate a result using a learning model to perform an operation, but may also transmit sensor information to an external device such as the AI server 200 and receive the generated result to perform the operation.

AI+Robot+Autonomous Driving

The robot 100a may be implemented as a guide robot, a transport robot, a cleaning robot, a wearable robot, an entertainment robot, a pet robot, an unmanned flying robot, etc. by applying AI technology and autonomous driving technology.

The robot 100a to which AI technology and autonomous driving technology are applied may refer to a robot having an autonomous driving function or a robot 100a interacting with the self-driving vehicle 100b.

The robot 100a having an autonomous driving function may collectively refer to devices that move by themselves according to a given movement line without the user's control or by determining the movement line by themselves.

The robot 100a having an autonomous driving function and the self-driving vehicle 100b may use a common sensing method to determine one or more of a moving route or a driving plan. For example, the robot 100a having an autonomous driving function and the self-driving vehicle 100b may determine one or more of a movement route or a driving plan using information sensed through a lidar, a radar, and a camera.

The robot 100a interacting with the self-driving vehicle 100b exists separately from the self-driving vehicle 100b and may be linked to an autonomous driving function inside or outside the autonomous driving vehicle 100b, or may perform an operation associated with the user on board in the self-driving vehicle 100b.

Here, the robot 100a interacting with the self-driving vehicle 100b may control or assist the autonomous driving function of the self-driving vehicle 100b by acquiring sensor information on behalf of the self-driving (autonomous) vehicle 100b to provide it to the self-driving vehicle 100b, or acquiring sensor information and generating object information on the surrounding environment to provide it to the self-driving vehicle 100b.

Alternatively, the robot 100a interacting with the self-driving vehicle 100b may monitor a user in the self-driving vehicle 100b or control functions of the self-driving vehicle 100b through interaction with the user. For example, when it is determined that the driver is in a drowsy state, the robot 100a may activate an autonomous driving function of the self-driving vehicle 100b or assist in controlling the driving unit of the self-driving vehicle 100b. Here, the functions of the self-driving vehicle 100b controlled by the robot 100a may include not only an autonomous driving function, but also functions provided by a navigation system or an audio system provided inside the self-driving vehicle 100b.

Alternatively, the robot 100a interacting with the self-driving vehicle 100b may provide information or assist a function to the self-driving vehicle 100b from outside of the self-driving vehicle 100b. For example, the robot 100a may provide traffic information including signal information to the self-driving vehicle 100b, such as a smart traffic light, or automatically connect an electric charger to the charging port by interacting with the self-driving vehicle 100b, such as an automatic electric charger for an electric vehicle.

AI+Robot+XR

The robot 100a may be implemented as a guide robot, a transport robot, a cleaning robot, a wearable robot, an entertainment robot, a pet robot, an unmanned flying robot, a drone, etc. by applying AI technology and XR technology.

The robot 100a to which the XR technology is applied may refer to a robot to be controlled/interacted within an XR image. In this case, the robot 100a is distinguished from the XR device 100c and may be interacted with each other.

When the robot 100a, which is the object of control/interaction in the XR image, acquires sensor information from sensors including a camera, the robot 100a or the XR device 100c may generate an XR image based on the sensor information, and XR device 100c may output the generated XR image. In addition, the robot 100a may operate based on a control signal input through the XR device 100c or a user's interaction.

For example, the user may check the XR image corresponding to the viewpoint of the robot 100a linked remotely through an external device such as the XR device 100c, and may adjust the autonomous driving path of the robot 100a through the interaction, or control motion or driving, or check information on surrounding objects.

AI+Autonomous Driving+XR

The self-driving (autonomous) vehicle 100b may be implemented as a mobile robot, a vehicle, or an unmanned aerial vehicle by applying AI technology and XR technology.

The self-driving vehicle 100b to which the XR technology is applied may mean an autonomous driving vehicle including a means for providing an XR image, or an autonomous driving vehicle that is an object of control/interaction within the XR image. In particular, the self-driving vehicle 100b, which is an object of control/interaction in the XR image, is distinguished from the XR device 100c and may be interacted with each other.

The self-driving vehicle 100b having a means for providing an XR image may acquire sensor information from sensors including a camera, and may output an XR image generated based on the acquired sensor information. For example, the self-driving vehicle 100b may provide an XR object corresponding to a real object or an object in a screen to the occupant by outputting an XR image with a HUD.

In this case, when the XR object is output to the HUD, at least a part of the XR object may be output to overlap the actual object facing the occupant's gaze. Meanwhile, when the XR object is output on a display provided inside the self-driving vehicle 100b, at least a part of the XR object may be output to overlap an object in the screen. For example, the self-driving vehicle 100b may output XR objects corresponding to objects such as lanes, other vehicles, traffic lights, traffic signs, motorcycles, pedestrians, and buildings.

When the self-driving vehicle 100b, which is an object of control/interaction in the XR image, acquires sensor information from sensors including a camera, the self-driving vehicle 100b or the XR device 100c may generate an XR image based on the sensor information, and output the generated XR image. In addition, the self-driving vehicle 100b may operate based on a control signal input through an external device such as the XR device 100c or a user's interaction.

Figure 5:
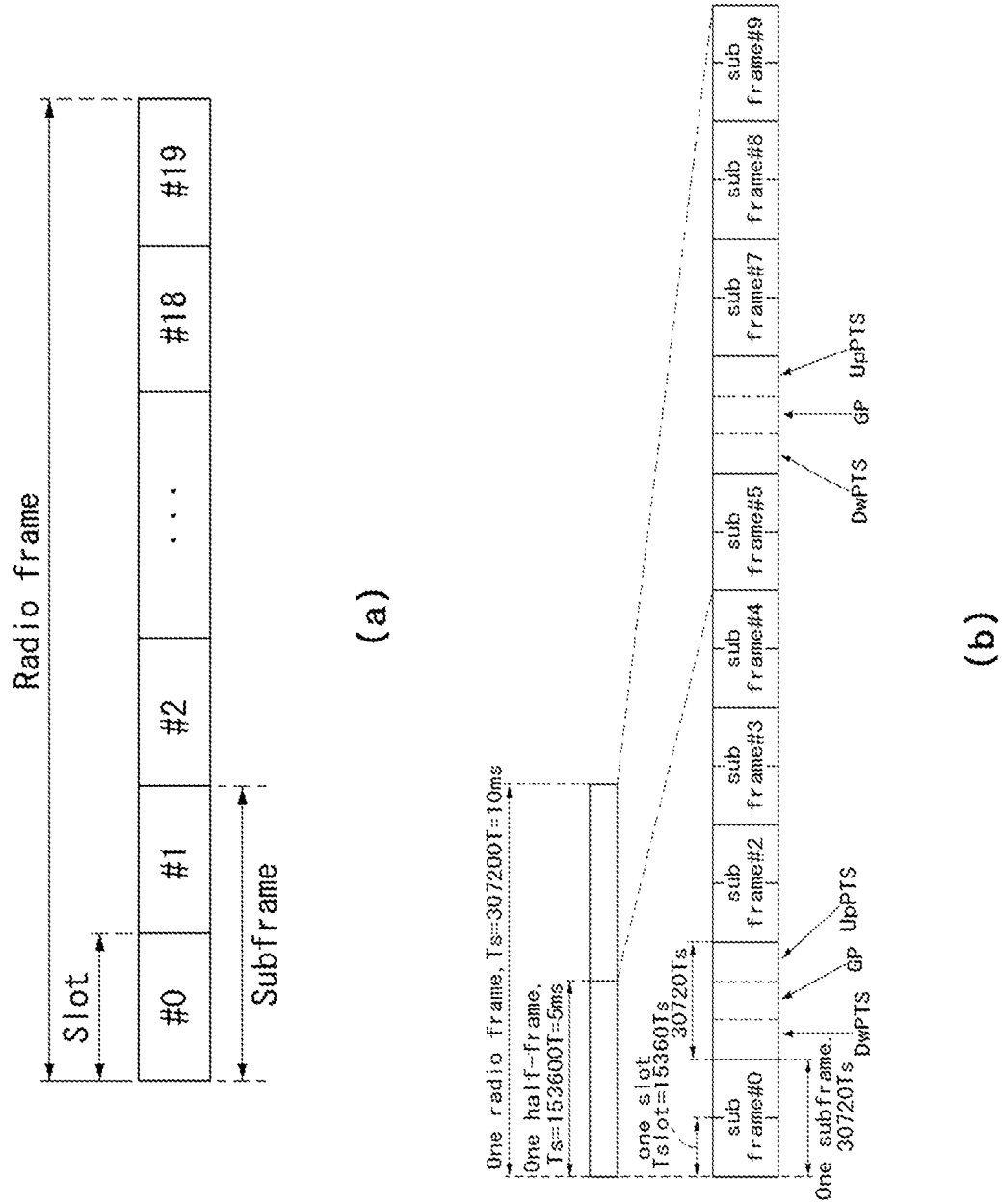
FIG. 5 is a diagram illustrating a radio frame in a wireless communication system to which the present disclosure may be applied.

Overall Wireless Communication System to which the Present Disclosure May be Applied FIG. 5 illustrates a radio frame structure in a wireless communication system to which the present disclosure may be applied.

Type 1 radio frame structure applicable to Frequency Division Duplex (FDD) and Type 2 radio frame structure applicable to Time Division Duplex (TDD) are supported in 3GPP LTE/LTE-A.

In FIG. 5, a size in time domain of radio frame is expressed as a multiple of a time unit of $T\_s=1/(15000*2048)$. Downlink transmission and uplink transmission consist of a radio frame having a duration of $T\_f=307200*T\_s=10$ ms.

FIG. 5(a) illustrates a structure of a type 1 radio frame. The type 1 radio frame is applicable to both full duplex FDD and half duplex FDD.

A radio frame consists of 10 subframes. One radio frame consists of 20 slots with a length $T\_slot=15360*T\_s=0.5$ ms and each slot is assigned an index from 0 to 10. One subframe consists of two consecutive slots in a time domain and subframe i consists of a slot 2i and a slot si+1. A time taken to transmit one subframe is referred to as a transmission time interval (TTI). For example, a length of one subframe may be 1 mms and a length of one slot may be 0.5 ms.

In FDD, uplink transmission and downlink transmission are distinguished in a frequency domain. While there is no restriction on a full duplex FDD, a UE cannot transmit and receive at the same time in a half duplex FDD operation.

One slot includes a plurality of orthogonal frequency division multiplexing (OFDM) in a time domain and includes a plurality of resource blocks (RB) in a frequency domain. Since 3GPP LTE uses OFDMA in the downlink, a OFDM symbol is for expressing one symbol period. An OFDM symbol may be referred to as one SC-FDMA symbol or symbol period. A resource block is a resource allocation unit and includes a plurality of consecutive subcarriers in one slot.

FIG. 5(b) illustrates a frame structure type 2.

Type 2 radio frame consists of two half frames, each frame having a length of $153600*T\_s=5$ ms. Each half frame consists of 5 subframe, each subframe having a length of $30720*T\_s=1$ ms.

In the type 2 frame structure of the TDD system, uplink-downlink configuration is a rule indicating whether uplink and downlink are allocated (or, reserved) for all subframes. Table 1 indicates the uplink-downlink configuration

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each subframe of the radio frame, 'D' indicates a subframe for downlink transmission, 'U' indicates a subframe for uplink transmission, 'S' indicates a special subframe composed of three fields including Downlink Pilot Time Slot (DwPTS), Guard Period (GP) and Uplink Pilot Time Slot (UpPTS).

DwPTS is used for initial cell search, synchronization, or channel estimation in the UE. UpPTS is used for channel estimation in a base station and synchronization of uplink transmission in a UE. GP is a duration for removing interference caused in an uplink due to a multipath delay of a downlink signal between an uplink and a downlink.

Each subframe i consists of a slot 2i and a slot si+1, each slot having a length $T\_slot=15360*T\_s=0.5$ ms.

The uplink-downlink configuration may be divided into 7 types, and the positions and/or the number of downlink subframes, special subframes, and uplink subframes are different for each configuration.

The timepoint at which a downlink is switched to an uplink or the timepoint at which an uplink is switched to a downlink is referred to as a switching point. Switch-point periodicity means a period in which an uplink subframe and a downlink subframe are switched in the same way, and 5 ms and 10 ms are both supported. In the case of having a period of 5 ms downlink-uplink switching time, a special subframe (S) exists for every half-frame, and in the case of having a period of 5 ms downlink-uplink switching time, a special subframe(S) exists only in the first half-frame.

In all configurations, subframe 0,5 and DwPTS are duration only for downlink transmission. The subframe immediately following the UpPTS and the subframe is duration only for uplink transmission.

An uplink-downlink configuration may be known by both a base station and a UE as system information. A base station may inform a UE of a change in an uplink-downlink allocation state of a radio frame by transmitting only an index of configuration information whenever uplink-downlink configuration information is changed. In addition, configuration information may be transmitted through a Physical Downlink Control Channel (PDCCH) like other scheduling information as downlink control information and may be transmitted through a broadcast channel to all UEs in a cell as broadcast information.

Table 2 indicates a configuration of a special subframe (a length of a DwPTS/GP/UpPTS).

TABLE 2

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
|---|---|---|---|---|---|---|
| 0 | $6592 \cdot T_S$ | $2192 \cdot T_S$ | $2560 \cdot T_S$ | $7680 \cdot T_S$ | $2192 \cdot T_S$ | $2560 \cdot T_S$ |
| 1 | $19760 \cdot T_S$ | | | $20480 \cdot T_S$ | | |
| 2 | $21952 \cdot T_S$ | | | $23040 \cdot T_S$ | | |
| 3 | $24144 \cdot T_S$ | | | $25600 \cdot T_S$ | | |
| 4 | $26336 \cdot T_S$ | | | $7680 \cdot T_S$ | $4384 \cdot T_S$ | $5120 \cdot T_S$ |
| 5 | $6592 \cdot T_S$ | $4384 \cdot T_S$ | $5120 \cdot T_S$ | $20480 \cdot T_S$ | | |
| 6 | $19760 \cdot T_S$ | | | $23040 \cdot T_S$ | | |
| 7 | $21952 \cdot T_S$ | | | — | — | — |
| 8 | $24144 \cdot T_S$ | | | — | — | — |

A structure of a radio frame in an embodiment of FIG. 5 is only one example, and the number of a subcarrier included in a radio frame, or the number of a slot included in a subframe and the number of a OFDM symbol included in a slot may be variously changed.

Figure 6:
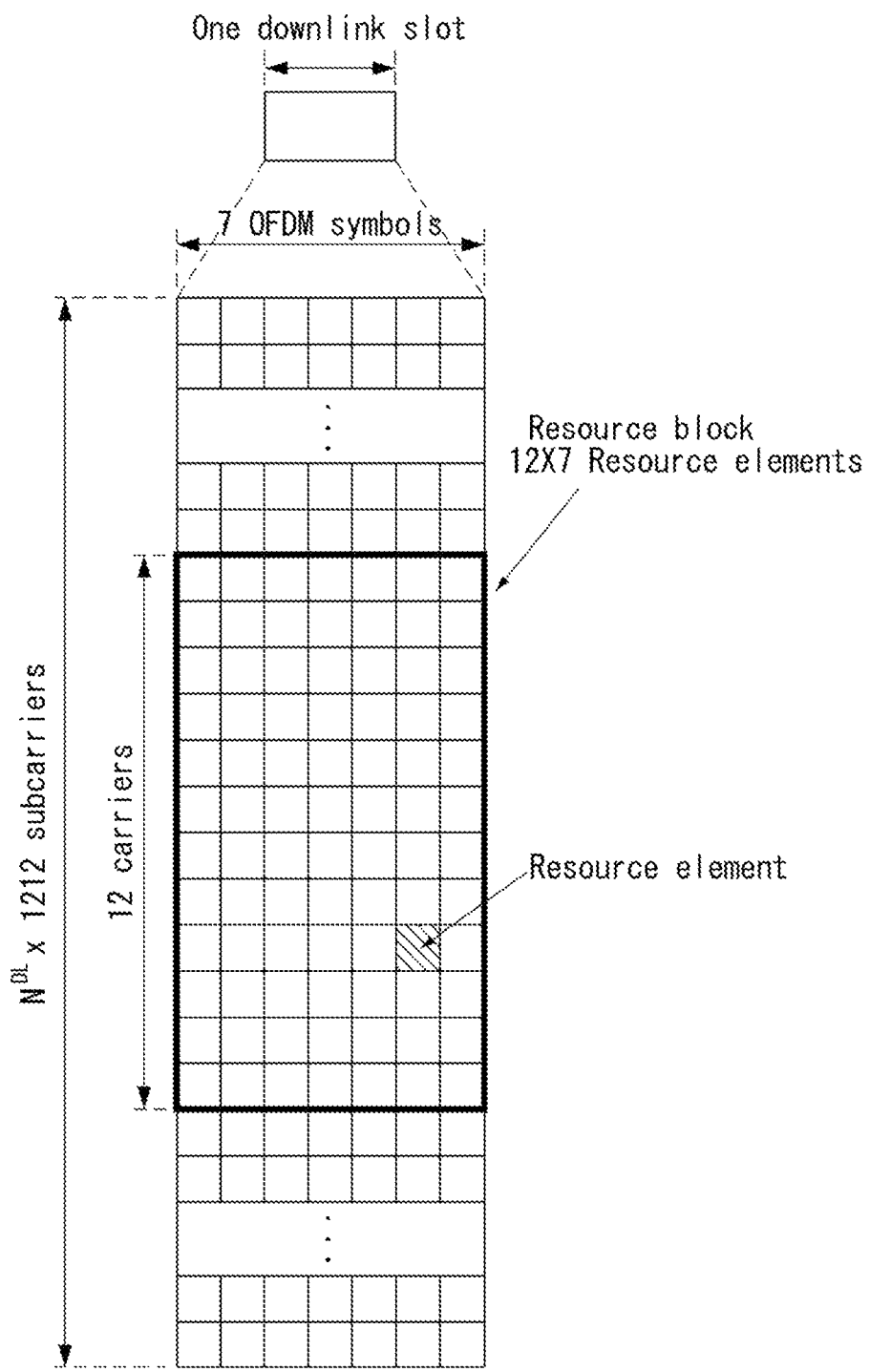
FIG. 6 is a diagram illustrating a resource grid for one downlink slot in a wireless communication system to which the present disclosure may be applied.

FIG. 6 illustrates a resource grid for a downlink slot in a wireless communication system to which the present disclosure may be applied.

Referring to FIG. 6, one downlink slot includes a plurality of OFDM symbols in a time domain. Here, it is exemplarily described that one downlink slot includes 7 OFDM symbols and one resource block includes 12 subcarriers in a frequency domain, but it is not limited hereto.

Each element in a resource grid is defined as a resource element and one resource block (RB) includes 12×7 resource elements. The number of resource block included in a downlink slot depends on a downlink transmission bandwidth.

A structure of an uplink slot is same as a structure of a downlink slot.

Figure 7:
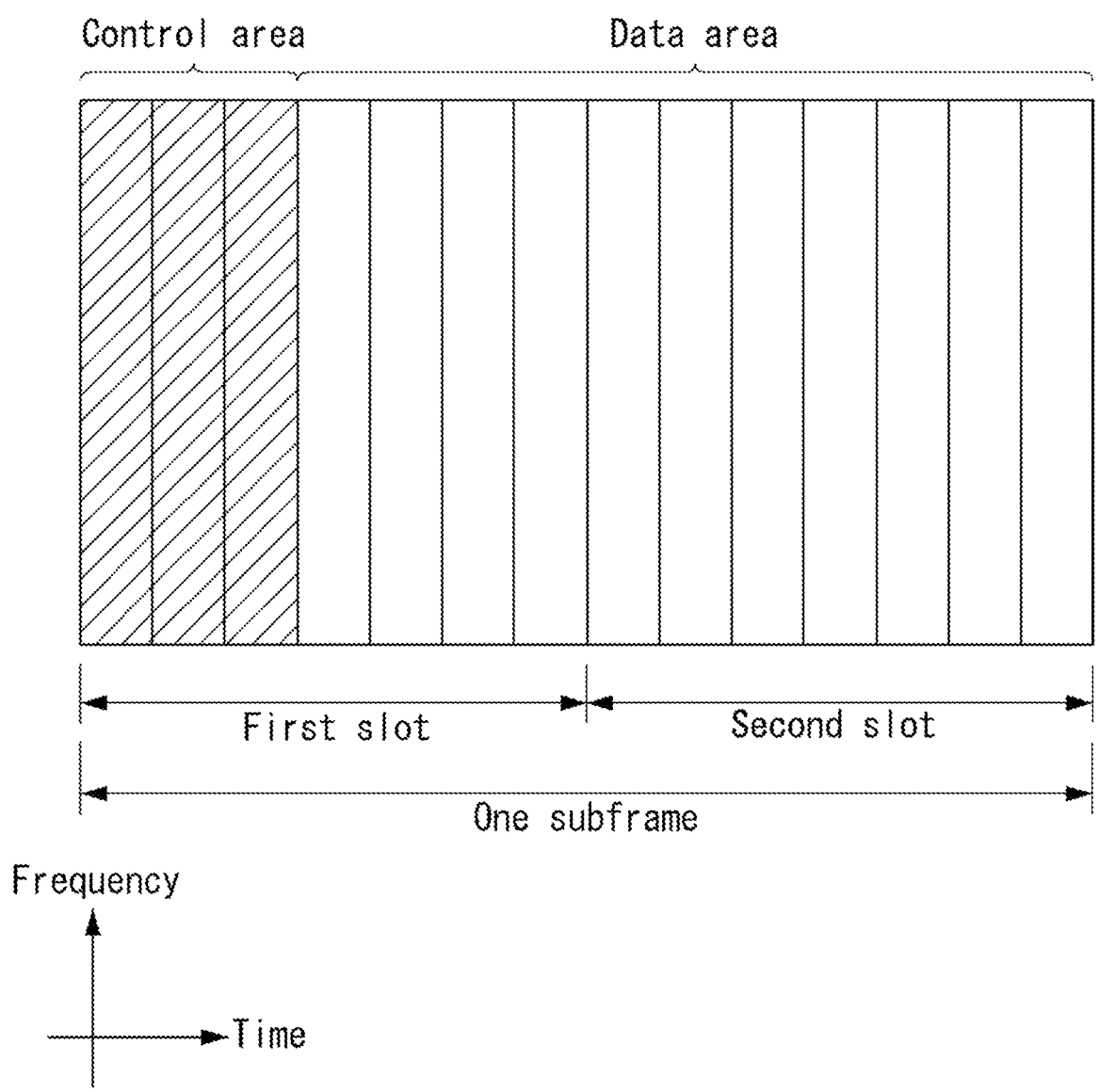
FIG. 7 is a diagram illustrating a downlink subframe structure in a wireless communication system to which the present disclosure may be applied.

FIG. 7 illustrates a structure of a downlink subframe in a wireless communication system to which the present disclosure may be applied.

Referring to FIG. 7, in the first slot in a subframe, up to three OFDM symbols are a control region to which a control channel is allocated, and the remaining OFDM symbols are a data region to which a physical downlink shared channel (PDSCH) is allocated. Examples of a downlink control channel used in 3GPP LTE includes a physical control format indicator channel (PCFICH), a physical downlink control channel (PDCCH), a physical hybrid-ARQ indicator channel (PHICH), and the like.

PCFICH is transmitted in the first OFDM symbol of a subframe and carries information on the number of OFDM symbol (that is, a size of the control region) used for transmitting control regions in a subframe. PHICH is a response channel for an uplink and carries Acknowledgement (ACK)/Not-Acknowledgement (NACK) signal for a hybrid automatic repeat request (HARQ). Control information transmitted through a PDCCH is referred to as a downlink control information (DCI). DCI includes uplink resource allocation information, downlink resource allocation information, or an uplink transmission (Tx) power control command for any UE group.

A PDCCH may carry resource allocation and a transmission format of a DL-SCH (this is also referred to as a downlink grant), resource allocation information of an uplink shared channel (UL-SCH) (this is also referred to as an uplink grant), paging information in a paging channel (PCH), system information in a DL-SCH, resource allocation for an upper-layer control messages such as a random access response transmitted from a PDSCH, a set of transmission power control commands for individual UEs in any UE group, and activation of Voice over IP (VOIP). A plurality of PDCCHs may be transmitted in a control region, and a UE may monitor the plurality of PDCCHs. A PDCCH consists of a set of one or a plurality of continuous control channel elements (CCEs). The CCE is a logical allocation unit used to provide a coding rate to the PDCCH according to the state of a radio channel. CCE corresponds to a plurality of resource element groups (resource element groups). A format of the PDCCH and the number of bits of the usable PDCCH are determined according to correlation between the number of CCEs and the coding rate provided by the CCEs.

A base station determines a format according to a DCI to be transmitted to a UE and attaches a cyclic redundancy check (CRC) to a control information. In the CRC, a unique identifier (that is referred to as radio network temporary identifier (RNTI)) is masked according to an owner of a PDCCH or a usage. If a PDCCH is for a specific UE, a unique identifier of the UE (e.g., C-RNTI (Cell-RNTI)) may be masked to the CRC. Alternatively, if a PDCCH is for a paging message, a paging indication identifier (e.g., a Paging-RNTI (P-RNTI)) may be masked to the CRC. If it is a PDCCH for system information, more specifically, a system information block (SIB), a system information identifier and a system information RNTI (SI-RNTI) may be masked to the CRC. In order to indicate a random-access response that is a response to the UE's transmission of the random-access preamble, a random access-RNTI (RA-RNTI) may be masked to the CRC.

An Enhanced PDCCH (EPDCCH) carries a UE-specific signaling. An EPDCCH is positioned in a UE-specific configured physical resource block (PRB). In other words, as described above, a PDCCH may be transmitted in the previous three OFDM symbols in the first slot in a subframe, but EPDCCH may be transmitted in a resource region other than the PDCCH. A time point (i.e., a symbol) at which EPDCCH starts in a subframe may be configured in a UE through a higher layer signaling (e.g., RRC signaling, etc.).

EPDCCH may carry a transport format related to a DL-SCH, resource allocation and HARQ information, a transport format related to a UL-SCH, resource allocation and HARQ information, resource allocation information related to a SL-SCH (Sidelink Shared Channel) and PSCCH (Physical Sidelink Control Channel). Multiple EPDCCHs may be supported, and a UE may monitor a set of EPCCHs.

EPDCCH may be transmitted using one or more continuous enhanced CCEs (ECCEs), and the number of ECCEs per a single EPDCCH may be determined for each EPDCCH format.

Each ECCE may consist of a plurality of enhanced resource element group (EREG). EREG is used to define the mapping of ECCE to RE. There are 16 EREGs per PRB pair. Except for REs carrying DMRS within each PRB pair, all REs are numbered from 0 to 15 in order of increasing frequency and increasing time.

A UE may monitor a plurality of EPDCCHs. For example, one or two EPDCCH sets in one PRB pair for which the UE monitors EPDCCH transmission may be configured.

Different coding rates for EPCCH may be realized by merging different numbers of ECCEs. A EPCCH may use a localized transmission or a distributed transmission, and accordingly, the mapping of the ECCE to the RE in the PRB may vary.

Figure 8:
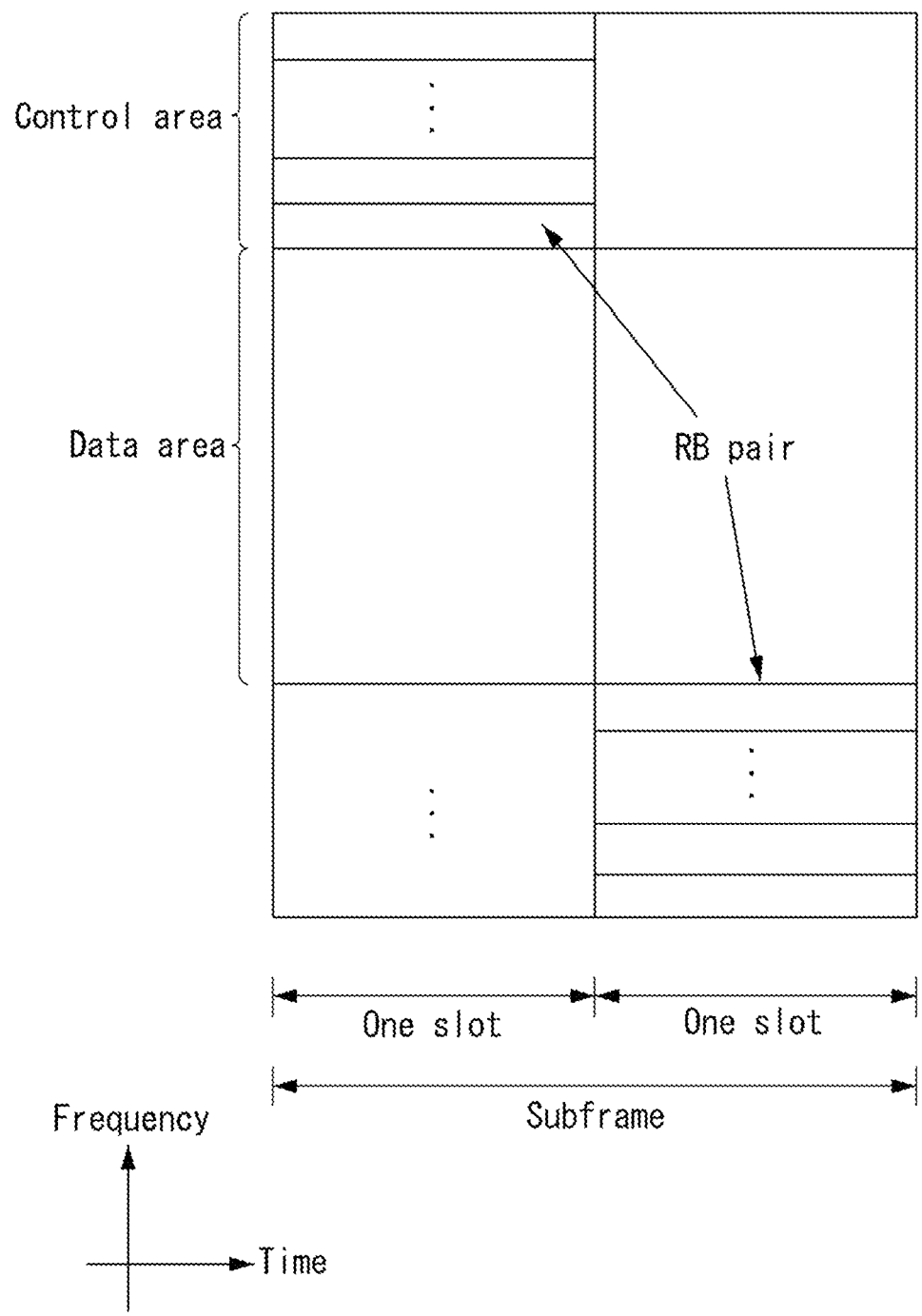
FIG. 8 is a diagram illustrating an uplink subframe structure in a wireless communication system to which the present disclosure may be applied.

FIG. 8 illustrates a structure of an uplink subframe in a wireless communication system to which the present disclosure may be applied.

Referring to FIG. 8, an uplink subframe may be divided into a control region and a data region in a frequency region. A Physical Uplink Control Channel (PUCCH) carrying uplink control information is allocated to the control region. A Physical Uplink Shared Channel (PUSCH) carrying user data is allocated to the data region. In order to maintain single carrier characteristic, one UE does not transmit PUCCH and PUSCH at the same time.

A resource block (RB) pair in a subframe is allocated to a PUCCH for a UE. RBs belonging to the RB pair occupy different subcarriers in each of the two slots. Here, the RB pair allocated to the PUCCH is referred to as a frequency hopping at a slot boundary.

Figure 9:
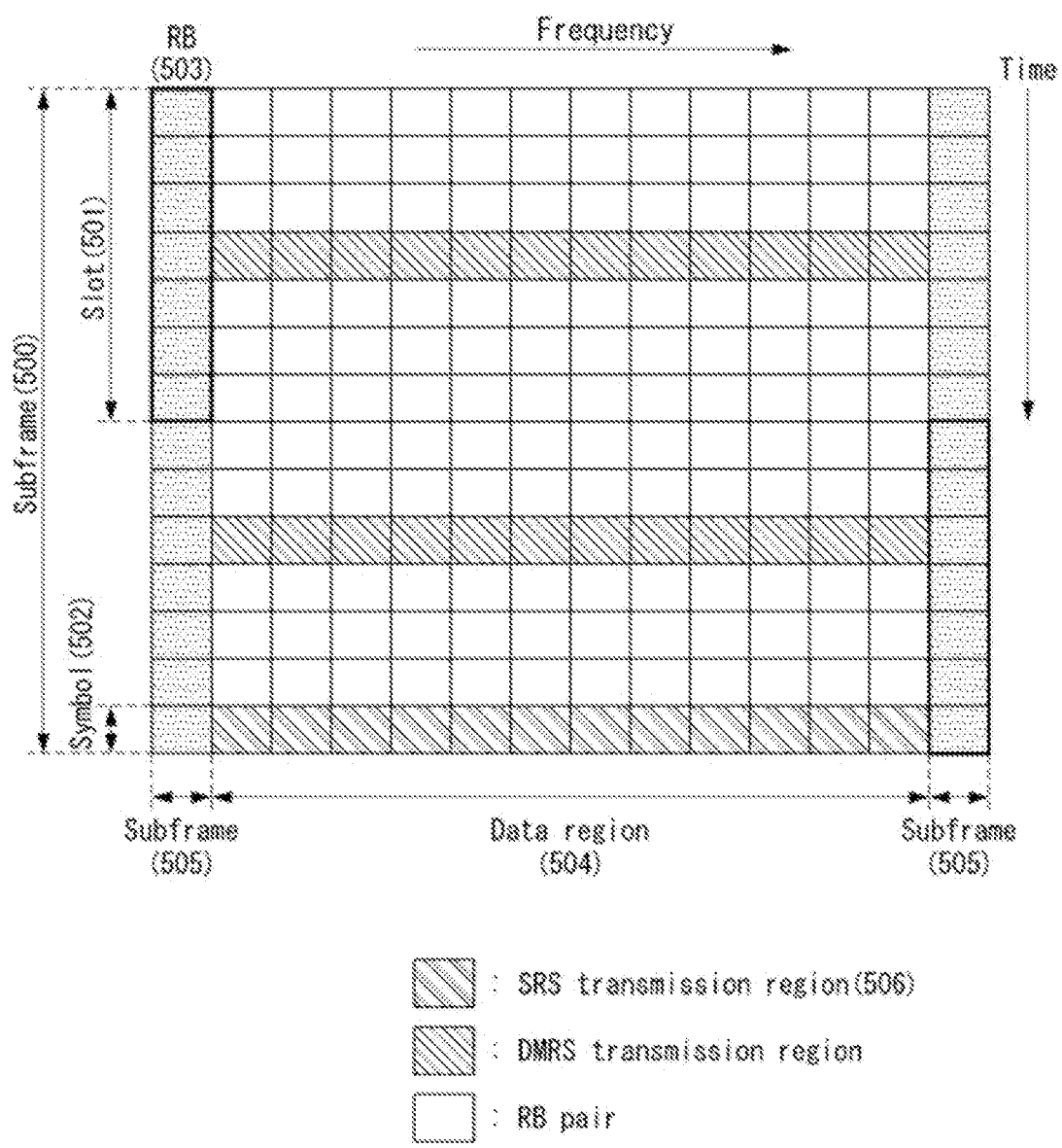
FIG. 9 is a diagram illustrating a structure of an uplink subframe used in a wireless communication system to which the present disclosure may be applied.

FIG. 9 illustrates an embodiment of a structure of an uplink subframe used in a wireless system to which the present disclosure may be applied.

Referring to FIG. 9, a subframe 500 consists of two 0.5 ms slot 501. Each slot consists of a plurality of symbols 502 and one symbol corresponds to one SC-FDMA symbol. An RB 503 is a resource allocation unit corresponding to 12 subcarriers in a frequency domain and one slot in a time domain. A structure of an uplink subframe of LTE is divided into a data region 504 and a control region 505. The data area refers to a communication resource used to transmit data such as voice and packet transmitted to each UE, and includes a Physical Uplink Shared Channel (PUSCH). A control region refers to a communication resource used to transmit an uplink control signal, for example, a downlink channel quality report from each UE, reception ACK/NACK for a downlink signal, an uplink scheduling request etc. and includes PUCCH (Physical Uplink). control channels). A sounding reference signal (SRS) is transmitted through the SC-FDMA symbol located last on the time axis in one subframe.

Figure 10:
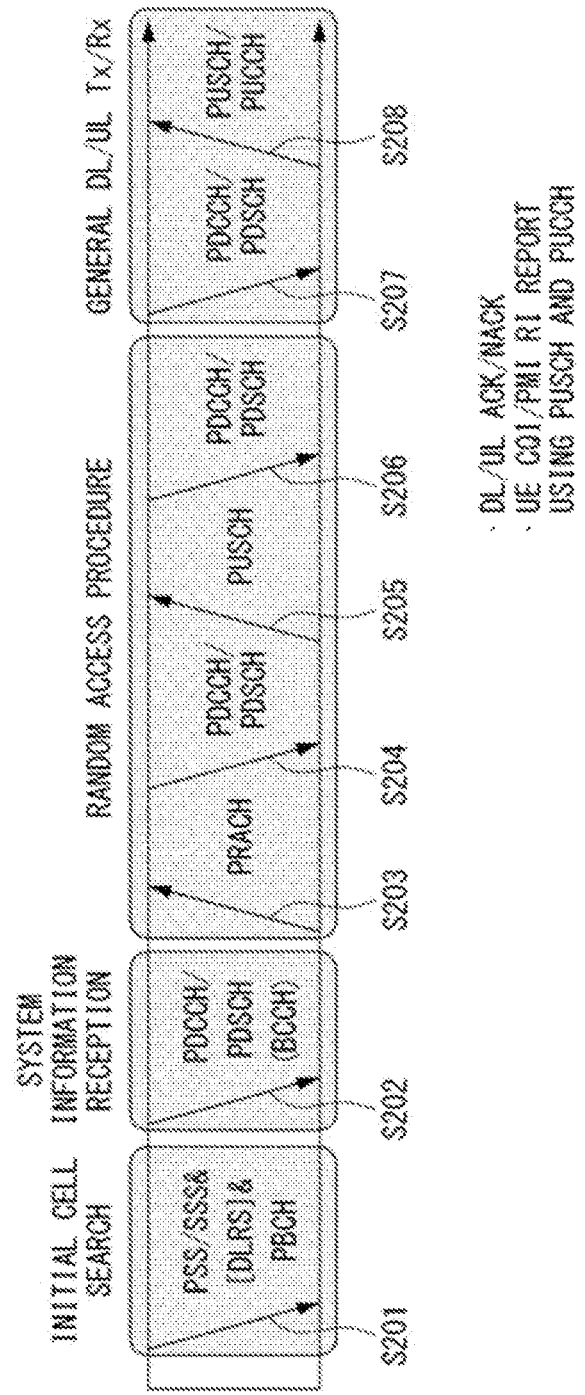
FIG. 10 is a diagram illustrating physical channels used in a wireless communication system and a general signal transmission method using the physical channels, to which the present disclosure may be applied.

FIG. 10 illustrates physical channels used in a wireless communication system and a method of transmitting a general signal using the physical channels.

Referring to FIG. 10, a UE receives information from a base station through a downlink (DL) and transmits information to a base station through an uplink (UL) in a wireless communication system. Information transmitted and received between a base station and a UE includes data and various control information and various physical channels exist according to a type/usage of information they transmit or receive.

When a UE is turned on or newly enters a cell, the UE performs an initial cell search operation such as synchronizing with a base station S201. To this end, a UE may synchronize with a base station by receiving a primary synchronization signal (PSS) and a secondary synchronization signal (SSS) from a base station and obtain information such as a cell identifier (ID), etc. After that, a UE may obtain broadcasting information in a cell by receiving a physical broadcast channel (PBCH) from a base station. Meanwhile, a UE may check out a downlink channel state by receiving a downlink reference signal (DL RS) at an initial cell search step.

After completing the initial cell search, a UE may obtain more concrete system information by receiving a physical downlink control channel (PDCCH) and a physical downlink shared channel (PDSCH) according to information in the PDCCH S202.

Meanwhile, when a UE access to a base station for the first time or does not have a radio resource for signal transmission, the UE may perform a random access procedure (RACH) to a base station S203 to S206. To this end, the UE may transmit a specific sequence to a preamble through a physical random access channel (PRACH) S203 and S205 and may receive a response message for a preamble through a PDCCH and a corresponding PDSCH. A competition-based RACH may additionally perform a contention resolution procedure S206.

A UE which performed the above-described procedure subsequently may perform PDCCH/PDSCH reception S207 and PUSCH (Physical Uplink Shared Channel)/PUCCH (physical uplink control channel) transmission S208 as a general uplink/downlink signal transmission procedure. In particular, a UE receives downlink control information (DCI) through a PDCCH. Here, DCI may include control information such as resource allocation information for a UE and a format may be applied differently depending on a purpose of use.

Meanwhile, control information which is transmitted by a UE to a base station or is received from a base station through an uplink includes a downlink/uplink ACK/NACK (Acknowledgement/Non-Acknowledgement) signal, a CQI (Channel Quality Indicator), a PMI (Precoding Matrix Indicator), a RI (Rank Indicator), etc. A UE may transmit control information of the above-described CQI/PMI/RI, etc. through a PUSCH and/or a PUCCH.

As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a UE sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as New RAT in the present disclosure.

NR

As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a UE sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure.

Figure 11:
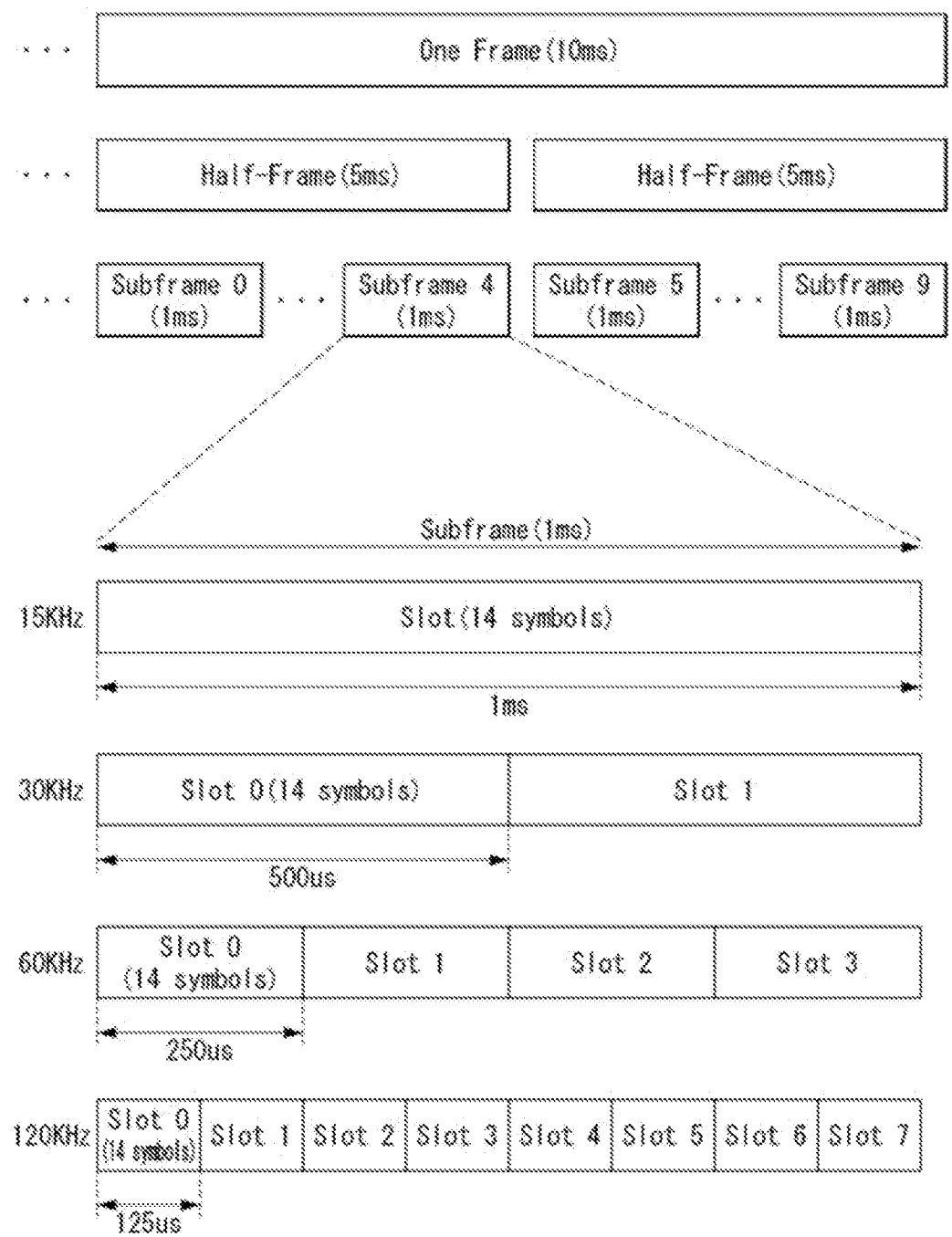
FIG. 11 is a diagram illustrating a radio frame structure in a wireless communication system to which the present disclosure may be applied.

FIG. 11 illustrates a structure of a radio frame in a wireless communication system to which the present disclosure may be applied.

FIG. 11 is an example of a structure of a radio frame.

In NR, uplink transmission and downlink transmission consist of a frame. A radio frame has a length of 10 ms and is defined as two 5 ms half-frames (HF). A half-frame is defined as 1 ms 5 subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbol may include an OFDM symbol (or a CP-OFDM symbol) and an SC-FDMA symbol (or a DFT-s-OFDM symbol).

NR supports a number of numerology (or subcarrier spacing (SCS)) to support various 5G services. For example, when SCS is 15 kHz, wide area in traditional cellular bands is supported, and when SCS is 30 kHz/60 kHz, dense-urban, lower latency and a wider carrier bandwidth are supported, and when the SCS is 60 kHz or higher, a bandwidth greater than 24.25 GHz to overcome phase noise is supported.

An NR frequency band is defined as a frequency range in two types (FR1, FR2). FR1 is a sub 6 GHz range. FR2 is above 6 GHz range, which may mean a millimeter wave (mmW). Table 3 below shows the definition of the NR frequency band.

TABLE 3

| Frequency Range designation | Corresponding frequency range | subcarrier spacing |
|---|---|---|
| FR1 | 450 MHz-6000 MHz | 15, 30, 60 kHz |
| FR2 | 24250 MHz-52600 MHz | 60, 120, 240 kHz |

Table 4 illustrates that when a normal cp is used, the number of symbols per slot, the number of slots per frame, and the number of slots per subframe vary according to SCS.

TABLE 4

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |

TABLE 4-continued

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: the number of symbols per slot
*$N^{frame, u}_{slot}$: the number of slots per frame
*$N^{subframe, u}_{slot}$: the number of slots per subframe Table 5 illustrates that when an extended cp is used, the number of symbols per slot, the number of slots per frame, and the number of slots per subframe vary according to SCS

TABLE 5

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, OFDM(A) numerology (e.g., SCS, CP length, etc.) may be configured differently between a plurality of cells merged into one UE. Accordingly, an interval (absolute time) of a time resource (e.g., SF, slot, or TTI) (collectively referred to as TU (Time Unit) for convenience) composed of the same number of symbols may be configured differently between the merged cells.

Figure 12:
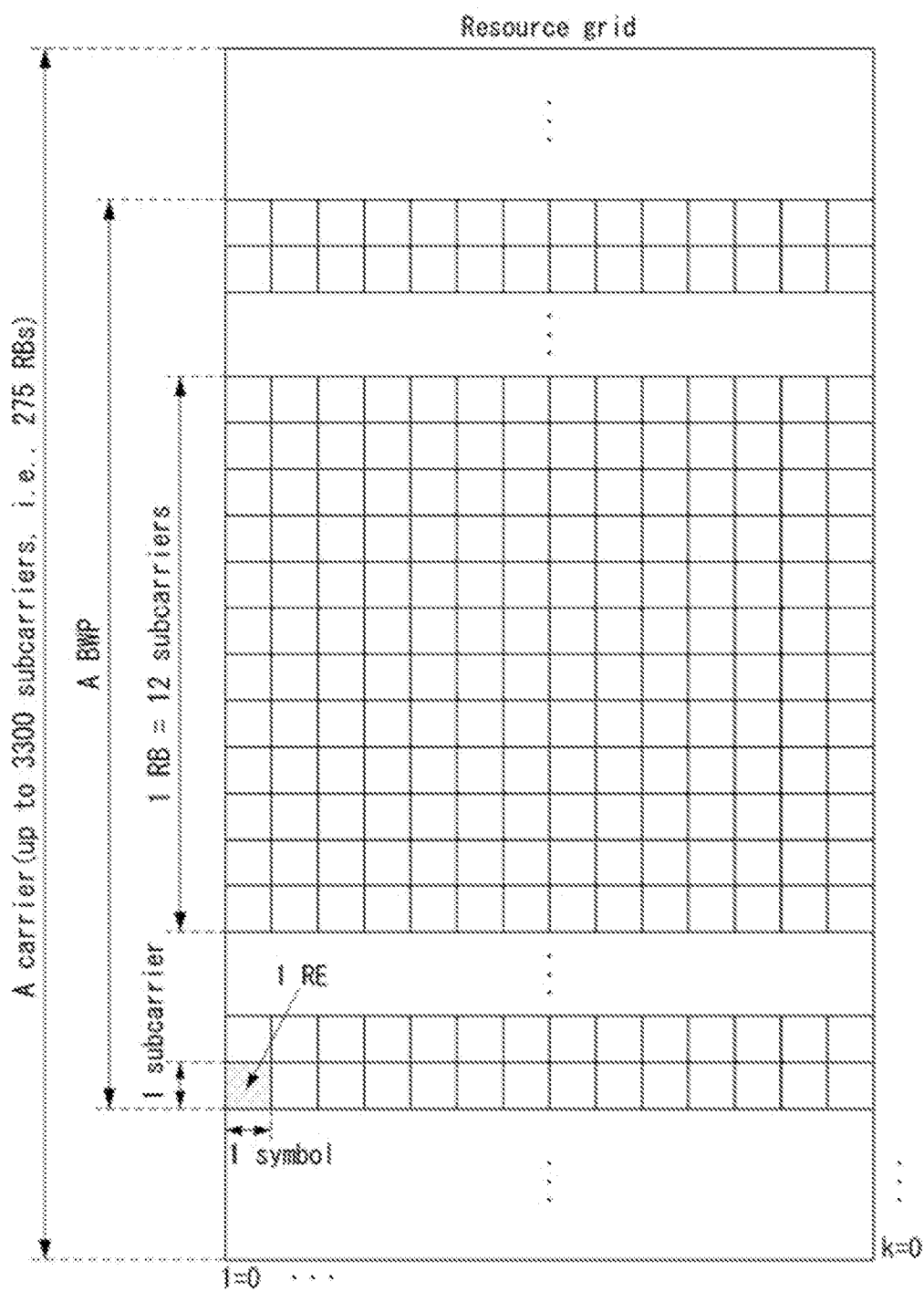
FIG. 12 is a diagram illustrating a structure of an NR frame which is a wireless system to which the present disclosure may be applied.

FIG. 12 illustrates a structure of an NR frame which is wireless system to which the present disclosure may be applied.

A slot includes a plurality of symbols in a time domain. For example, in case of a normal CP, one slot includes 14 symbols, but in case of an extended CP, a slot includes 12 symbols. A carrier includes a plurality of subcarriers in a frequency domain. A resource block (RB) is defined as a plurality (e.g., 12) of consecutive subcarriers in a frequency domain. A bandwidth part (BWP) is defined as a plurality of consecutive (P) RBs in a frequency domain, and may correspond to one numerology (e.g., SCS, CP length, etc.). A carrier may include a maximum of N (e.g., 5) BWPs. Data communication is performed through the activated BWP, and only one BWP can be activated for one UE. Each element in a resource grid is referred to as a resource element (RE), and one complex symbol may be mapped.

Figure 13:
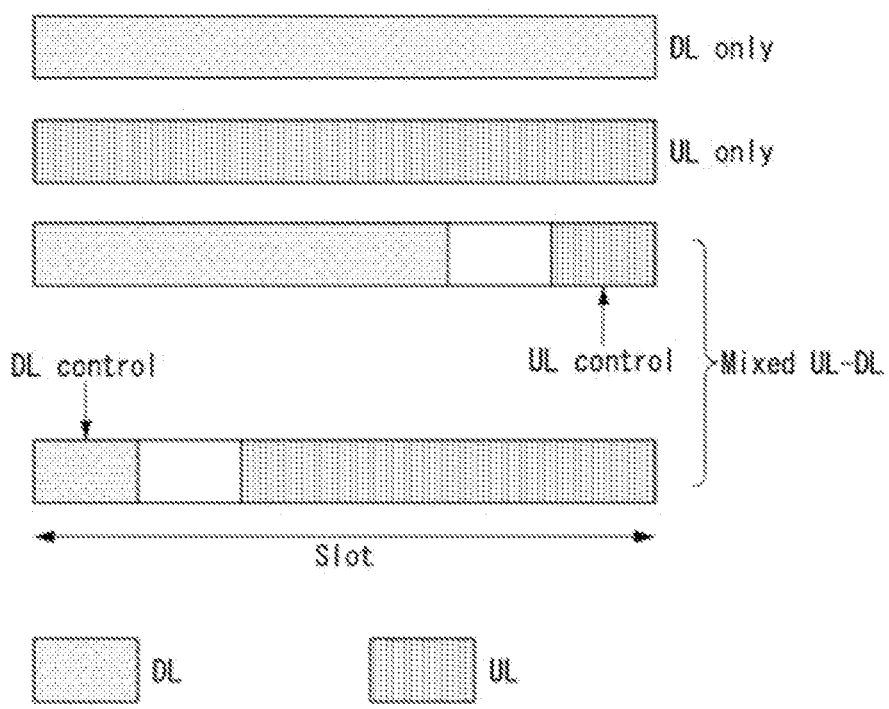
FIG. 13 is a diagram illustrating an embodiment of a self-contained slot structure to which the method proposed in the present disclosure may be applied.

FIG. 13 illustrates a structure of a self-contained slot to which the present disclosure may be applied.

In the NR system, a frame is characterized by a self-contained structure in which a DL control channel, DL or UL data, UL control channel, etc. may be all included in one slot. For example, the first N symbols in a slot may be used to transmit a DL control channel (hereinafter, DL control region), and the last M symbols in a slot may be used to transmit a UL control channel (hereinafter, UL control region). N and M are each an integer greater than or equal to 0. A resource region (hereinafter, referred to as a data region) between the DL control region and the UL control region may be used for DL data transmission or UL data transmission. As an example, the following configuration may be considered. Each duration is listed in chronological order.

1. DL only configuration
2. UL only configuration
3. Mixed UL-DL configuration
   DL region+Guard Period (GP)+UL control region
   DL control region+GP+UL region
   DL region: (i) DL data region, (ii) DL control region+DL data region
   UL region: (i) UL data region, (ii) UL data region+UL control region A PDCCH may be transmitted in the DL control region, and a PDSCH may be transmitted in the DL data region. A PUCCH may be transmitted in the UL control region, and a PUCCH may be transmitted in the UL data region. In PDCCH, downlink control information (DCI), for example, DL data scheduling information and UL data scheduling information, etc. may be transmitted. In PUCCH, uplink control information (UCI), for example, ACK/NACK (Positive Acknowledgment/Negative Acknowledgment) information for DL data, CSI (Channel State Information) information, SR (Scheduling Request), etc. may be transmitted. GP provides a time gap between a base station and a UE in the process of switching from the transmission mode to the reception mode or in the process of switching from the reception mode to the transmission mode. Some symbols at the time of switching from DL to UL in a subframe may be configured to GP.

MTC (Machine Type Communication)

MTC is a form of data communication including one or more machines and may be applied to Machine-to-Machine (M2M) or Internet-of-Things (IoT). Here, a machine means an object that does not require direct human manipulation or intervention. For example, a machine includes a smart meter equipped with a mobile communication module, a vending machine, a mobile terminal having an MTC function, and the like.

In 3GPP, MTC has been applied since release 10, and may be implemented to satisfy the criteria of low cost & low complexity, enhanced coverage, and low power consumption. For example, 3GPP Release 12 adds features for low-cost MTC devices, and a UE category 0 is defined for this purpose. A UE category is an index indicating how much data the UE can process in the communication modem. A UE of UE category 0 may reduce baseband/RF complexity by using a reduced peak data rate, half-duplex operation with relaxed radio frequency (RF) requirements, and a single receive antenna. In 3GPP Release 12, eMTC (enhanced MTC) was introduced, and the price and power consumption of the MTC terminal were further reduced by operating only at 1.08 MHz (i.e., 6 RBs), which is the minimum frequency bandwidth supported by legacy LTE.

In the following description, MTC may be used interchangeably with terms such as eMTC, LTE-M1/M2, BL/CE (Bandwidth reduced low complexity/coverage enhanced), non-BL UE (in enhanced coverage), NR MTC, enhanced BL/CE, etc., or other equivalent terms. In addition, the MTC terminal/device includes a terminal/device having an MTC function (e.g., a smart meter, a vending machine, a mobile terminal having an MTC function).

Figure 14:
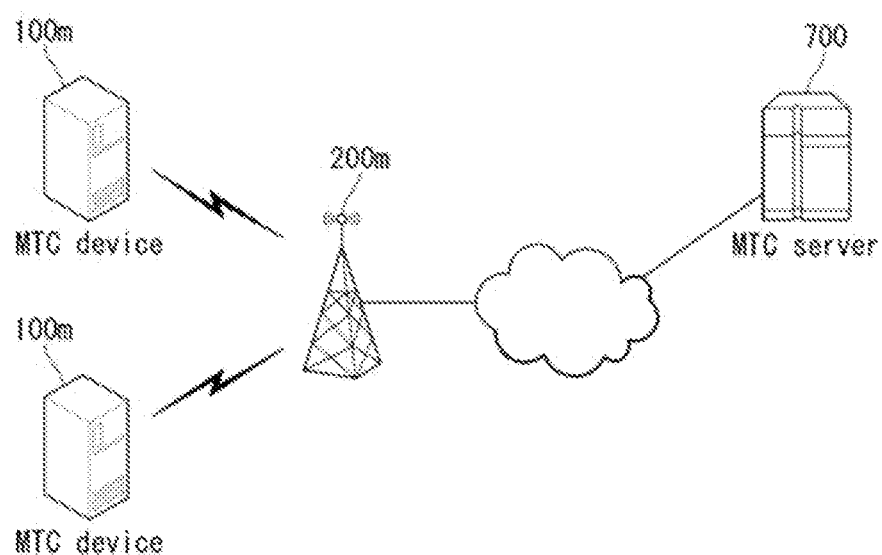
FIG. 14 is a diagram illustrating MTC communication to which the present disclosure may be applied.

FIG. 14 illustrates MTC communication to which the present disclosure may be applied.

Referring to FIG. 14, a MTC device 100m is a wireless device that provides MTC communication and may be fixed or mobile. For example, the MTC device 100m includes a smart meter equipped with a mobile communication module, a vending machine, and a mobile terminal having an MTC function. A base station 200m is connected to the MTC device 100m using a wireless access technology and may be connected to a MTC server 700 through a wired network. The MTC server 700 is connected to the MTC devices 100m and provides an MTC service to the MTC devices 100m. Services provided through MTC are different from existing communication services that involve human intervention, and various categories of services such as tracking, metering, payment, medical service, and remote control may be provided through MTC. For example, services such as meter reading, water level measurement, use of surveillance cameras, and inventory reporting of vending machines may be provided through MTC. MTC communication has a characteristic that an amount of transmitted data is small and uplink/downlink data transmission/reception occurs occasionally. Therefore, it is effective to lower the unit cost of the MTC device and reduce battery consumption in accordance with the low data rate. MTC devices generally have little mobility, and accordingly, MTC communication has a characteristic that the channel environment hardly changes.

Figure 15:
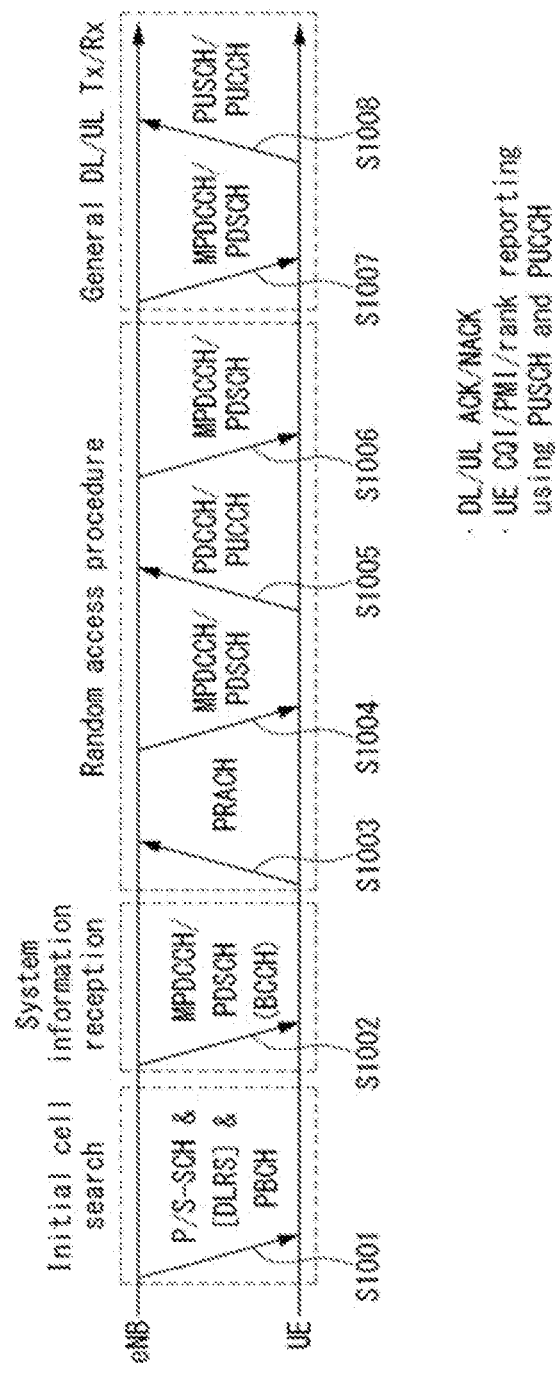
FIG. 15 is a diagram illustrating physical channels used in MTC and a general signal transmission using the physical channels, to which the present disclosure may be applied.

FIG. 15 illustrates physical channels used in MTC and a general signal transmission using the physical channels, to which the present disclosure may be applied.

In a wireless communication system, a MTC terminal receives information from a base station through a downlink (DL), and the terminal transmits information to the base station through an uplink (UL). The information transmitted and received between the base station and the UE includes data and various control information, and various physical channels exist according to the type/use of the information they transmit and receive.

In a state in which the power is turned off, the power is turned on again, or the UE newly entering the cell performs an initial cell search operation such as synchronizing with a base station (S1001). To this end, the UE synchronizes with the base station by receiving a PSS (Primary Synchronization Signal) and SSS (Secondary Synchronization Signal) from the base station and acquires information such as a cell ID (identifier). PSS/SSS used for the initial cell search operation of the UE may be PSS/SSS of legacy LTE. Thereafter, the MTC terminal may receive a PBCH (Physical Broadcast Channel) signal from the base station to obtain intra-cell broadcast information (S1002). Meanwhile, the UE may receive a DL RS (Downlink Reference Signal) in the initial cell search step to check the downlink channel state.

After completing the initial cell search, the UE may receive the MPDCCH (MTC PDCCH) and the PDSCH corresponding thereto to obtain more specific system information (S1102).

Thereafter, the UE may perform a random access procedure to complete access to the base station (S1003 to S1006). Specifically, the UE may transmit a preamble through a Physical Random Access Channel (PRACH) (S1003), and receive a Random Access Response (RAR) for the preamble through a PDCCH and a corresponding PDSCH (S1004). Thereafter, the UE may transmit a Physical Uplink Shared Channel (PUSCH) by using the scheduling information in the RAR (S1005) and may perform a contention resolution procedure such as the PDCCH and the corresponding PDSCH (S1006).

After performing the procedures as described above, the UE may subsequently receive the MPDCCH signal and/or the PDSCH signal (S1107) and transmit a physical uplink shared channel (PUSCH) signal and/or the physical uplink control channel (S1108) as a general uplink/downlink signal transmission procedure. Control information transmitted by the UE to the base station is collectively referred to as uplink control information (UCI). UCI includes HARQ ACK/

NACK (Hybrid Automatic Repeat and request Acknowledgement/Negative-ACK), SR (Scheduling Request), CSI (Channel State Information) etc. CSI includes a Channel Quality Indicator (CQI), a Precoding Matrix Indicator (PMI), and a Rank Indication (RI), etc.

FIG. 16 illustrates cell coverage enhancement in MTC to which the present disclosure may be applied.

In order to extend the cell coverage (or, coverage enhancement, CE) of a base station for the MTC (100m), various cell coverage extension techniques are discussed. For example, for cell coverage extension, a base station/UE may transmit one physical channel/signal over a plurality of occasions (a bundle of physical channels). In the bundle duration, the physical channel/signal may be repeatedly transmitted according to a pre-defined rule. The receiving device may increase the decoding success rate of the physical channel/signal by decoding part or all of the physical channel/signal bundle. Here, occasion may mean a resource (e.g., time/frequency) through which a physical channel/signal can be transmitted/received. Occasions for physical channels/signals may include subframes, slots, or sets of symbols in a time domain. Here, the symbol set may consist of one or more consecutive OFDM-based symbols. OFDM-based symbols may include OFDM(A) symbols, DFT-s-OFDM(A) (=SC-FDM(A)) symbols. Occasions for physical channels/signals may include frequency bands, RB sets in a frequency domain. For example, PBCH, PRACH, MPDCCH, PDSCH, PUCCH and PUSCH may be repeatedly transmitted.

Figure 17:
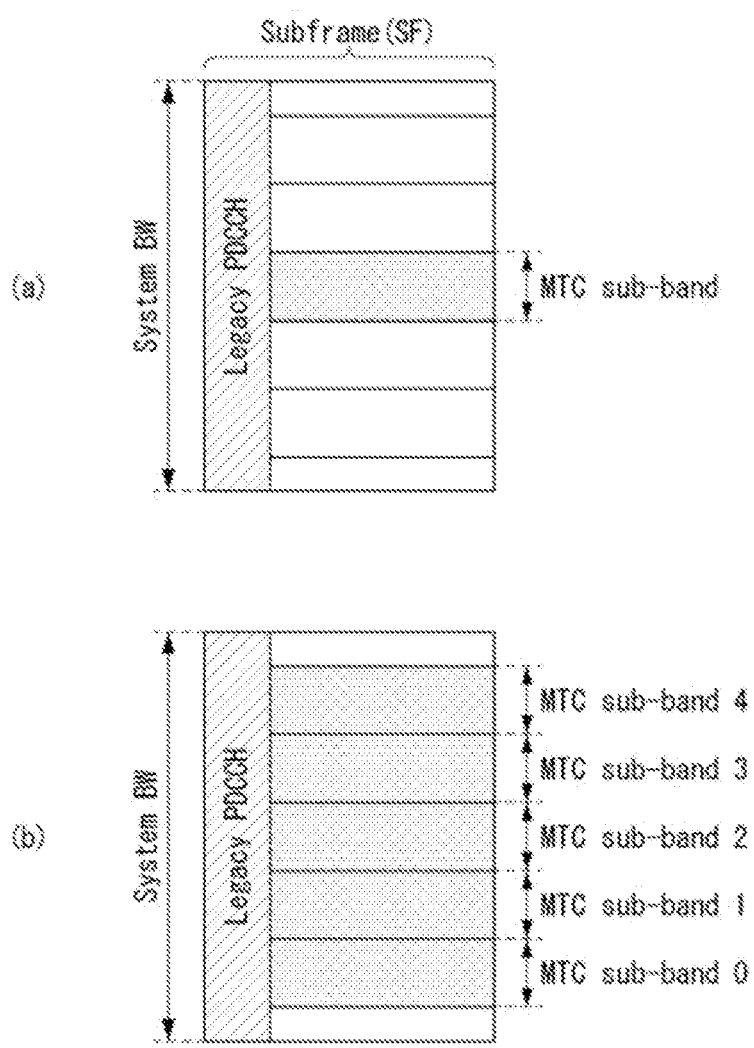
FIG. 17 is a diagram illustrating a signal bandwidth for MTC to which the present disclosure may be applied.

FIG. 17 illustrates signal bandwidth for MTC to which the present disclosure may be applied.

Referring to FIG. 17, as a method for lowering the unit price of the MTC terminal, MTC may operate only on a specific band (or, channel band) of a system bandwidth of a cell regardless of the system bandwidth of the cell (hereinafter, MTC subband or narrowband, NB). For example, the uplink/downlink operation of the MTC terminal may be performed only in the 1.08 MHz frequency band. 1.08 MHz corresponds to six consecutive PRBs (Physical Resource Block) in the LTE system and is defined to follow the same cell search and random access procedure as the LTE terminal. FIG. C4 (a) illustrates an embodiment in which the MTC subband is configured in the center of the cell (e.g., center 6 PRBs). FIG. C4(b) illustrates an embodiment in which a plurality of MTC subbands are configured in a cell. The plurality of MTC subbands may be configured continuously/discontinuously in the frequency domain. Physical channels/signals for MTC may be transmitted/received in one MTC subband. In the NR system, the MTC subband may be defined in consideration of a frequency range and subcarrier spacing (SCS). For example, in the NR system, the size of the MTC subband may be defined as X consecutive PRBs (i.e., 0.18*X*(2^u) MHz bandwidth) (see Table A4 for u). Here, X may be defined as 20 according to the size of a Synchronization Signal/Physical Broadcast Channel (SS/PBCH) block. In the NR system, the MTC may operate in at least one BWP (Bandwidth Part). Here, a plurality of MTC subbands may be configured in the BWP.

Figure 18:
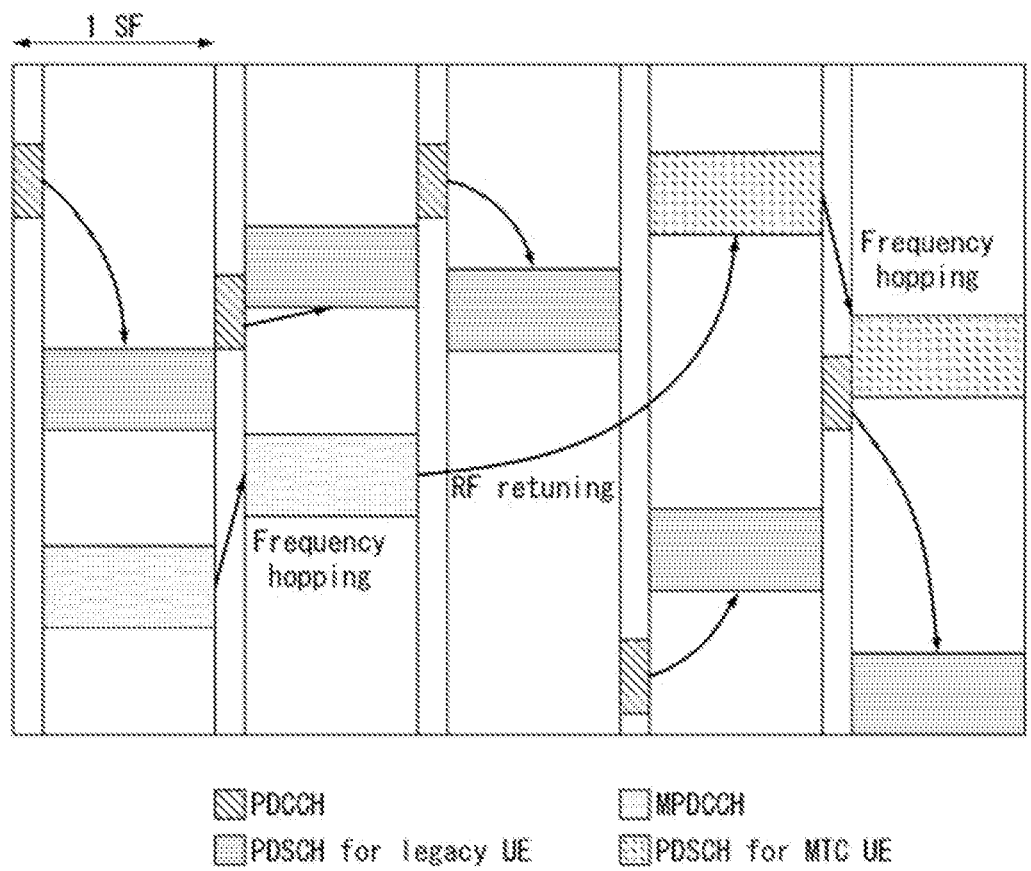
FIG. 18 is a diagram illustrating scheduling in legacy LTE and MTC, to which the present disclosure may be applied.

FIG. 18 illustrates scheduling in MTC and legacy LTE to which the present disclosure may be applied.

Referring to FIG. 18, in legacy LTE, PDSCH may be scheduled using PDCCH. Specifically, the PDCCH may be transmitted in the first N OFDM symbols in a subframe (N=1~3) and the PDSCH scheduled by the PDCCH is transmitted in the same subframe. Meanwhile, in MTC, the PDSCH is scheduled using the MPDCCH. Accordingly, the MTC terminal may monitor MPDCCH candidates in a search space within the subframe. Here, monitoring includes blind decoding of MPDCCH candidates. The MPDCCH transmits DCI, and DCI includes uplink or downlink scheduling information. The MPDCCH is multiplexed with PDSCH and FDM in a subframe. The MPDCCH is repeatedly transmitted in a maximum of 256 subframes, and the DCI transmitted by the MPDCCH includes information on the number of repetitions of the MPDCCH. In case of downlink scheduling, when repeated transmission of the MPDCCH ends in subframe #N, transmission of the PDSCH scheduled by the MPDCCH starts in subframe #N+2. The PDSCH may be repeatedly transmitted in up to 2048 subframes. The MPDCCH and the PDSCH may be transmitted in different MTC subbands. Accordingly, the MTC terminal may perform radio frequency (RF) retuning for PDSCH reception after MPDCCH reception. In case of uplink scheduling, when repeated transmission of the MPDCCH ends in subframe #N, transmission of the PUSCH scheduled by the MPDCCH starts in subframe #N+4. When repetitive transmission is applied to a physical channel, frequency hopping is supported between different MTC subbands by RF retuning. For example, when the PDSCH is repeatedly transmitted in 32 subframes, in the first 16 subframes, the PDSCH may be transmitted in the first MTC subband, and in the remaining 16 subframes, the PDSCH may be transmitted in the second MTC subband. The MTC operates in a half-duplex mode. The HARQ retransmission of MTC is adaptive and asynchronous.

NB-IoT (Narrowband Internet of Things)

NB-IoT refers to a narrowband Internet of Things technology that supports a low-power wide area network through an existing wireless communication system (e.g., LTE, NR). In addition, NB-IoT may refer to a system for supporting low complexity and low power consumption through a narrowband. Since the NB-IoT system uses OFDM parameters such as subcarrier spacing (SCS) the same as the existing system, there is no need to separately allocate an additional band for the NB-IoT system. For example, one PRB of the existing system band may be allocated for NB-IoT. Since the NB-IoT terminal recognizes a single PRB (single PRB) as each carrier, the PRB and the carrier in the description of the NB-IoT may be interpreted as the same meaning.

Hereinafter, the description of NB-IoT will be mainly described when applied to the existing LTE system, but the following description may be extended and applied to next-generation systems (e.g., NR systems, etc.). In addition, in the present disclosure, the content related to NB-IoT may be extended and applied to MTC oriented for a similar technical purpose (e.g., low-power, low-cost, coverage improvement, etc.). In addition, NB-IoT may be replaced with other equivalent terms such as NB-LTE, NB-IoT enhancement, enhanced NB-IoT, further enhanced NB-IoT, NB-NR, and the like.

Figure 19:
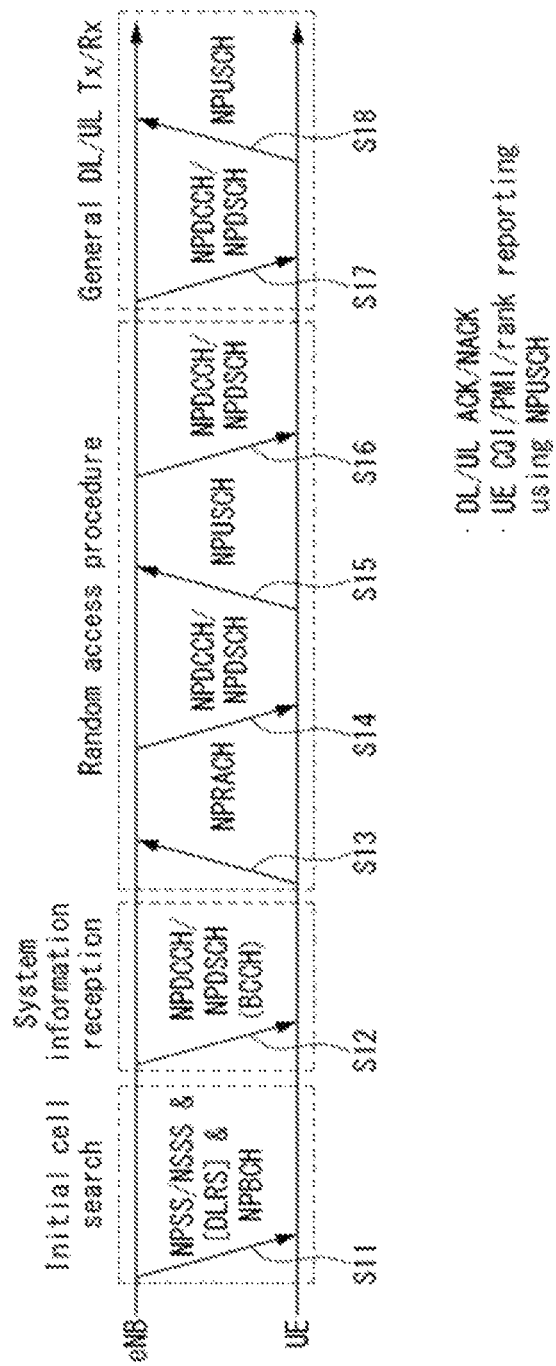
FIG. 19 is a diagram illustrating physical channels used in NB-IoT and a general signal transmission using the physical channels, to which the present disclosure may be applied.

FIG. 19 illustrates physical channels used in NB-IoT and general signal transmission using the physical channels to which the present disclosure may be applied.

In a wireless communication system, a UE receives information through a downlink (DL) from a base station, and a UE transmits information through an uplink (UL) to the base station. The information transmitted and received between a base station and a terminal includes data and various control information, and various physical channels exist according to the type/use of the information they transmit and receive.

In a state in which the power is turned off, the power is turned on again, or a UE newly entering a cell performs an initial cell search operation such as synchronizing with the base station (S11). To this end, the UE synchronizes with the base station by receiving NPSS (Narrowband Primary Synchronization Signal) and NSSS (Narrowband Secondary Synchronization Signal) from the base station and acquires information such as a cell ID (identifier). Thereafter, the UE may receive an NPBCH (Narrowband Physical Broadcast Channel) signal from the base station to obtain intra-cell broadcast information (S12). Meanwhile, the UE may receive a DL RS (Downlink Reference Signal) in the initial cell search step to check the downlink channel state.

After completing the initial cell search, the UE may receive a narrowband PDCCH (NPDCCH) and a narrowband PDSCH (NPDSCH) corresponding thereto to obtain more specific system information (S12).

Thereafter, the UE may perform a random access procedure (Random Access Procedure) to complete access to the base station (S13~S16). Specifically, the UE may transmit the preamble through a narrowband physical random access channel (NPRACH) (S13), and receive a random access response (RAR) for the preamble through the NPDCCH and the corresponding NPDSCH (S14). Thereafter, the UE may transmit a Narrowband Physical Uplink Shared Channel (NPUSCH) using the scheduling information in the RAR (S15) and perform a contention resolution procedure such as the NPDCCH and the corresponding NPDSCH (S16).

After performing the procedure as described above, the UE may subsequently perform NPDCCH signal and/or NPDSCH signal reception (S17) and NPUSCH transmission (S18) as a general uplink/downlink signal transmission procedure. Control information transmitted by the UE to the base station is collectively referred to as uplink control information (UCI). UCI includes HARQ ACK/NACK (Hybrid Automatic Repeat and request Acknowledgment/Negative-ACK), SR (Scheduling Request), CSI (Channel State Information), and the like. CSI includes a Channel Quality Indicator (CQI), a Precoding Matrix Indicator (PMI), and a Rank Indication (RI). In NB-IoT, UCI is transmitted through NPUSCH. According to a request/instruction of a network (e.g., a base station), the UE may periodically, aperiodically, or semi-persistently transmit the UCI through the NPUSCH.

Figure 20:
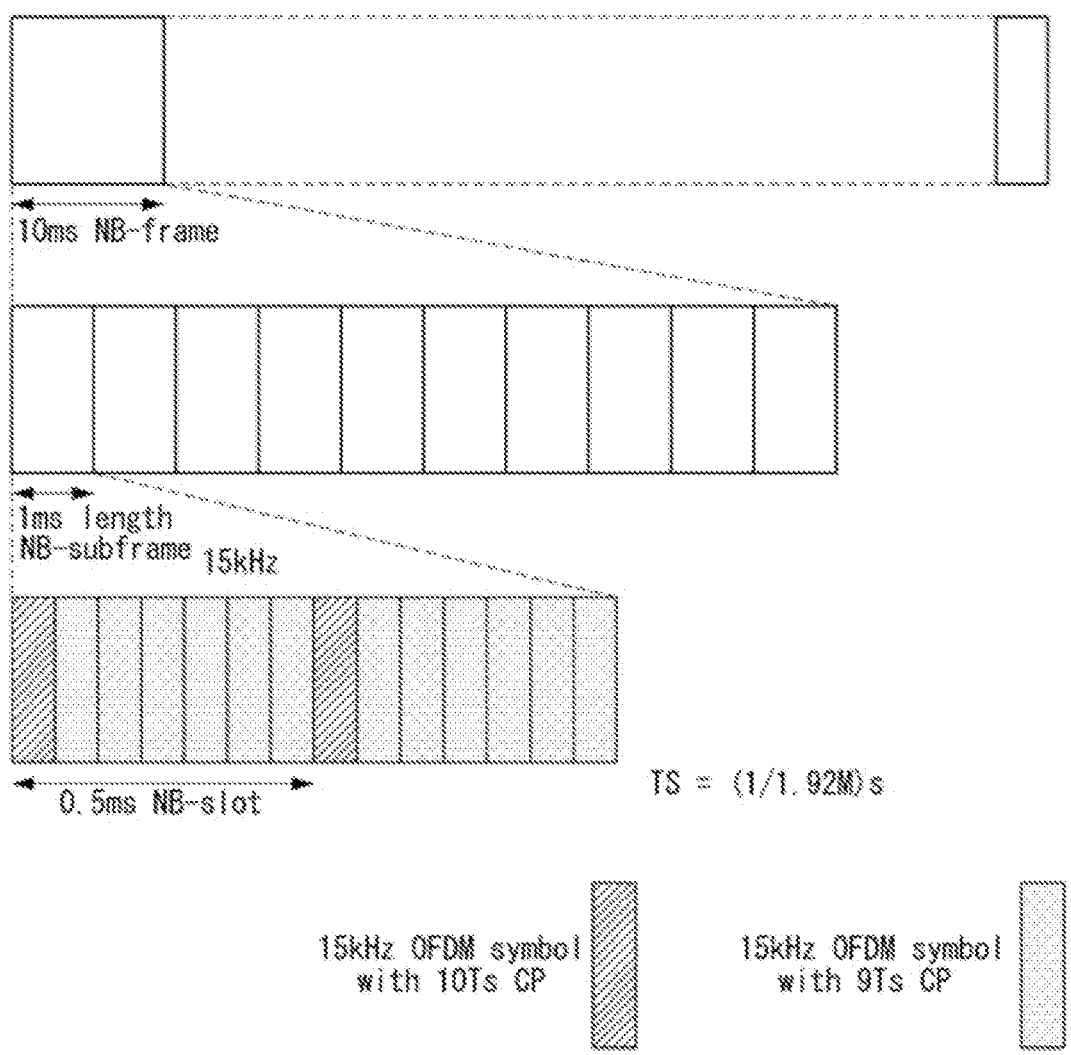
FIG. 20 is a diagram illustrating a frame structure when a subcarrier spacing is 15 kHz, to which the present disclosure may be applied.
Figure 21:
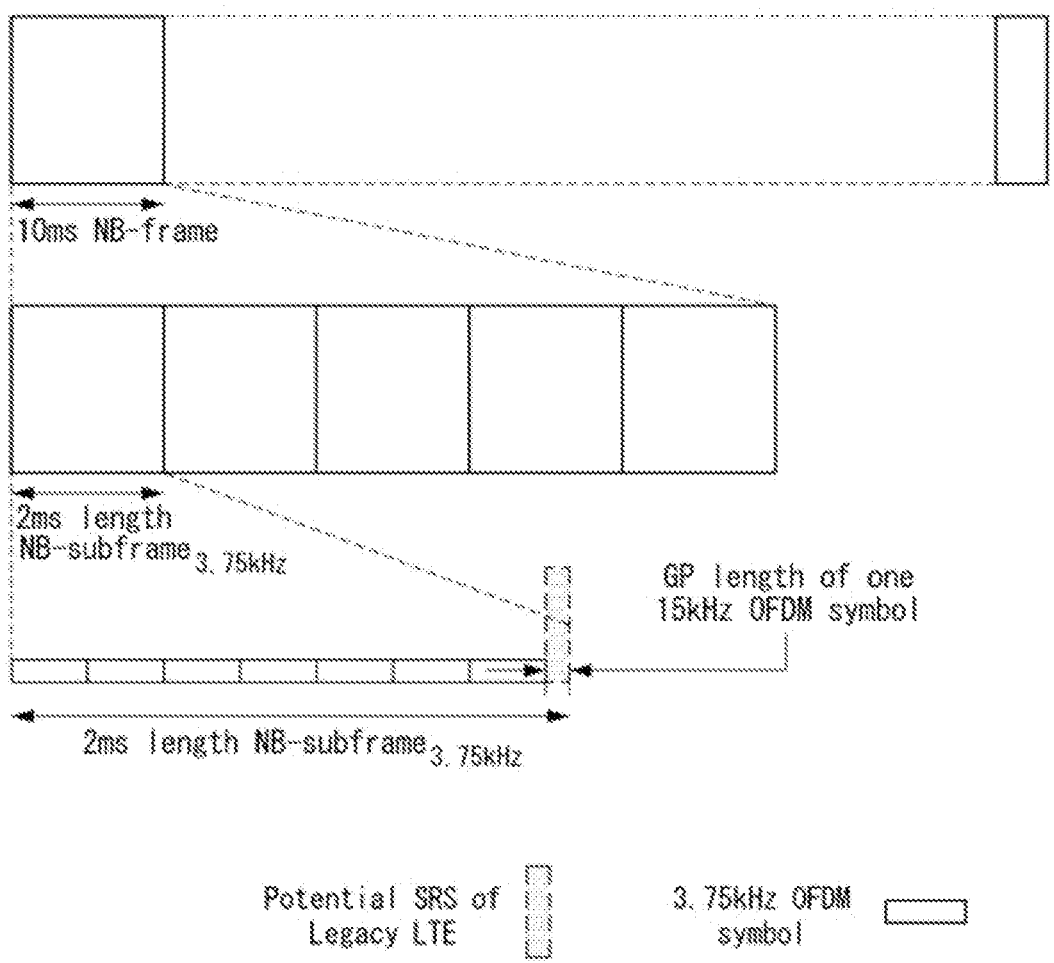
FIG. 21 is a diagram illustrating a frame structure when a subcarrier spacing is 3.75 kHz, to which the present disclosure may be applied.

The NB-IoT frame structure may be configured differently according to the subcarrier spacing (SCS). FIG. 20 illustrates a frame structure when the subcarrier spacing to which the present disclosure may be applied is 15 kHz, and FIG. 21 illustrates a frame structure when the subcarrier spacing to which the present disclosure may be applied is 3.75 kHz. The frame structure of FIG. 20 may be used in downlink/uplink, and the frame structure of FIG. 21 may be used only in uplink.

Referring to FIG. 20, the NB-IoT frame structure for the 15 kHz subcarrier interval may be configured to be the same as the frame structure of the legacy system (i.e., the LTE system). That is, a 10 ms NB-IoT frame may include 10 1 ms NB-IoT subframes, and a 1 ms NB-IoT subframe may include two 0.5 ms NB-IoT slots. Each 0.5 ms NB-IoT slot may contain 7 symbols. The 15 kHz subcarrier spacing may be applied to both downlink and uplink. The symbols include OFDMA symbols in downlink and SC-FDMA symbols in uplink. In the frame structure of FIG. D2, the system band is 1.08 MHz and is defined by 12 subcarriers. The 15 kHz subcarrier interval is applied to both the downlink and the uplink, and since orthogonality with the LTE system is guaranteed, coexistence with the LTE system may be smooth.

Meanwhile, referring to FIG. 21, when the subcarrier interval is 3.75 kHz, the 10 ms NB-IoT frame includes 2 ms 5 NB-IoT subframes, and the 2 ms NB-IoT subframe includes 7 symbols and one GP (Guard Period) symbol. The 2 ms NB-IoT subframe may be expressed as an NB-IoT slot or an NB-IoT resource unit (RU). Here, the symbol may include an SC-FDMA symbol. In the frame structure of FIG. D3, the system band is 1.08 MHz and is defined by 48 subcarriers. The 3.75 kHz subcarrier interval is applied only to the uplink, and the orthogonality with the LTE system is broken, and performance degradation may occur due to interference.

The figure illustrates an NB-IoT frame structure based on an LTE system frame structure, and the illustrated NB-IoT frame structure may be extended and applied to a next-generation system (e.g., an NR system). For example, in the frame structure of FIG. 20, the subframe interval may be replaced with the subframe interval of Table 4.

FIG. 22 illustrates three operation modes of NB-IoT. Specifically, FIG. 22(a) illustrates an in-band system, FIG. 22(b) illustrates a guard-band system, and FIG. 22(c) illustrates a stand-alone system. Here, the in-band system may be expressed as an in-band mode, the guard-band system may be expressed as a guard-band mode, and the stand-alone system may be expressed as a stand-alone mode. For convenience, the NB-IoT operation mode is described based on the LTE band, but the LTE band may be replaced with a band of another system (e.g., an NR system band).

The in-band mode refers to an operation mode for performing NB-IoT within the (legacy) LTE band. In the in-band mode, some resource blocks of the LTE system carrier may be allocated for NB-IoT. For example, in the in-band mode, a specific 1 RB (i.e., PRB) in the LTE band may be allocated for NB-IoT. The in-band mode may be operated in a structure in which NB-IoT coexists within the LTE band. The guard-band mode refers to an operation mode for performing NB-IoT in a space reserved for the guard-band of the (legacy) LTE band. Therefore, in the guard-band mode, the guard-band of the LTE carrier that is not used as a resource block in the LTE system may be allocated for NB-IoT. The (legacy) LTE band may have a guard-band of at least 100 kHz at the end of each LTE band. The stand-alone mode refers to an operation mode for performing NB-IoT in a frequency band configured independently from a (legacy) LTE band. For example, in the stand-alone mode, a frequency band (e.g., a GSM carrier reallocated in the future) used in a GSM EDGE Radio Access Network (GERAN) may be allocated for NB-IoT.

The NB-IoT terminal searches for an anchor carrier in units of 100 kHz for initial synchronization, and the center frequency of the anchor carrier in in-band and guard-band should be located within ±7.5 kHz from the 100 kHz channel raster. In addition, 6 PRBs among the LTE PRBs are not allocated to NB-IoT. Therefore, the anchor carrier may be located only in a specific PRB.

Figure 23:
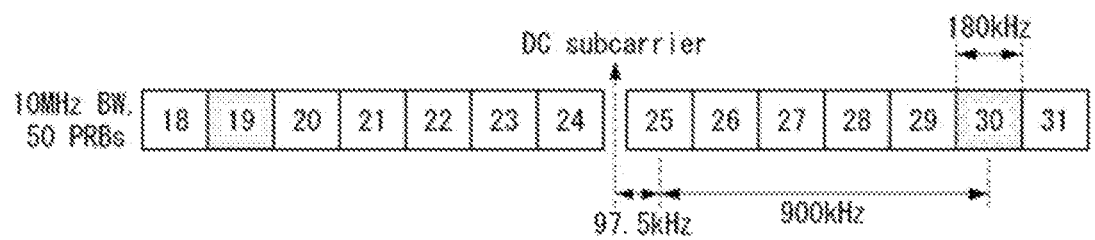
FIG. 23 is a diagram illustrating a deployment of an in-band anchor carrier in LTE bandwidth 10 MHz, to which the present disclosure may be applied.

FIG. 23 illustrates deployment of an in-band anchor carrier in LTE bandwidth 10 MHz to which the present disclosure may be applied.

Referring to FIG. 23, DC (Direct Current) subcarrier is positioned in a channel raster. Since the center frequency interval between adjacent PRBs is 180 kHz, PRB indices 4, 9, 14, 19, 30, 35, 40, 45 have center frequency at ±2.5 kH from the channel raster. Similarly, the center frequency of a PRB suitable as an anchor carrier in an LTE bandwidth of 20 MHz is positioned at ±2.5 kHz from the channel raster, and the center frequency of a PRB suitable as an anchor carrier in LTE bandwidths of 3 MHZ, 5 MHZ, and 15 MHz is positioned at ±7.5 kHz from the channel raster.

For a guard-band mode, the PRB immediately adjacent to the edge PRB of LTE at bandwidths of 10 MHz and 20 MHz has a center frequency at ±2.5 kHz from the channel raster. In case of bandwidths of 3 MHZ, 5 MHz, and 15 MHz, the center frequency of the anchor carrier may be positioned at ±7.5 kHz from the channel raster by using the guard frequency band corresponding to three subcarriers from the edge PRB.

Anchor carriers in stand-alone mode may be aligned to a 100 kHz channel raster, and any GSM carrier including DC carriers may be utilized as NB-IoT anchor carriers.

NB-IoT supports multi-carrier, and combinations of in-band+in-band, in-band+guard-band, guard band+guard-band, stand-alone+stand-alone may be used.

Physical channels such as Narrowband Physical Broadcast Channel (NPBCH), Narrowband Physical Downlink Shared Channel (NPDSCH), and Narrowband Physical Downlink Control Channel (NPDCCH) are provided in NB-IoT downlink. Physical signals such as Narrowband Primary Synchronization Signal (NPSS), Narrowband Secondary Synchronization Signal (NSSS) and Narrowband Reference Signal (NRS) are provided in NB-IoT downlink.

A NPBCH delivers the MIB-NB (Master Information Block-Narrowband), which is the minimum system information required for the NB-IoT terminal to access the system, to the terminal. The NPBCH signal can be transmitted a total of 8 times to improve coverage. The transport block size (TBS) of the MIB-NB is 34 bits and is newly updated every 640 ms TTI period. The MIB-NB includes information such as an operation mode, a System Frame Number (SFN), Hyper-SFN, the number of CRS (Cell-specific Reference Signal) ports, and a channel raster offset.

A NPSS consists of a ZC (Zadoff-Chu) sequence with a sequence length of 11 and a root index of 5.

$$d_l(n) = S(l) \cdot e^{-j\frac{\pi u n(n+1)}{11}}, n = 0, 1, \ldots, 10 \quad \text{[Equation 1]}$$

Here, S(1) for OFDM symbol index 1 may be defined as shown in Table 6.

TABLE 6

| Cyclic prefix length | S(3), . . . , S(13) |
|---|---|
| Normal | 1  1  1  1  −1  −1  1  1  1  −1  1 |

A NSSS is composed of a combination of a ZC sequence with a sequence length of 131 and a binary scrambling sequence such as a Hadamard sequence. The NSSS indicates the PCID through the combination of the sequences to the NB-IoT terminals in the cell.

The NASS may be generated according to the following equation.

$$d(n) = b_q(m)e^{-j2\pi\theta_f n}e^{-j\frac{\pi u n'(n'+1)}{131}} \quad \text{[Equation 2]}$$

Here, variables applied to Equation 2 may be defined as follow.

$$n = 0, 1, \ldots, 131 \quad \text{[Equation 3]}$$
$$n' = n \bmod 131$$
$$m = n \bmod 128$$
$$u = N_{ID}^{Ncell} \bmod 126 + 3$$
$$q = \left\lfloor \frac{N_{ID}^{Ncell}}{126} \right\rfloor$$

Here, a binary sequence bq(m) is defined as shown in Table 7, b0(m)~b3(m) correspond to columns 1, 32, 64, and 128 of the 128th order Hadamard matrix, respectively. A cyclic shift θf for the frame number nf may be defined as in Equation (4).

TABLE 7

| q | $b_q(0), \ldots, b_q(127)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 −1 −1 1 −1 1 1 −1 −1 1 1 −1 1 −1 −1 1 −1 1 1 −1 1 −1 −1 1 1 −1 −1 1 −1 1 1 −1 1 −1 −1 1 −1 1 1 −1 −1 1 1 −1 1 −1 −1 1 1 −1 −1 1 −1 1 1 −1 −1 1 1 −1 1 −1 −1 1 1 −1 −1 1 −1 1 1 −1 −1 1 1 −1 1 −1 −1 1 −1 1 1 −1 1 −1 −1 1 1 −1 −1 1 −1 1 1 −1 1 −1 −1 1 −1 1 1 −1 −1 1 1 −1 1 −1 −1 1 1 −1 −1 1 −1 1 1 −1 −1 1 1 −1 1 −1 −1 1 1 −1] |
| 2 | [1 −1 −1 1 −1 1 1 −1 −1 1 1 −1 1 −1 −1 1 1 −1 −1 1 −1 1 1 −1 −1 1 1 −1 1 −1 −1 1 1 −1 −1 1 −1 1 1 −1 −1 1 1 −1 1 −1 −1 1 1 −1 −1 1 −1 1 1 −1 −1 1 1 −1 1 −1 −1 1 1 −1 −1 1 −1 1 1 −1 −1 1 1 −1 1 −1 −1 1 1 −1 −1 1 −1 1 1 −1 −1 1 1 −1 1 −1 −1 1 1 −1 −1 1 −1 1 1 −1 −1 1 1 −1 1 −1 −1 1 1 −1 −1 1 −1 1 1 −1 −1 1 1 −1 1 −1 −1 1] |
| 3 | [1 −1 −1 1 −1 1 1 −1 1 1 −1 1 −1 −1 1 −1 1 1 −1 −1 1 1 −1 1 −1 −1 1 1 −1 −1 1 −1 1 1 −1 −1 1 1 −1 1 −1 −1 1 1 −1 −1 1 −1 1 1 −1 −1 1 1 −1 1 −1 −1 1 −1 1 1 −1 1 −1 −1 1 1 −1 −1 1 −1 1 1 −1 −1 1 1 −1 1 −1 −1 1 −1 1 1 −1 1 −1 −1 1 1 −1 −1 1 −1 1 1 −1 −1 1 1 −1 1 −1 −1 1 1 −1 −1 1 −1 1 1 −1 −1 1 1 −1 1 −1 −1 1 1 −1] |

$$\theta_f = \frac{33}{132}(n_f/2) \bmod 4 \qquad \text{[Equation 4]}$$

Here, the n_f refers to radio frame number. The mod refers to modulo function.

A downlink physical channel/signal includes NPSS, NSSS, NPBCH, NRS, NPDCCH, and NPDSCH.

Figure 24:
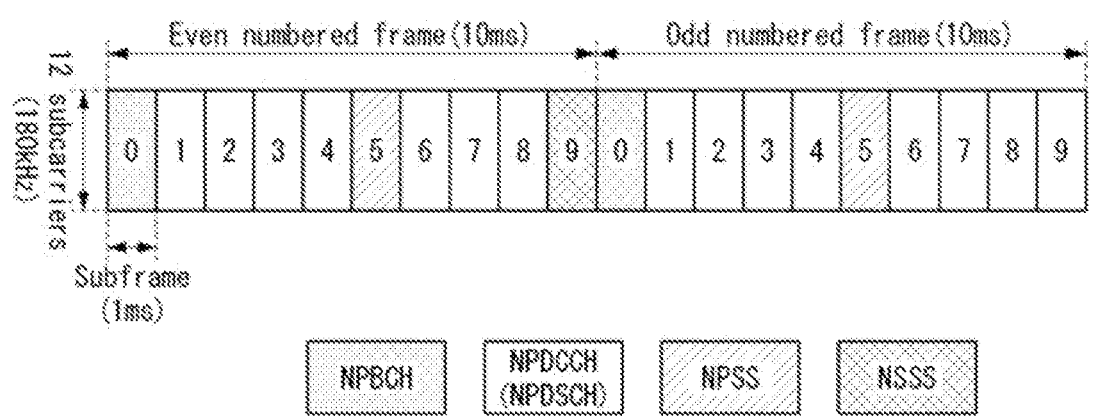
FIG. 24 is a diagram illustrating transmission of a NB-IoT downlink physical channel/signal in FDD LTE system to which the present disclosure may be applied.

FIG. 24 illustrates transmission of an NB-IoT downlink physical channel/signal in an FDD LTE system that may be applied to the present disclosure. Downlink physical channel/signal is transmitted through one PRB and supports 15 kHz subcarrier spacing/multi-tone transmission.

Referring to FIG. 24, NPSS is transmitted in the 6th subframe of every frame, and NSSS is transmitted in the last (eg, 10th) subframe of every even frame. A UE may acquire frequency, symbol, and frame synchronization using synchronization signals (NPSS, NSSS) and search for 504 physical cell IDs (PCIDs) (i.e., base station IDs). NPBCH is transmitted in the first subframe of every frame and carries NB-MIB. NRS is provided as a reference signal for downlink physical channel demodulation and is generated in the same way as LTE. However, NB-PCID (Physical Cell ID) (or NCell ID, NB-IoT base station ID) is used as an initialization value for NRS sequence generation. NRS is transmitted through one or two antenna ports. NPDCCH and NPDSCH may be transmitted in the remaining subframes except for NPSS/NSSS/NPBCH. NPDCCH and NPDSCH cannot be transmitted together in the same subframe. NPDCCH carries DCI, and DCI supports three types of DCI formats. DCI format N0 includes Narrowband Physical Uplink Shared Channel (NPUSCH) scheduling information, and DCI formats N1 and N2 include NPDSCH scheduling information. The NPDCCH can be repeatedly transmitted up to 2048 times to improve coverage. The NPDSCH is used to transmit data (e.g., TB) of a transport channel such as a Downlink-Shared Channel (DL-SCH) and a Paging Channel (PCH). The maximum TBS is 680 bits, and repeated transmission is possible up to 2048 times to improve coverage.

The uplink physical channel includes a narrowband physical random access channel (NPRACH) and an NPUSCH, and supports single-tone transmission and multi-tone transmission. Single-tone transmission is supported for subcarrier spacing of 3.5 kHz and 15 kHz, and multi-tone transmission is supported only for 15 kHz subcarrier spacing.

Figure 25:
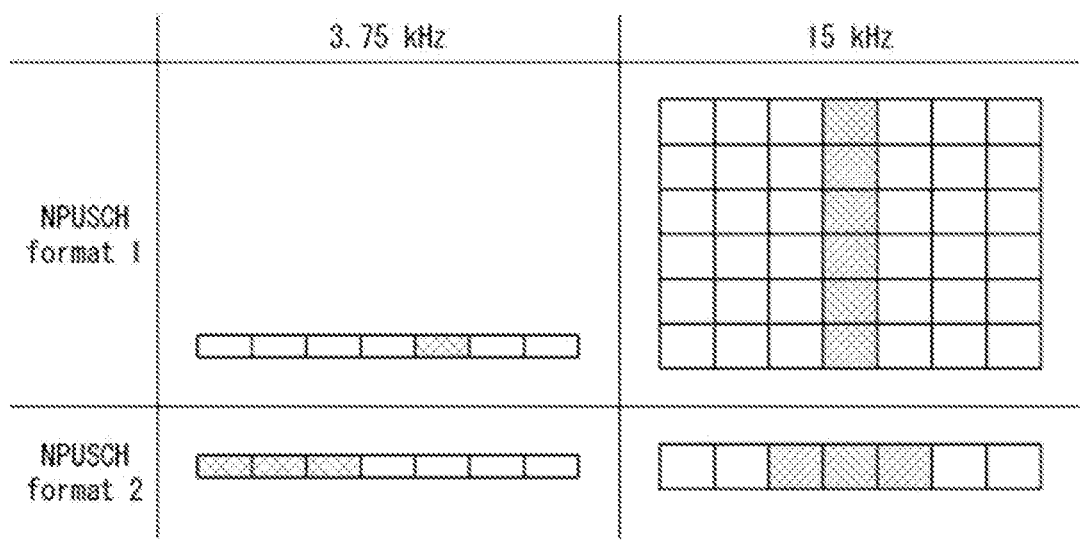
FIG. 25 is a diagram illustrating NPUSCH format to which the present disclosure may be applied.

FIG. 25 illustrates a NPUSCH format to which the present disclosure may be applied.

NPUSCH supports two formats. NPUSCH format 1 is used for UL-SCH transmission, and the maximum TBS is 1000 bits. NPUSCH format 2 is used to transmit uplink control information such as HARQ ACK signaling. NPUSCH format 1 supports single-/multi-tone transmission, and NPUSCH format 2 supports only single-tone transmission. In case of single-tone transmission, pi/2-BPSK (Binary Phase Shift Keying) and pi/4-QPSK (Quadrature Phase Shift Keying) are used to reduce the Peat-to-Average Power Ratio (PAPR). In the NPUSCH, the number of slots occupied by one RU (Resource Unit) may be different according to resource allocation. RU represents the smallest resource unit to which a TB is mapped and consists of NULsymb*NULslots consecutive SC-FDMA symbols in a time domain and NRUsc consecutive subcarriers in a frequency domain. Here, $N^{UL}_{symb}$ represents the number of SC-FDMA symbols in a slot, $N^{UL}_{slots}$ represents the number of slots, and NRUsc represents the number of subcarriers constituting an RU.

FIG. 8 illustrates a configuration of an RU according to a NPUSCH format and subcarrier spacing. In case of TDD, the supported NPUSCH format and SCS vary according to the uplink-downlink configuration. Uplink-downlink configuration may refer to Table 1.

TABLE 8

| NPUSCH format | Subcarrier spacing | Supported uplink-downlink configurations | $N^R_{Usc}$ | $N^{UL}_{slots}$ | $N^{UL}_{symb}$ |
|---|---|---|---|---|---|
| 1 | 3.75 kHz | 1, 4 | 1 | 16 | 7 |
|   | 15 kHz | 1, 2, 3, 4, 5 | 1 | 16 |   |
|   |   |   | 3 | 8 |   |
|   |   |   | 6 | 4 |   |
|   |   |   | 12 | 2 |   |
| 2 | 3.75 kHz | 1, 4 | 1 | 4 |   |
|   | 15 kHz | 1, 2, 3, 4, 5 | 1 | 4 |   |

Scheduling information for UL-SCH data (e.g., UL-SCH TB) transmission is included in a DCI format n0 and the DCI format N0 is transmitted through a NPDCCH. The DCI format N0 includes information about the start time of the NPUSCH, the number of repetitions, the number of RUs used for TB transmission, the number of subcarriers and resource locations in a frequency domain, MCS, and the like.

Referring to FIG. 25, DMRS is transmitted in one or three SC-FDMA symbols per slot according to the NPUSCH format. DMRS is multiplexed with data (e.g., TB, UCI) and is transmitted only in RUs including data transmission.

Figure 26:
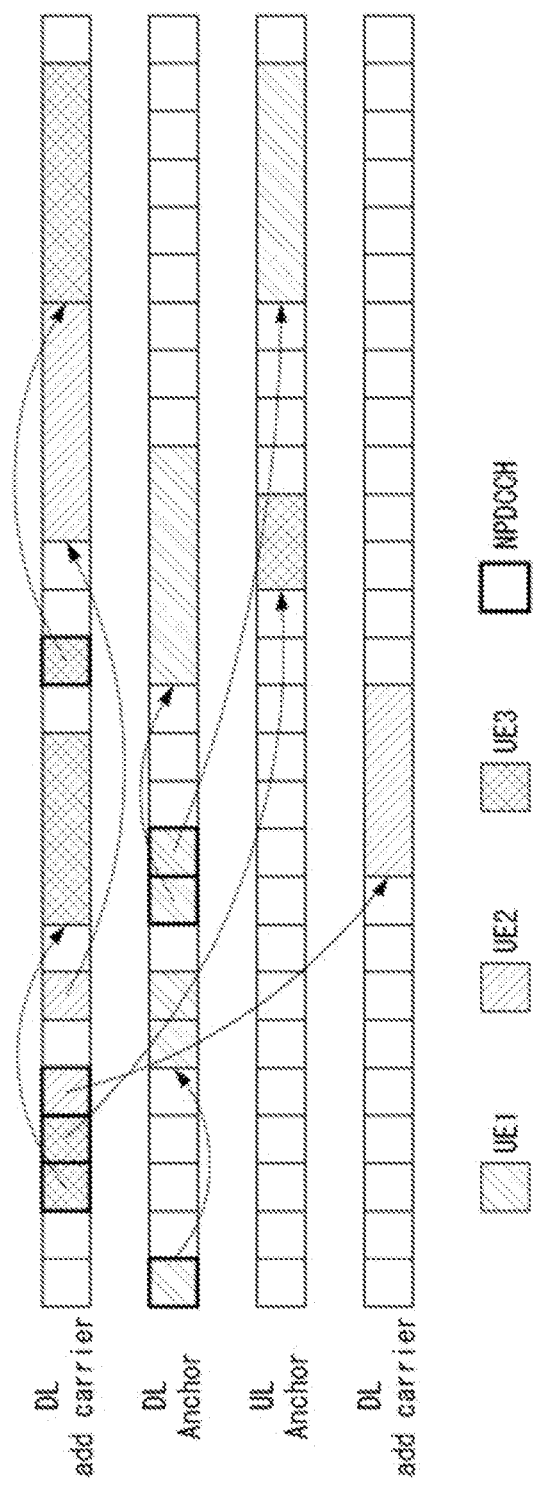
FIG. 26 is a diagram illustrating an operation when a multi-carrier is configured in FDD NB-IoT, to which the present disclosure may be applied.

FIG. 26 illustrates an operation when a multi-carrier is configured in FDD NB-IoT to which the present disclosure may be applied.

In FDD NB-IoT, a DL/UL anchor-carrier is basically configured, and a DL (and UL) non-anchor carrier may be additionally configured. RRCConnectionReconfiguration may include information about the non-anchor carrier. When the DL non-anchor carrier is configured (DL add carrier), the UE receives data only on the DL non-anchor carrier. On the other hand, synchronization signals (NPSS, NSSS), broadcast signals (MIB, SIB), and paging signals are provided only in the anchor-carrier. If the DL non-anchor carrier is configured, the UE listens only to the DL non-anchor carrier while in the RRC_CONNECTED state. Similarly, when the UL non-anchor carrier is configured (UL add carrier), the UE transmits data only on the UL non-anchor carrier, and simultaneous transmission in the UL non-anchor carrier and the UL anchor-carrier is not allowed. Upon transition to the RRC_IDLE state, the UE returns to the anchor-carrier.

FIG. 26 illustrates a case in which only an anchor-carrier is configured for UE1, a DL/UL non-anchor carrier is additionally configured for UE2, and a DL non-anchor carrier is additionally configured for UE3. Accordingly, carriers through which data is transmitted/received in each UE are as follows.

UE 1: data transmission (DL anchor-carrier), data reception (UL anchor-carrier)

UE 2: data transmission (DL non-anchor-carrier), data transmission (UL non-anchor-carrier)

UE 3: data reception (DL non-anchor-carrier), data transmission (UL anchor-carrier)

The NB-IoT terminal cannot transmit and receive at the same time and transmission/reception operation is limited to one band, respectively. Therefore, even if a multi-carrier is configured, the UE requires only one transmission/reception chain of 180 kHz band.

In the present disclosure, a method of performing uplink transmission through a preconfigured uplink resource (PUR) will be described. The uplink transmission through PUR may be expressed as PUR transmission.

The PUR described in the present disclosure refers to a resource in which a resource for uplink transmission is configured (allocated) from a base station in advance when the UE is in the RRC_IDLE state or the RRC_CONNECTED state. And it may include an operation and procedure for performing uplink transmission using the configured resource. Here, the operation of performing uplink transmission may be performed in the RRC_IDLE state. When the UE is in the RRC_IDLE state, the uplink transmission (i.e., PUR transmission) may be performed when timing advance (TA) is valid.

When the UE is in the RRC_IDLE and starts performing the uplink transmission, the transmission procedure can be simplified compared to the method of performing the uplink transmission through a process of transitioning to the general RRC_CONNECTED state, so that it may be effective in terms of efficient uplink transmission and terminal power consumption.

In other words, since the UE can perform uplink transmission in the RRC_IDLE state using a preconfigured PUR resource without performing uplink transmission by transitioning to the RRC_CONNECTED state, so that efficient uplink transmission is possible.

In the present disclosure, the above-described method for supporting uplink transmission through the PUR, TA update for uplink transmission through the PUR, a method/procedure of validating whether the TA is valid, and HARQ operation/procedure after uplink transmission, etc. will be described.

Hereinafter, a serving-cell described in the present disclosure may refer to a cell in which a PUR is configured or a cell to receive a PUR. In addition, the PUR described in the present disclosure may refer to a PUR (shared PUR) that is configured identically to a plurality of UEs and is shared among the plurality of UEs, or a dedicated PUR (PUR) configured only to a specific UE without contention between UEs, or both the shared PUR and the dedicated PUR.

During PUR transmission, the PUR configuration parameter(s) for configuring PUR transmission needs to be updated according to the environment of the UE or the needs of a base station/network. The update of these PUR configuration parameter(s) may be made using layer 1 (L1) signaling (i.e., DCI), or may be made through Medium Access Control Element (MAC CE) or RRC (Radio Resource Control) signaling. In the present disclosure, a method in which the PUR configuration parameter(s) is updated through L1 signaling (i.e., DCI) is described as 'L1 PUR configuration update'. In addition, it is obvious that the method/operation/embodiments described in the present can be applied to various systems as well as the LTE MTC system and the NB-IoT system.

Method for Supporting Uplink Transmission Through PUR and Procedure Therefor

TA Update Mechanism

In order to perform uplink transmission through PUR, the UE must be in the RRC_IDLE state, and in addition, the TA must be in a valid state. In other words, since PUR transmission may be performed when the TA is valid, the TA must be periodically updated to maintain a valid state. Accordingly, a method for supporting TA update will be described.

In the present disclosure, TA may be described as information related to TA or may be described as a TA value.

(Method 1)

There may be a method in which the base station updates TA-related information and feeds back the updated TA-related information to the UE. Here, in order for the base station to acquire TA-related information and support it, uplink transmission of the UE is required. Specifically, the UE may i) perform uplink transmission through the PUR duration or ii) perform uplink transmission through a duration other than the PUR duration.

First, i) an embodiment in which a UE performs uplink transmission through the PUR period will be described. That is, i) is a method in which a base station acquires TA-related information based on uplink transmission transmitted through the PUR duration.

Even in case of the UE in which uplink skipping in PUR is supported, uplink transmission may be performed on all PURs regardless of whether data is included in uplink transmission to obtain (periodic) TA-related information of the base station. Alternatively, even when the UE performs an uplink skipping operation (UL skipping) to receive a command for releasing a PUR resource from the base station, the UE may be configured to receive and/or detect a response channel promised to monitor after PUR transmission. Here, the command for releasing the PUR resource transmitted by the base station to the UE may be indirectly indicated by a specific state or a specific value of the TA feedback value.

In the present disclosure, the meaning of UL skipping in PUR or skipping of a specific resource of the PUR may be interpreted the same as the meaning that the UE drops uplink transmission in the PUR or a specific resource of PUR.

Here, the drop may mean that the UE does not perform uplink transmission or may mean puncturing or rate-matching the PUR or a specific resource of PUR.

In addition, in case of a UE supporting UL skipping in PUR, the UE may perform UL skipping, and a base station may not use the skipped PUR to obtain information related to TA. Here, counter values such as a TA alignment timer for TA validation are determined to be invalid for a skipped PUR and may be held without being counted.

Meanwhile, on the contrary, when valid TA-related information is not secured, the counter value may be increased.

The meaning of hold described in the present disclosure may mean that a value does not change.

In addition, in the present disclosure, the expression TA validation means a procedure for determining whether the TA is valid, and other expressions can be used as long as they are interpreted the same as the corresponding meaning.

Apart from the above-described TA alignment timer, a separate parameter indicating how many times the UE can use the PUR or for which time duration the UE can use the PUR may be defined. Here, the parameter may be defined and configured irrespective of whether the PUR is skipped. In other words, it may be determined that the PUR is no longer valid for the UE after a specific time duration based on the parameter configured by the UE, and the PUR may be determined to be released.

Next, ii) a case in which the UE performs uplink transmission through a duration other than the PUR duration will be described.

In case ii), for example, the base station may configure/instruct the terminal to perform uplink transmission in order to acquire TA-related information in a duration other than the PUR duration. Here, the uplink transmission for obtaining TA-related information may be a response/transmission (e.g., RACH procedure) according to the request of the base station. Here, the request of the base station may be indicated on the PUR response channel, and when the requested transmission resource is the PUR, the UE may transmit an uplink through the PUR. Alternatively, the uplink transmission performed by the UE may be periodic uplink transmission using a resource configured in advance or received higher layer configuration from the base station. Here, the upper layer configuration may include information on the transmission period and duration.

As described above, when the base station updates TA-related information and feeds it back to the UE, the base station may transmit TA-related information (or a command) to the UE through MAC CE. The base station may configure MAC CE including TA-related information (or command) and feed it back to the UE. Here, the TA-related information may be included in NPDCCH/MPDCCH/PDCCH, which is a PUR response channel, or (N) PDSCH scheduled from NPDCCH/MPDCCH/PDCCH. And the TA value may be limited to a value of a specific sign (similar to the initial access process) or a delta value/information having a positive (+) value or a negative (−) value. Here, the delta value/information may be used for the purpose of adjusting the transmission time of the UE forward/backward.

In addition, the TA value may be determined according to a criterion through which a channel for detecting the TA value by the base station, that is, an uplink channel transmitted by the UE to the base station is transmitted. Specifically, it may be determined depending on whether the uplink channel is transmitted based on the downlink transmission previously received by the UE or the uplink channel is transmitted based on a TA value previously obtained by the UE (i.e., TA information obtained before the time when the UE performs uplink transmission). For example, when the UE receives the first TA after transmitting (N) PRACH before receiving the TA, when (N) PRACH transmission is performed based on the downlink synchronization time, the TA value may be interpreted only as a specific sign (e.g., pulling forward the transmission time on the UE side).

TA Update Mechanism—Using Modified or Shortened RACH

When the UE, in the RRC_IDLE state, determines that the TA is invalid, the UE may perform TA update in a method similar to a legacy RACH procedure using UE-specific RNTI configured to be used or retained in RRC_IDLE state or/and UE ID or/and 1 bit flag and the like. In other words, TA update may be performed using the TA command in MAC RAR information within the MAC response. Here, after the step of the base station transmitting msg4 to the UE, the RRC connection process between the base station and the UE may be stopped without progressing. That is, in the msg4 contention resolution confirmation step, only the step of checking the UE-specific RNTI and/or UE ID or transmitting the ACK after checking may be performed.

In addition, when there is data included in PUR transmission, an operation described later may be additionally performed. After the TA update is performed and completed using the above-described modified RACH or reduced RACH procedure, the UE may perform PUR transmission on the earliest PUR starting after the X-th subframe (or slot or ms (millisecond)). The earliest PUR starting after the X-th subframe (or slot) may be interpreted as having the same meaning as the first PUR available after the X-th subframe. Here, the time when the TA update is completed is the last subframe (or slot) constituting the PDSCH that is msg4 transmitted by the base station to the UE, or the last subframe constituting the PUCCH or PUSCH in which the UE transmits ACK for msg4 (or slots). The X-th subframe may be a specific value or a value configured through a higher layer. In addition, the X-th subframe may be a time required for the UE to prepare for PUR transmission or may be used for monitoring feedback additionally received from the base station after the UE transmits an ACK for msg4.

In addition, when data included in PUR transmission exists, if the above-described modified RACH or reduced RACH procedure is performed, the UE may assume that the TA value is valid and perform PUR transmission without additional TA value verification. For example, the UE ID may be IMSI (International Mobile Subscriber Identity), which is a unique number of the UE, and the 1 bit flag may be a flag having the meaning of 'TA update only' or 'no RRC connection setup. Here, the UE ID may be used for contention resolution and the 1-bit flag may be a flag instructing not to monitor an additional PDCCH search space (Search Space, SS) in order for the UE to enter the RRC_CONNECTED state after step msg4 or ACK transmission for msg4.

In addition, the UE-specific RNTI used or held by the UE in the RRC_IDLE state may be a PUR-RNTI configured to be used, by the UE, for PUR transmission/reception in the RRC_IDLE state and for PUR SS monitoring. Here, the PUR-RNTI may be configured by the base station to the UE. When the PUR-RNTI is a UE-specific RNTI, the UE performing the RACH procedure may transmit the PUR-RNTI to the base station in step msg3. In addition, the UE may confirm that the PUR-RNTI has been successfully transmitted to the base station by checking its own PUR-RNTI in step msg4. In order for the base station to transmit the PUR-RNTI to the UE in step msg4, the base station may perform CRC scrambling the PDCCH scheduling the PDSCH which is msg4 using PUR-RNTI or inform the UE of the PUR-RNTI through a message transmitted through the PDSCH which is msg4 and scrambling using the codeword(s) PUR-RNTI of the PDSCH which is msg4.

Therefore, the UE may check whether the PDCCH scheduling the PDSCH which is msg4 is CRC scrambled using which RNTI. In other words, the UE may detect the PUR-RNTI through the PDCCH that is CRC scrambled with PUR-RNTI or check the PUR-RNTI included in message transmitted to PDSCH which is msg4 or detect PUR-RNTI used for scrambling codeword(s) of the PDSCH which is msg4. The UE may check that contention is resolved by checking/detecting the PUR-RNTI and may instruct only the TA update by transmitting the PUR-RNTI to the base station. That is, in the method of performing TA update using PUR-RNTI, the PUR-RNTI (e.g., 16 bits) is transmitted instead of transmitting the above-described UE ID (e.g., 40 bits) and/or a 1-bit flag through msg, so that there is an effect that the same operation can be performed using a small bit size. Here, in the PUR transmission, each UE receives and transmits a dedicated PUR setting, and thus, the PUR-RNTI at this time may be a dedicated PUR-RNTI.

TA Update Mechanism—Method Using Non-Contention Random Access Based on PDCCH Order (Method Using Contention-Free Random Access Based on PDCCH Order)

A base station may instruct a UE to TA update through non-contention random access using the PDCCH order. Here, the base station may use another separate RNTI instead of the C-RNTI for scheduling PUSCH/PDSCH through msg2 which is a random access response, despite the RRC_IDLE state. Here, the separate RNTI may be an RTNI (UE specifically configured RNTI) for a specific UE in order to perform PDCCH monitoring and/or uplink transmission in the RRC_IDLE state. For example, the separate RNTI may be a PUR-RNTI configured for uplink transmission using PUR and downlink PDCCH monitoring.

When the base station instructs the non-contention random access through the PDCCH order to the UE in the RRC_IDLE state monitoring the PDCCH, the UE may use the above-described separate RNTI (e.g., PUR-RNTI) for PDCCH monitoring for the PDCCH order reception and PUSCH/PDSCH scheduling after msg2 which is RAR. After transmitting msg2 which is RAR, the base station may check that the UE has normally received msg2 (RAR MAC CE) by checking the PUR-RNTI applied to the scrambling codeword(s) of the PUSCH transmitted by the UE. Additionally, the UE may also check whether TA adjustment has been successfully applied. TA adjustment described herein may be used in the same sense as TA update.

As described herein, "operation for TA update" may be an operation including a method using a modified RACH or reduced RACH-based method, and a method using non-contention random access based on a PDCCH order.

All or part of the PUR included in the duration for performing the TA update operation may be skipped when the TA is invalid. A PUR skipped for TA update may not be counted as a skipping event for PUR release regardless of whether data exists. In other words, the PUR skipping counter value for PUR cancellation may be maintained without being increased.

As another example, if a specific initial value is configured in the PUR skipping counter, and when a skipping event occurs, the PUR is designed to release as the counter value becomes 0 while counting down the initial value, the UE may maintain the counter value only according to the counter initial value (e.g., the initial value=1) or when the PUR skipping counter becomes less than or equal to a specific value (e.g., specific value=1). After performing the TA update operation, if the TA value is valid and the UE can perform PUR transmission, because the process of releasing the PUR and receiving a new PUR-related configuration from the base station is disadvantageous in terms of power consumption, the TA value is maintained.

Meanwhile, if PUR skipping is not allowed, the UE may allow, as an exception, to drop or skip PUR transmission in the PUR while the procedure for updating the TA is performed, and after the TA update procedure ends, the UE may allow PUR transmission by assuming that the PUR is available.

The initial PRACH power used for the TA update operation may be configured as the initial PRACH transmission power correction value based on the uplink transmission power correction value updated in relation to the recent PUR transmission.

In addition, when the UE newly acquires a TA for PUR transmission through TA update, a subsequent PUR transmission power correction value may be configured based on the uplink transmission power correction value recently used in the operation for the TA update.

Optimization of Bit Size of TA Related Parameters for TA Update

In relation to optimizing the bit size of the TA-related parameters to be described later, a TA command MAC CE range, a bit size, a Reference Signal Received Power (RSRP) change threshold, and the like may be considered.

The bit size of TA-related information transmitted downlink to the conventional TA MAC CE is designed to include the TA range supported by the Extended-Cyclic Prefix (E-CP) and is applied regardless of the CP mode. Here, the CP mode means whether it is Normal-Cyclic Prefix (N-CP) or E-CP. When the base station may transmit TA-related information to the UE through a downlink channel (i.e., PDSCH or PDCCH) in order to update TA-related information, for example, DCI content may be transmitted through PDCCH. Here, in order not to increase the bit size of DCI or to increase the transmission success probability for the same transmission resource element (RE), the supported TA range may be limited to the TA range supported by the N-CP, and the TA and the bit size of related information may be configured based on the N-CP. For example, the TA command MAC CE range of +/−512 Ts is configured based on the E-CP. Therefore, 6 bits are needed to support +/−512 Ts=+/−32*16 Ts, and 5 bits are needed to support +/−160 Ts=+/−10*16 Ts in N-CP.

Alternatively, the bit size of the TA-related parameter may be configured differently according to the CP mode (N-CP, E-CP).

Since the cell size supported by N-CP is smaller than that of E-CP, in case of N-CP, the range of the RSRP change threshold for TA validation may be applied differently (e.g., small) unlike the case of E-CP. In addition, the range of the RSRP value for TA validation may vary according to the CP mode, and the range or bit size of the TA-related parameters that may vary depending on the CP mode may be respectively defined according to the CP mode and may be configured to the UE through RRC. And the UE may apply it differently according to the CP mode, or interpret the values actually meant by each field of the TA related parameters according to the CP mode differently. Here, parameters related to TA may be RSRP change value range/threshold value, etc.

Also, when the UE performs PUR transmission, the base station may transmit a parameter related to TA for TA update through a downlink channel or may configure/transmit a parameter value for TA validation.

TA Validation Mechanism

In order to perform uplink transmission through the PUR, the UE must continuously determine whether the TA is valid. Here, the operation and procedure for determining whether the TA is valid may be referred to as TA validation. For TA validation, the amount of change in the serving-cell RSRP, TA alignment timer, etc. may be used.

Method of Measuring/Determining Serving-Cell RSRP Variation for TA Validation

Hereinafter, a method for measuring/determining the serving-cell RSRP variation for TA validation will be described.

For example, the serving-cell RSRP variation may be determined as the difference between the RSRP values measured at point A and point B. Here, point A may be a reference point, and point B may mean a test point. In other words, the serving-cell RSRP value measured at point A may mean a reference RSRP value, and the serving-cell RSRP value measured at point B may mean a test RSRP value. Hereinafter, a method for determining the point A will be described.

Method of Determining Point A

Point A may be a point at which the UE most recently measured the serving-cell RSRP based on the time of receiving the PUR configuration. Alternatively, the base station may measure the RSRP at a time when a specific time has elapsed after PUR setting, and may instruct the UE to configure the RSRP measurement point as the point A. Here, the reference RSRP value may be fixed to the RSRP value measured at the above-described time point or may be updated at a specific time point.

When the UE supports the update of the reference RSRP value, the reference RSRP value may be i) the most recent serving-cell RSRP value measured by the UE based on the time of the TA update, when the TA update is supported, or ii) the serving-cell RSRP value most recently measured by the UE based on the changed time point, when it is supported for the base station to (dynamically) change the point A to a specific time point to the UE using a specific control signal. In ii), the control signal used by the base station to (dynamically) change point A may be a specific signal defined or designated for the purpose of change, 1 bit update flag in DCI received from the channel/signal that the UE monitors after PUR transmission, or a form of one state indicated by a specific field.

Method of Determining Point B

Point B may be a point at which the UE most recently measured the serving-cell RSRP based on the transmission time of the PUR transmitted by the base station. Here, the UE may be configured to measure the serving-cell RSRP value before a specific time from every PUR transmission time or may be configured not to specify an additional serving-cell RSRP value for PUR transmission.

When the UE is configured to measure the serving-cell RSRP value before a specific time from every PUR transmission time, the serving-cell RSRP value measured at point B may be a predetermined specific time based on the PUR transmission time performed by the UE. Here, when the UE supports UL skipping in PUR, the UE may be configured not to measure the serving-cell RSRP value before a specific time of PUR at which uplink skipping is performed in order to reduce unnecessary power consumption. Here, the reference value may be a serving-cell RSRP value measured before a specific time from the PUR transmission time transmitted by the most recent UE (without performing uplink skipping). Alternatively, it may be a serving-cell RSRP value most recently measured by the UE. Here, the reference value may be determined as the more recently measured value among 'serving-cell RSRP value measured before a specific time from the PUR transmission time transmitted by the most recent UE (without performing uplink skipping)' or 'the most recently measured serving-cell RSRP value by the UE (for satisfying the RRM requirement)'.

In addition, in order to prevent the performance degradation of TA validation due to aperiodic RSRP value measurement according to UL skipping in PUR, in case of UL skipping in PUR, the UE may be configured to measure the serving-cell RSRP value before a specific time from the PUR transmission time for uplink skipping. Here, the reference value may be a serving-cell RSRP value measured by the UE before a preconfigured specific time based on the PUR transmission time for uplink skipping.

Meanwhile, if the UE does not measure the additional serving-cell RSRP value for PUR transmission, the serving-cell RSRP value at point B may be the serving-cell RSRP value most recently measured by the UE (to satisfy the RRM requirement) based on the corresponding PUR transmission time.

In case of a UE that only performs RSRP measurement to satisfy the RRM requirement, the serving-cell RSRP variation value may be configured to be a smaller value than that of the other UE.

The above-described reference point (i.e., point A) is a reference point for measuring the reference RSRP. When the TA is updated through the L1 PUR configuration update, the point A may be determined according to a method to be described later.

(Method 1)

Method 1 is a method of updating the L1 PUR configuration update time point to the reference point (i.e., point A). Here, the L1 PUR configuration update time may be defined as when the TA is updated through higher layer signaling or L1 PUR configuration update.

Reference point when the reference RSRP value is measured (Point A) is updated when TA is updated either via higher layer signaling or via L1 PUR configuration update.

In case of method 1, if the UE fails to receive DCI, there may be ambiguity at the TA update time between the UE and the base station.

That is, if the base station instructs TA adjustment (update) through DCI, but the UE fails to receive the DCI, the UE may update the reference point based on the DCI transmission time, and the UE may refer to the TA update time before the DCI transmission time.

The base station then may perform a hypothesis test or blind detection etc. on the PUR transmission of the UE, check whether the L1 PUR configuration update is successful through this, and maintain or modify the reference point according to the check result. In other words, the base station may maintain or cancel the operation of updating the reference point assuming success of the L1 PUR configuration update.

Meanwhile, there may be a case where the UE may fail to receive DCI, and the base station may perform unexpected L1 PUR configuration update and update the reference point. Here, the UE and the base station have different reference points. Here, in order to solve the problem of having different reference points between the base station and the UE, the reference point between the base station and the UE may be updated only when the base station may check that the L1 PUR configuration update is successful. Here, a method for the base station to check whether the L1 PUR configuration update is successful may include the above-described hypothesis test or blind detection etc. Here, since the UE cannot recognize whether the base station has checked the L1 PUR configuration update, the base station may transmit L1 PUR configuration update confirmation information to the UE through DCI. Here, the confirmation information may be ACK information or the like.

(Method 2)

Method 2 is a method of not updating the L1 PUR configuration update time to the reference point (i.e., point A). In method 2, the latest TA update time may be defined as a time updated through higher layer signaling.

Reference point when the reference RSRP value is measured (Point A) is updated when TA is updated only via higher layer signaling, not via L1 PUR configuration update.

Here, the TA validation based on the TA alignment timer may be limited to being performed when the TA is configured or updated to a higher layer. L1 PUR configuration update may not be used for TA validation and may refer only to an operation of 'adjusting TA and UE transmission power' and 'updating a PUSCH repetition number' for efficient PUR transmission within a period in which the TA is valid.

When the UE performs an unexpected L1 PUR configuration update and updates the reference point because the UE fails to receive/detect DCI (false detection), the reference point (point A) recognized by the base station and the UE may be different from each other. Therefore, when the base station determines that the TA is invalid and since the UE can perform PUR transmission assuming that the TA is valid at the time when the UE expects to perform a fallback operation, L1 PUR configuration update may not be applied to TA validation.

In addition, the base station may use the PUR for other purposes and may not use/apply the L1 PUR configuration update for TA validation in order to avoid resource collision as described above.

TA Alignment Timer Management Method for TA Validation

For TA validation, a TA alignment timer may be operated in IDLE mode.

A TA alignment timer, which will be described later, may refer to a timer operating for TA validation in the IDLE mode, not the TA timer operating in the connected mode.

The TA alignment timer, after initializing (or, reset) at the time when TA is updated, may be a counter that sequentially increases according to a time domain unit or a counter that sequentially decreases after being initialized to a specific value. When the TA alignment timer value is greater than or equal to a specific value, the base station and/or the UE may determine that the TA is invalid. Similarly, when the TA alignment timer value is sequentially decreased after being reset to a specific value, if it is less than or equal to a preconfigured value (e.g., 0), the base station and/or the UE may determine that the TA is invalid.

Initialization of TA Alignment Timer

The initialization of the TA alignment timer may operate as follows.

The TA alignment timer is initialized based on the time of receiving the PUR setting. Here, the initialization value may be 0 or may be initialized by inheriting the TA timer value operating in the connected mode. Here, the meaning of inheritance may mean that the value of the TA timer counter operating in the connected mode is used as an initial value.

In addition, TA alignment timer may be updated at a specific time point.

When TA update is supported, the TA alignment timer may be initialized based on the TA update time, or the base station may (dynamically) initialize the TA timer at a specific time using a specific control signal.

A control signal that the base station may use to (dynamically) initialize the TA alignment timer at a specific time may be a specific signal defined or designated for the purpose of initialization, 1-bit update flag in DCI received from a channel/signal that the UE monitors after PUR transmission, or the form of one state indicated by a specific field.

The above-described TA alignment timer may be used to measure a difference between a current time point and a recent TA update time point and to determine that the TA is invalid if a difference is greater than or equal to a specific value. UE considers the TA as invalid if the (current time–time at last TA update)>the PUR Time Alignment Timer).

Such a TA alignment timer may be operated when the UE does not support or supports L1 PUR configuration update.

First, (1) when the UE does not support L1 PUR configuration update, the PUR TA alignment timer may operate as follows.

1-i) UE considers the TA as invalid if the (current time–time at last TA update)>the PUR Time Alignment Timer.)

Time at last TA update is updated when TA is updated via higher layer signaling.

Next, (2) when the UE supports the L1 PUR configuration update, the PUR TA alignment timer may operate in the following two ways.

2-i) First, there is a method of applying the L1 PUR configuration update to the PUR TA validation mechanism.

Among TA attributes, the TA validation criteria using the PUR TA alignment timer may be as follows. UE considers the TA as invalid if (current time-time at last TA update)>the PUR Time Alignment Timer). Here, last (recent) TA update time may be defined as follows. Time at last TA update is updated when TA is updated either via higher layer signaling or via L1 PUR configuration update. That is, it may be a time when the TA is updated through higher layer signaling or L1 PUR configuration update.

In the case of 2-i), if the UE fails to receive DCI, there may be ambiguity about the TA update time recognized by the UE and the base station. That is, if the base station instructs TA adjustment (update) through DCI but the UE fails to receive DCI, the base station may update the last TA update time based on the DCI transmission time, and the UE may refer to the TA update time before the DCI transmission time.

Afterwards, the base station may perform a hypothesis test or blind detection on the PUR transmission of the UE and may check whether the L1 PUR configuration update is successful through this, and maintain or correct the time at last TA update according to the confirmation result. In other words, the base station may maintain or cancel the operation of updating the last TA update time assuming success of the L1 PUR configuration update.

Meanwhile, there may be a case where the UE fails to receive DCI, so the base station may perform an unexpected L1 PUR configuration update and updates the last TA update time. Here, the UE and the base station have different last TA update time values. Here, in order to solve the problem of recognizing different values of the last TA update time between the base station and the UE, the update of the last TA update time between the base station and the UE may be performed only when the base station may confirm that the L1 PUR configuration update is successful. Here, a method for the base station to determine whether the L1 PUR configuration update is successful may include the above-described hypothesis test or blind detection.

Here, since the UE cannot recognize whether the base station has checked the L1 PUR configuration update, the base station may transmit L1 PUR configuration update confirmation information to the UE through DCI. Here, the confirmation information may be ACK information or the like.

2-ii) Next, there is a method in which the PUR configuration update is not applied to the PUR TA validation mechanism.

Here, the last (recent) TA update time may be defined as follows. Time at last TA update is updated when TA is updated only via higher layer signaling, not via L1 PUR configuration update. That is, the last TA update time may be a time when the TA is updated through higher layer signaling.

Here, TA validation based on the TA alignment timer is limited only when the TA is configured or updated through a higher layer. In addition, the L1 PUR configuration update may not be used for TA validation and refer to performing only the operation of adjusting TA and UE transmission power and updating the PUSCH repetition number for efficient PUR transmission within a period in which the TA is valid.

When the UE performs an unexpected L1 PUR configuration update and updates the last TA update time because the UE fails in DCI reception/detection (false detection), the TA update time recognized by the base station and the UE are different from each other. Therefore, since the base station determines that the TA is not valid and expects the UE assuming that the TA is valid to perform a fallback operation, the L1 PUR configuration update is not applied to the TA validation.

In addition, the base station may use the PUR for other purposes and may not use/apply the L1 PUR configuration update for TA validation in order to avoid resource collision as described above.

PUR Configuration

A plurality of parameters may be included in information previously configured by the base station to perform uplink transmission through PUR to the UE. Here, the information included in the parameters is as follows.

Specifically, the information included in the parameters may include information related to i) time domain resources including periodicity(s), ii) frequency domain resources, iii) transport block size (TBS(s)), iv) modulation and coding scheme (MCS(s)) and v) Search space for feedback monitoring in response to UL transmission in PUR, etc.

Additionally, information (or channel information) related to a channel for performing uplink transmission including Acknowledge/Negative Acknowledge (Ack/Nack, A/N) information etc., which is feedback information in response to a downlink channel transmitted by the base station to the UE, may be included. In other words, the UE may transmit the feedback for downlink transmission received from the base station to the base station, and information related to transmitting such feedback to the base station (e.g., information related to a channel for transmitting feedback, etc.) may be additionally included in the parameters. Here, the downlink channel transmitted by the base station to the UE may be a PDCCH/PDSCH transmitted by the base station to the UE after the UE's PUR transmission. Here, the PDSCH may include ACK/NACK information for PUR transmission through a higher layer or MAC CE for the above-described TA update. Meanwhile, there may be a case in which only the PDCCH is transmitted without PDSCH transmission. Here, ACK/NACK for PUR transmission may be included in the PDCCH. In other words, feedback information for PUR transmission may be included in the PDCCH/PDSCH.

The channel may be PUCCH, PUSCH, or narrowband PUSCH (NPUSCH) format 1 or NPUSCH format 2. The channel-related information may include a repetition number and the like, and when it is not an implicit PUCCH resource, a PUCCH time/frequency resource, etc. may be included. For example, the PUR configuration parameter may include information on an uplink channel (PUCCH/PUSCH) after PUR transmission of the UE as well as information related to PUR. Specifically, the PUCCH/PUSCH resource index and the like may be included.

In addition, since in LTE MTC, in CE mode A, LTE PUCCH format 1 series (1/1a/1b) and format 2 series (2/2a/2b) may be supported, and in CE mode B, LTE PUCCH format 1/1a may be supported, parameters related to formats supported by each mode may be included in the information related to the channel.

PUR Configuration Update

All or part of the above-mentioned parameter(s) may be updated or adapted in the following way after PUR transmission or during (re) transmission process, in order to adapt to a changed UE environment and network environment.

An embodiment of a procedure in which PUR configuration information (i.e., parameters) is updated at the UE side is as follows.

First, 1) the UE performs PUR transmission to the base station. In this case, PUR transmission may be performed on PUSCH.

And 2) the UE receives information related to downlink assignment (DL assignment) from the base station. Here, information related to downlink allocation may be received on an MPDCCH (MTC PDCCH).

Thereafter, 3) the UE may receive information related to PUR transmission (that is, PUR parameters) from the base station. Here, the information related to the PUR transmission may be received on the PDSCH, and the downlink allocation information may be used to receive the information related to the PUR transmission.

Then, 4) the UE transmits an ACK, which is feedback on information related to the PUR transmission, to the base station. Here, the ACK may be transmitted on the PUCCH.

5) After transmitting the ACK of 4) to the base station, the UE performs MPDCCH monitoring for a certain period. Here, the MPDCCH may be a channel for receiving information related to the PDSCH that is transmitted again when the base station fails to receive the ACK transmitted from the UE.

Here, the operation 5) may be, for example, not expecting to receive the MPDCCH or not monitoring the MPDCCH after the k-th subframe or the k-th slot. In other words, 5) the predetermined period for performing the operation may be from the time when the UE transmits the ACK to the k-th subframe or the k-th slot.

In addition, in operation 2), the UE may expect four situations: ACK, downlink allocation, NACK, and No ACK.

(i) ACK: This is a situation in which the base station receives the ACK, which is feedback for the PUR transmission transmitted in 1) through the MPDCCH. That is, the UE may interpret that the PUR transmission is successful, and the PUR parameter update is not performed (no PUR parameter update).

(ii) downlink allocation: when the UE receives information related to downlink allocation from the base station, the UE may recognize that the PUR transmission is successful, and in addition, may expect PDSCH scheduling for PUR parameter update and/or PUR release.

(iii) NACK: When the UE receives the NACK from the base station, the UE may recognize that the PUR transmission has failed and may expect a PUR retransmission instruction or PUR release. In addition, it may be expected to perform uplink transmission using legacy Early Data Transmission (EDT) or RACH.

(iv) No ACK: When the UE receives No ACK from the base station, the UE may recognize that the PUR transmission has failed and may expect a PUR retransmission instruction.

Here, the PUR retransmission may be performed in the same PUR duration or the next PUR duration through an automatic power ramp-up of the UE, an increase in the number of repetitions, or the like.

Power Control for PUR Transmission

As a method of controlling uplink transmission (PUR initial transmission) power for initial PUR transmission, there may be two methods described below.

(Method A) A method of applying a Transmission Power Control (TPC) accumulation mechanism during initial PUR transmissions. In other words, the transmission power for the PUR uplink transmission may be determined based on the transmission power value(s) of the previously performed PUR transmission(s).

(Method B) This is a method of resetting the TPC accumulation mechanism for every initial PUR transmission. In other words, the transmission power for the PUR uplink transmission may be determined regardless of the value of the transmission power value(s) of the previous PUR transmission(s). That is, whenever the UE performs PUR transmission, after resetting the TPC accumulation mechanism to determine transmission power for PUR transmission, PUR transmission may be performed based on the determined transmission power. Even if the UE does not receive a separate setting for the transmission power of the initial PUR transmission, the UE may initialize the TPC accumulation mechanism to determine the transmission power.

Here, one of the above-described methods A or B may be selected according to PUR transmission period in consideration of the PUR transmission characteristics.

For example, a certain threshold X of the PUR transmission period is configured, and if the PUR transmission period is greater than (or greater than or equal to) X, the method B may be applied. And the opposite case (when the transmission period is less than X), Proposal A may be applied.

If the PUR transmission period is large, the change in the channel environment and path loss during PUR transmissions is large, so that the power value applied during the previous PUR transmission cannot be referred to during the current PUR transmission. Therefore, if PUR transmission period is greater than threshold value, the method B is applied.

The threshold value X may be a subframe, a frame, or a hyper-frame unit, and may be a value set by the base station/network. For base station/network configuration, the threshold value X may be included in a PUR configuration parameter.

In addition, the base station/network may configure and transmit the PUR uplink transmission power control method (e.g., method A, method B) to be applied when the UE performs the initial PUR transmission to the UE, and even in this case, parameters related to PUR uplink transmission power control method configuration may be included in the PUR configuration parameter.

When the PUR is retransmitted, if the TPC field exists in UL grant downlink DCI for retransmission received by the UE as in the case where LTE long term evolution machine type communication coverage enhancement (MTC CE) mode A is applied, the PUR uplink transmission power may be controlled using the TPC field.

However, when LTE MTC CE mode B is applied, the TPC field may not exist in the UL grant downlink control information for retransmission received by the UE. Here, the following two methods for PUR uplink transmission power will be considered.

Two methods (i) a method in which the configured (maximum) uplink transmission power is applied to PUR uplink transmission power and ii) a method in which PUR uplink transmission power is increased by the configured ramping step value for every retransmission) will be considered.

The method i) is a method that may be applied to a UE in CE mode B and has an advantage that it can be simply applied. However, there is a problem that interference occurs between UEs/cells by retransmitting PURs at the maximum uplink transmission power even in adjacent neighboring UEs.

Since the method ii) increases the PUR uplink transmission power stepwise (gradually) and adjusts the transmission power increase width based on the ramping step set in the UE, when compared to the method i), the method ii) has relatively advantages in terms of interference.

The above-described ramping step and/or configuration information in the methods i) and ii) may be added to the PUR configuration parameter and configured to the UE by the base station/network. In other words, the PUR configuration parameters may be included in configuration information that the UE receives from the base station/network for PUR transmission.

Method for Supporting Contention-Free Shared PUR

A multi-user-multiple input multiple output (MU-MIMO) technique may be used to support contention-free PUR transmission between multiple UEs while sharing PUR time/frequency resources. Specifically, the base station may configure a cyclic shift (CS) value and/or an orthogonal cover code (OCC) or a combination of CS and OCC of the DMRS sequence in the PUR configuration to UE-specific or UE group-specific for MU-MIMO demodulation using orthogonal dedicated demodulation reference signal (DMRS).

The (i) CS and/or OCC or (ii) method of configuring a combination of CS and OCC may be RRC configured to a specific UE or configured to the UE using PUR (re-) activation DCI ((re-) activation) or DCI for UL grant for PUR (re-transmission)).

The base station may support contention-free PUR transmission by configuring different CS and/or OCC values to UEs sharing the PUR time/frequency resource.

DL/UL Grant and Explicit ACK/NACK Received in PUR SS

The UE may expect that the uplink grant and downlink allocation information are included in the downlink feedback for PUR transmission.

Here, the specific state of the uplink grant may be defined as explicit ACK and/or explicit NACK, and the specific state of the downlink grant may be defined as explicit ACK.

Explicit NACK may be used for the purpose of PUR or (dedicated PUR) release. Here, the New Data Indicator (NDI) of DCI including NACK information may always be reserved as 0 or 1 and may be used for the purpose of virtual cell-specific reference signal (CRS) or integrity check using an unverified combination in uplink resource (resource block) assignment/allocation and/or MCS field. Here, it may be configured to assume that the NDI value is always 0 or 1 for the initial PUR transmission. Explicit ACK alone may include only ACK information for PUR transmission (here, it may be transmitted as an uplink grant or a downlink grant), or explicit ACK may be transmitted through DCI long with downlink allocation information for scheduling (N) PDSCH. Here, whether the (N) PDSCH is actually scheduled together with the ACK information may be determined according to whether a verified combination is indicated in fields such as downlink resource (resource block) allocation and/or MCS field.

Method for Monitoring PUR Transmission and PUR Search Space (SS)

In this method, a PUR transmission of the UE and a monitoring method in the PUR SS will be described. SS may mean a time/frequency resource duration in which the UE performs PUR transmission and monitors to receive feedback information of the base station for the PUR transmission.

Hereinafter, 1) a monitoring method in a PUR SS that exists before the UE transmits the PUR, and 2) a monitoring method in a PUR SS that exists after the UE transmits the PUR will be described below.

1) Monitoring Method of the UE in PUR SS Before PUR Transmission Time

The term "before the PUR transmission time" described in the present disclosure means an area independent of the area in which the feedback information of the base station for PUR transmission transmitted before the PUR transmission time that the UE currently intends to transmit is received.

If the base station does not use the reserved PUR resource due to a scheduling issue (off) or causes the UE to skip PUR transmission, the UE may be configured to monitor the PUR SS existing in the specific period before PUR transmission (e.g., from X ms to Y ms). In other words, the UE may receive the configuration information by monitoring the specific duration. Here, the configuration information may include information instructing to turn off the PUR resource or to skip the PUR transmission.

As described above, the PUR skipped by the configuration from the base station may not be regarded as a PUR skipping event for PUR release.

2) Monitoring Method of UE in PUR SS Existing after PUR Transmission Time

Monitoring of the UE in the PUR SS that exists after the PUR transmission time may be divided into i) when the UE skips PUR transmission, and ii) when the UE performs PUR transmission.

i) the case of skipping PUR transmission

Since the base station may transmit PDSCH scheduling information to the PUR SS, the UE may be configured to monitor the PUR SS for a specific period regardless of whether the PUR transmission is skipped.

In addition, the base station may instruct the UE to perform a TA update operation through a PDCCH order in the PUR SS configured to monitor. When any one of explicit NACK, uplink grant, and explicit ACK is detected in the duration instructed to monitor the PUR SS, the UE may interpret it differently from its intended use by ignoring it or promising the base station to use it for a purpose other than its purpose. Since there is a case where the TA needs to be updated periodically depending on the application, the UE needs to monitor the PUR SS even if the PUR transmission is skipped.

When PUR transmission needs to be skipped for reasons such as that there is no UL data to be transmitted at the time of PUR transmission, an UL skipping operation may be allowed for the UE to save power. Even in this case, monitoring of the PUR SS may be necessary in the following two aspects.

a) PUR configuration update (using L1 signaling or RRC signaling)
b) DL transmission using PUR transmission window In the case of a) above, even when there is no data to be included in PUR transmission, a situation in which TA validation fails may be prevented by performing the PUR configuration update. By updating the PUR configuration, it is possible to prevent the UE from entering the legacy EDT or legacy RACH procedure for TA reacquisition.

Whether to perform monitoring of the PUR SS when the PUR transmission is skipped may be determined based on the situation of the base station/network or the type of the UE, etc., and may be indicated to the UE through higher layer signaling in the form of a 1-bit flag may be indicated. In addition, information related to whether or not monitoring of the PUR SS should be performed may be included in the PUR configuration, and a separate parameter for this may be defined. Here, since the UE skips the PUR transmission, a PUR skip event may be counted.

Meanwhile, although the UE skips the PUR transmission, in the PUR SS after the point in time when the corresponding PUR transmission should be performed, the UE may receive an instruction such as a TA update from the base station/network through a downlink channel, etc. Therefore, the PUR skip event may not be counted. In addition, the case in which the PUR skip event is not counted even though the PUR transmission is skipped may be limited to the case in which the MPDCCH is successfully received from the PUR SS.

ii) the case of performing PUR transmission

Even if the UE is configured to monitor the PUR SS after PUR transmission, if only explicit ACK is received without actual downlink assignment through downlink assignment DCI, not when receiving explicit ACK through uplink grant DCI (UL grant DCI) from the base station, the UE may be configured to stop monitoring the PUR SS. Specifically, it may be configured to stop monitoring the PUR SS for PDCCH detection until the next PUR or until a period in which the PUR SS before the next PUR is to be monitored for another purpose. Alternatively, the UE may not be required to monitor the PUR SS.

When the UE receives the explicit NACK from the base station through the uplink grant DCI, the explicit NACK may be used for the purpose of releasing the PUR or dedicated PUR. The states of uplink grant DCI and/or downlink assignment DCI that may be expected to be received from the base station after the UE performs PUR transmission are as follows.

(Uplink Grant DCI Reception)

Upon receiving an explicit ACK from the base station, the UE may recognize that the PUR transmission was successful, and in addition, may not perform the PUR parameter update.

When an explicit NACK is received from the base station, the UE may recognize that PUR transmission has failed, and in addition, may recognize that a PUR or dedicated PUR release instruction has been received.

When retransmission related information is received from the base station, the UE may recognize that the PUR transmission has failed and may perform PUR retransmission to the base station.

(Downlink Allocation DCI Reception)

Upon receiving the downlink allocation DCI including the explicit ACK information for the downlink grant from the base station, the UE may recognize that an instruction to stop monitoring of the PUR SS has been received and may stop monitoring.

The UE may receive a downlink allocation DCI on the PDCCH and transmit a PDCCH-order based PRACH. That is, the base station instructs to transmit the PRACH for TA update based on the PDCCH order.

Additionally, there may be a case in which the UE does not receive any response from the base station/network after performing PUR transmission using the current PUR resource (e.g., the n-th (#n) resource). In this case, the UE may perform the following operation.

For example, if a response is not received from the base station, the UE may recognize it as a NACK and perform PUR retransmission using the next PUR resource (e.g., #n+1 resource). PUR retransmission using the next PUR resource (e.g., #n+1 resource) may be limitedly performed when there is no new data transmitted using the next PUR resource. Meanwhile, when there is new data transmitted using the next PUR resource, the UE may transmit the new data using the next PUR resource and may not expect retransmission of the previous data.

Here, the new data may mean data different from data (i.e., previous data) included when PUR transmission is performed using the original #n resource.

As another example, if a response is not received from the base station, the UE may recognize it as a NACK and may not expect PUR retransmission in the PUR resource thereafter. This may be applied regardless of whether new data transmitted using the next PUR resource (e.g., #n+1 resource) exists. In addition, the UE may perform an additional operation such as a buffer flush on data transmitted using the current PUR resource (e.g., #n resource).

As another example, even if a response is not received from the base station, the UE may recognize it as an ACK, and may perform an additional operation such as a buffer flush on data transmitted using the current PUR resource (e.g., #n resource).

WUS (Wake-Up Signal)

In MTC and NB-IoT, WUS may be used to reduce power consumption associated with paging monitoring. The WUS is a physical layer signal indicating whether the UE performs monitoring of a paging signal (e.g., MPDCCH/NPDCCH scrambled with P-RNTI) according to a cell configuration. In the case of a UE in which eDRX is not configured (i.e., only DRX is configured), the WUS may be associated with one PO (N=1). On the other hand, in the case of a UE configured with eDRX, the WUS may be associated with one or more POs (N≥1). When the WUS is detected, the UE may monitor N POs after being associated with the WUS. On the other hand, if the WUS is not detected, the UE may maintain the sleep mode by omitting the PO monitoring until the next WUS is monitored.

Figure 27:
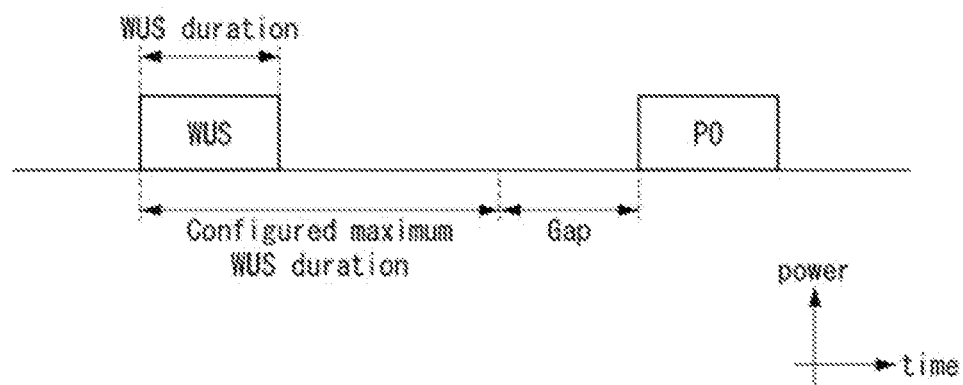
FIG. 27 is a diagram illustrating a timing relationship between a WUS and a PO, to which the present disclosure may be applied.

FIG. 27 illustrates a timing relationship between WUS and Po to which the present disclosure may be applied.

The UE may receive configuration information for WUS from the base station and monitor the WUS based on the WUS configuration information. The configuration information for WUS may include, for example, a maximum WUS duration, the number of consecutive POs associated with the WUS, gap information, and the like. The maximum WUS period indicates the maximum time period in which the WUS may be transmitted and may be expressed as a ratio with the maximum number of repetitions (e.g., Rmax) related to the PDCCH (e.g., MPDCCH, NPDCCH). The UE may expect repeated WUS transmission within the maximum WUS interval, but the actual number of WUS transmissions may be less than the maximum number of WUS transmissions within the maximum WUS interval. For example, for a UE within good coverage, the number of WUS repetitions may be small. For convenience, a resource/opportunity that WUS may be transmitted within the maximum WUS period is referred to as a WUS resource. The WUS resource may be defined as a plurality of consecutive OFDM symbols and a plurality of consecutive subcarriers. A WUS resource may be defined as a plurality of consecutive OFDM symbols and a plurality of consecutive subcarriers in a subframe or slot. For example, the WUS resource may be defined as 14 consecutive OFDM symbols and 12 consecutive subcarriers. The UE detecting the WUS does not monitor the WUS until the first PO associated with the WUS. If the WUS is not detected during the maximum WUS period, the UE does not monitor the paging signal in the POs associated with the WUS (or remains in the sleep mode).

Figure 28:
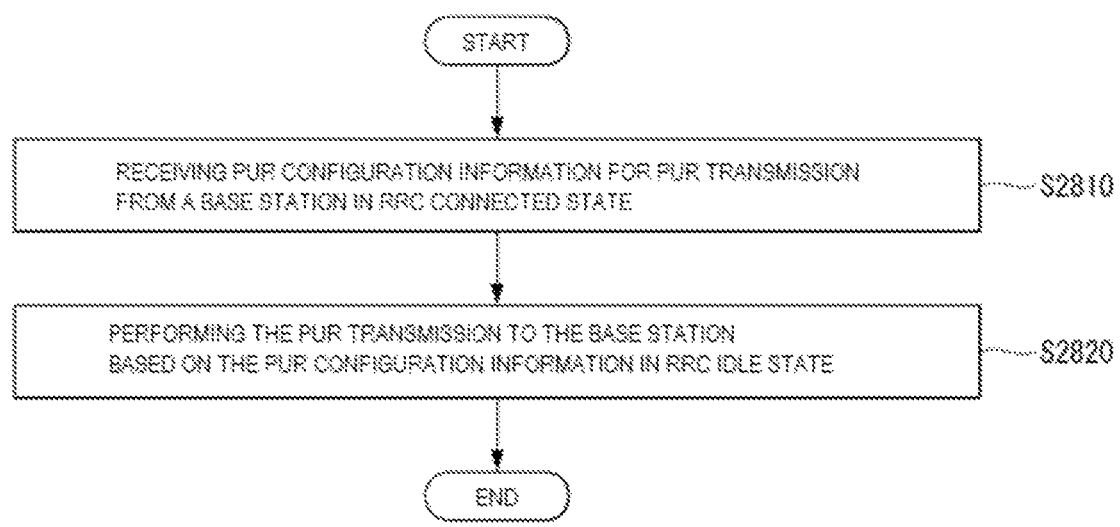
FIG. 28 is a flowchart illustrating an operation process in a UE performing PUR transmission using a preconfigured uplink resource in a wireless communication system according to an embodiment of the present disclosure.

FIG. 28 is a flowchart illustrating an embodiment of a UE operation method for performing PUR transmission using a preconfigured uplink resource (PUR) proposed in the present disclosure.

First, the UE may receive the PUR configuration information for the PUR transmission from the base station in the RRC connected state (S2810).

Then, the UE may perform the PUR transmission to the base station based on the PUR configuration information in an RRC_idle state (S2820).

Here, the PUR configuration information may include channel information for transmitting ACK or NACK for downlink feedback.

After step S2820, the UE may transmit the ACK or the NACK to the base station based on the channel information.

The channel information may be information the channel through which the ACK or the NACK is transmitted and may include repetition number of the channel.

The channel information may further include information on the format of the channel and information on the resource index value of the channel.

The channel may be a Physical Uplink Shared Channel (PUSCH) or a Physical Uplink Control Channel (PUCCH).

Transmission power for transmitting the ACK or NACK to the base station may be reset and determined regardless of a transmit power control (TPC) accumulation value.

The PUR configuration information may include at least one of information on the resource for the PUR transmission, information on the transmission period of the PUR configuration information, information related to transport block size (TBS), information related to modulation coding scheme (MCS).

Figure 30:
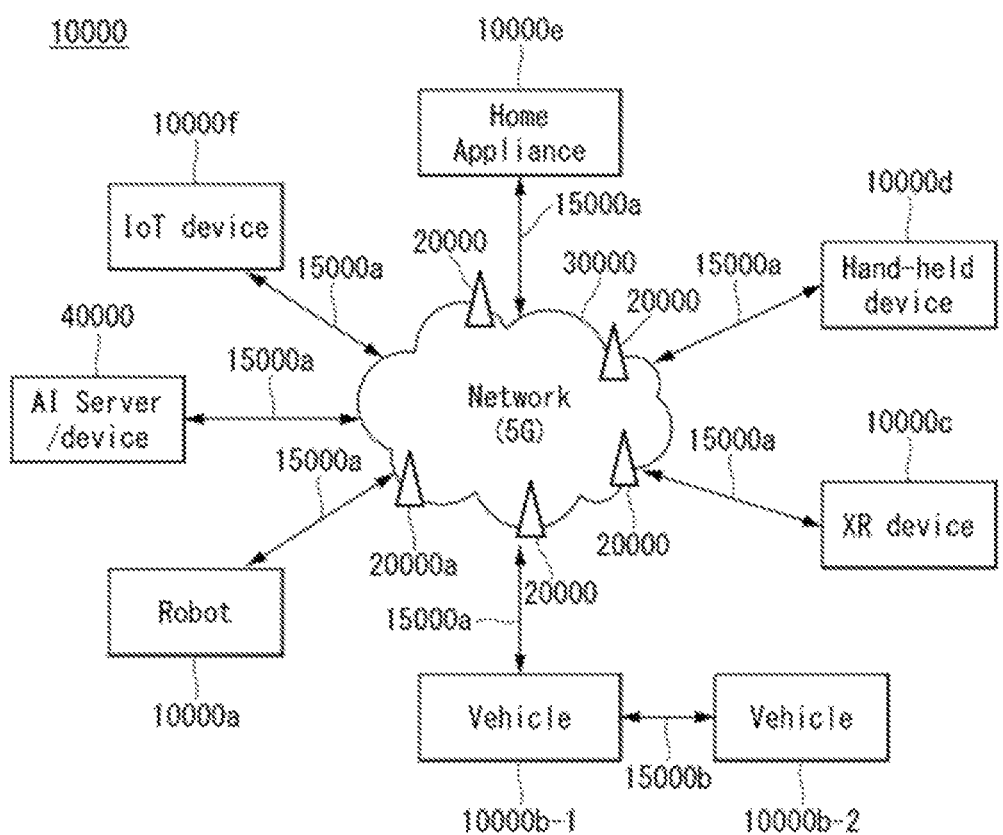
FIG. 30 is a diagram illustrating an embodiment of a wireless communication system to which the methods proposed in the present disclosure may be applied.
Figure 31:
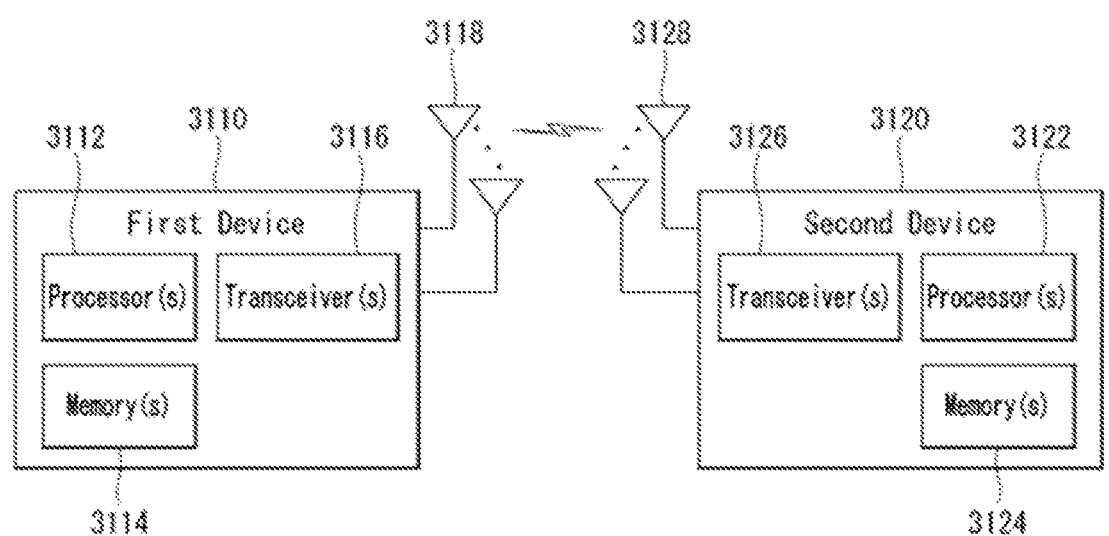
FIG. 31 is a diagram illustrating an embodiment of a wireless apparatus to which the methods proposed in the present disclosure may be applied.
Figure 32:
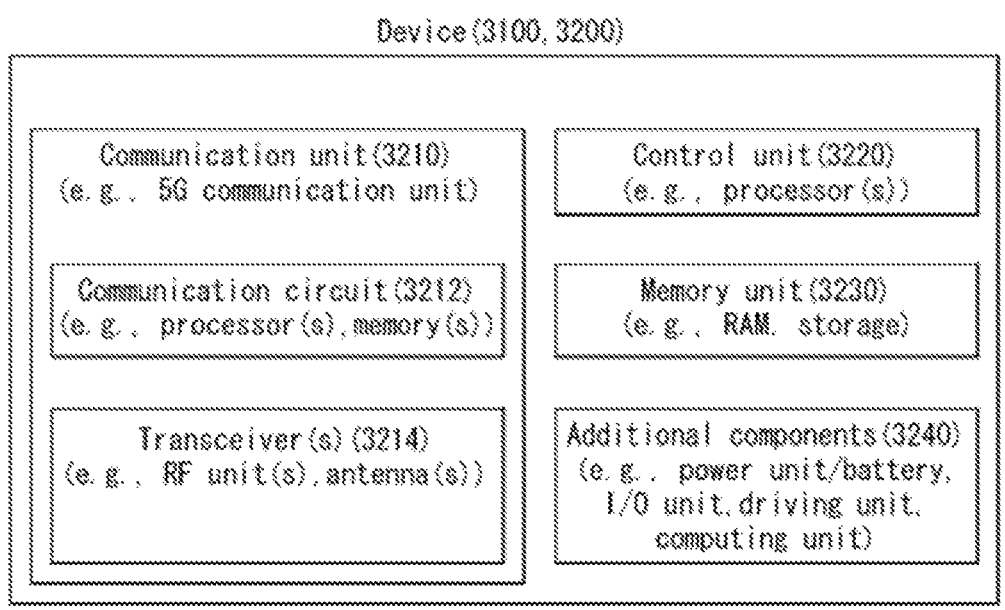
FIG. 32 is a diagram illustrating an embodiment of a wireless apparatus to which the methods proposed in the present disclosure may be applied.

Referring to FIGS. 30 to 32, the UE performing PUR transmission using preconfigured uplink resource in a wireless communication system proposed in the present disclosure will be described.

Here, the UE may be configured to include one or more transceivers for transmitting and receiving a radio signal, one or more processors operatively coupled to the transceivers, one or more memories storing instructions for operations executed by the one or more processors and coupled to the one or more processors.

Here, the operations executed by the one or more processors may be the same as the operations related to the FIG. 28 described above.

Figure 29:
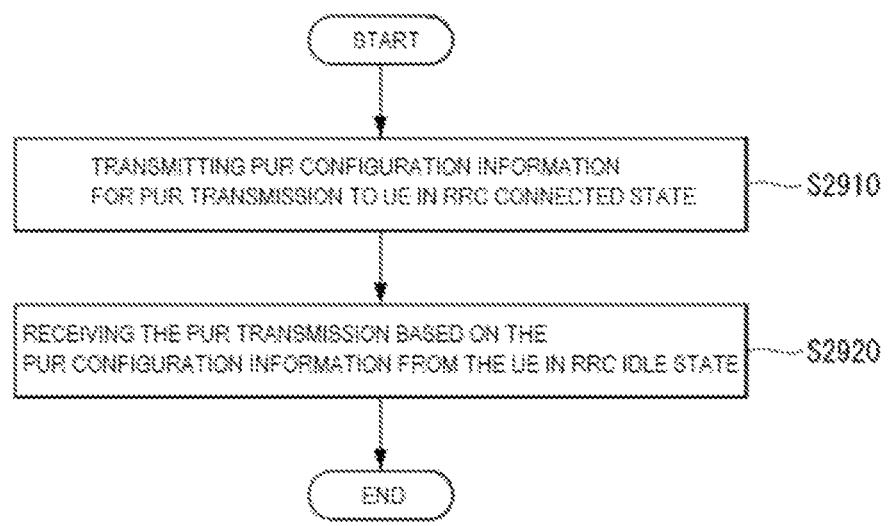
FIG. 29 is a flowchart illustrating an operation process in a base station performing PUR transmission using a preconfigured uplink resource in a wireless communication system according to an embodiment of the present disclosure.

FIG. 29 is a flowchart illustrating an embodiment of a method of operating a base station for receiving PUR transmission using a preset uplink resource (PUR) in a wireless communication system proposed in the present disclosure.

First, the base station transmits PUR configuration information for PUR transmission to the UE in RRC_connected state.

The base station receives the PUR transmission based on the PUR configuration information from the UE in RRC_idle state.

Here, the PUR configuration information may include the channel information for transmitting ACK or NACK for downlink feedback.

Referring to FIGS. 30 to 32, a base station receiving PUR transmission using a preconfigured uplink resource (PUR) in a wireless communication system proposed in the present disclosure will be described.

Here, the base station may be configured to include one or more transceivers for transmitting and receiving a radio signal, one or more processors operatively coupled to the transceivers, one or more memories storing instructions for operations executed by the one or more processors and coupled to the one or more processors.

Here, the operations executed by the one or more processors may be the same as the operations related to the FIG. 29.

The UE/base station described in the present disclosure may be replaced with various apparatus as shown in FIGS. 30 to 32.

For example, the operation of performing PUR transmission and receiving PUR transmission using a preconfigured uplink resource (PUR) in the wireless communication system of the UE/base station described in FIGS. 28 and 29 may be implemented by the apparatus of FIGS. 31 to 32. For example, referring to FIG. 31, one or more processors 3112, 3122 may control one or more memories 3114, 3124 and/or one or more transceivers 3116, 3126, etc., to receive related information. In addition, one or more transceivers 3116 and 3126 may transmit related information.

Operations related to a method of performing/receiving PUR transmission using a preconfigured uplink resource (PUR) in the wireless communication system of the UE/base station described above may be implemented by apparatus to be described later (e.g., FIGS. 30 to 32). For example, operations related to the above-described method of performing uplink transmission/reception through PUR may be processed by one or more processors 3112 and 3122 of FIGS. 30 to 32, and the operation related to the method of performing transmission/reception of uplink through the PUR may be stored in the memory 3114 and 3124 in the form of an instruction/program (e.g., instruction, executable code) for driving at least one processor 3112 and 3122 of FIGS. 30 to 32.

For example, in apparatus comprising one or more memories and one or more processors operatively coupled to the one or more memories, the one or more processors may receive, from the base station, PUR configuration information for the apparatus to perform PUR transmission using a preconfigured uplink resource (PUR) in an RRC connected state, perform the PUR transmission to the base station based on the PUR configuration information in an RRC idle state, receive feedback information for the PUR transmission from the base station, and transmit ACK/NACK information for the feedback information to the base station, wherein the PUR configuration information may be configured to include information on a channel through which the ACK/NACK information may be transmitted.

As another example, in a non-transitory computer readable medium (CRM) storing one or more instructions, the one or more instructions executable by one or more processors may allow the UE to receive PUR configuration information for performing PUR transmission using a preconfigured uplink resource (PUR) from a base station, transmit the PUR to the base station based on the PUR configuration information in an RRC idle state, receive feedback information for the PUR transmission from the base station, and transmit ACK/NACK information for the feedback information to the base station, and the PUR configuration information to include information on a channel through which the ACK/NACK information is transmitted.

Communication System Example to which the Present Disclosure May be Applied

It is not limited thereto, various descriptions, functions, procedures, proposals, methods, and/or operation flowcharts of the present disclosure disclosed in this document may be applied to various fields requiring wireless communication/connection (e.g., 5G, LTE) between devices.

Hereinafter, it will be described in more detail with reference to the drawings. In the following drawings/descriptions, the same reference numerals may represent the same or corresponding hardware blocks, software blocks, or functional blocks, unless otherwise indicated.

FIG. 30 illustrates a communication system 10000 to which the present disclosure is applied.

Referring to FIG. 30, a communication system 10000 applied to the present disclosure includes a wireless device, a base station, and a network. Here, the wireless device means a device that performs communication using a wireless access technology (e.g., 5G NR (New RAT), LTE (Long Term Evolution)), and may be referred to as a communication/wireless/5G device. Although not limited thereto, the wireless device may include robots 10000a, vehicles 10000b-1 and 10000b-2, an extended reality (XR) device 10000c, a hand-held device 10000d, and a home appliance 10000e. an Internet of Thing (IoT) device 10000f, and an AI device/server 40000. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). The XR device includes AR (Augmented Reality)/VR (Virtual Reality)/MR (Mixed Reality) devices, and it may be implemented in the form of a HMD (Head-Mounted Device), a HUD (Head-Up Display) in a vehicle, a TV, a smartphone, a computer, a wearable device, a home appliance, a digital signage, a vehicle, a robot, and the like. The hand-held device may include a smart phone, a smart pad, a wearable device (e.g., a smart watch, a smart glass), a computer (e.g., a notebook computer, etc.). The home appliance may include a TV, a refrigerator, a washing machine, and the like. The IoT device may include a sensor, a smart meter, and the like. For example, the base station and the network may be implemented as a wireless device, and the specific wireless device 20000a may operate as a base station/network node to other wireless devices.

The wireless devices 10000a to 10000f may be connected to the network 30000 through the base station 20000. AI (Artificial Intelligence) technology may be applied to the wireless devices 10000a to 10000f, and the wireless devices 10000a to 10000f may be connected to the AI server 40000 through the network 30000. The network 30000 may be configured using a 3G network, a 4G (e.g., LTE) network, or a 5G (e.g., NR) network, and the like. The wireless devices 10000a to 10000f may communicate with each other through the base station 20000/network 30000, but may communicate directly (e.g., sidelink communication) without passing through the base station/network. For example, the vehicles 10000b-1 and 10000b-2 may perform direct communication (e.g., V2V (Vehicle to Vehicle)/V2X (Vehicle to everything) communication). In addition, the IoT device (e.g., sensor) may directly communicate with other IoT devices (e.g., sensors) or other wireless devices 10000a to 10000f.

Wireless communication/connections 15000a, 15000b, and 15000c may be established between the wireless devices 10000a to 10000f/base station 20000 and the base station 20000/base station 20000. Here, wireless communication/connection may be achieved through various wireless access technologies (e.g., 5G NR) such as uplink/downlink communication 15000a, sidelink communication 15000b (or D2D communication), base station communication 15000c (e.g., relay, Integrated Access Backhaul (IAB)). Through wireless communication/connections 15000a, 15000b, 15000c, the wireless device and the base station/wireless device, and the base station and the base station can transmit/receive radio signals to each other. For example, the wireless communication/connection 15000a, 15000b, 15000c may transmit/receive signals through various physical channels. To this end, based on various proposals of the present disclosure, for transmitting/receiving radio signals, at least some of a process of configuring various configuration information, various signal processing processes (e.g., channel encoding/decoding, modulation/demodulation, resource mapping/demapping, etc.), and resource allocation process may be performed.

Examples of Wireless Devices to which the Present Disclosure May be Applied

FIG. 31 illustrates wireless devices to which the present disclosure may be applied.

Referring to FIG. 31, the first wireless device 3110 and the second wireless device 3120 may transmit/receive wireless signals through various wireless access technologies (e.g., LTE, NR). Here, {first wireless device 3110, second wireless device 3120} may correspond {wireless device 10000x, base station 20000} of FIG. 30 and/or {wireless device 10000x, wireless device 10000x}

The first wireless device 3110 may include one or more processors 3112 and one or more memories 3114 and may further include one or more transceivers 3116 and/or one or more antennas 3118. The processor 3112 may control the memory 3114 and/or the transceiver 3116 and may be configured to implement the descriptions, functions, procedures, suggestions, methods, and/or operational flowcharts disclosed herein. For example, the processor 3112 may process information in the memory 3114 to generate the first information/signal, and then transmit a wireless signal including the first information/signal through the transceiver 3116. In addition, the processor 3112 may receive the radio signal including the second information/signal through the transceiver 3116, and then store information obtained from signal processing of the second information/signal in the memory 3114. The memory 3114 may be connected to the processor 3112 and store various information related to the operation of the processor 3112. For example, the memory 3114 may store software code including instructions for performing some or all of the processes controlled by the processor 3112 or for performing the descriptions, functions, procedures, suggestions, methods, and/or operational flowcharts disclosed herein. Here, the processor 3112 and the memory 3114 may be part of a communication modem/circuit/chip designed to implement a wireless communication technology (e.g., LTE, NR). The transceiver 3116 may be coupled to the processor 3112 and may transmit and/or receive wireless signals via one or more antennas 3118. The transceiver 3116 may include a transmitter and/or a receiver. The transceiver 3116 may be used interchangeably with a radio frequency (RF) unit. In the present disclosure, a wireless device may refer to a communication modem/circuit/chip.

The second wireless device 3120 may include one or more processors 3122, one or more memories 3124, and may further include one or more transceivers 3126 and/or one or more antennas 3128. The processor 3122 may control the memory 3124 and/or the transceiver 3126 and may be configured to implement the descriptions, functions, procedures, suggestions, methods, and/or operational flowcharts disclosed herein. For example, the processor 3122 may process information in the memory 3124 to generate third information/signal, and then transmit a wireless signal including the third information/signal through the transceiver 3126. In addition, the processor 3122 may receive the radio signal including the fourth information/signal through the transceiver 3126 and then store information obtained from signal processing of the fourth information/signal in the memory 3124. The memory 3124 may be connected to the processor 3122 and store various information related to the operation of the processor 3122. For example, memory 3124 may store software code including instructions for performing some or all of the processes controlled by processor 3122 or for performing descriptions, functions, procedures, suggestions, methods, and/or operational flowcharts disclosed herein. Here, the processor 3122 and the memory 3124 may be a part of a communication modem/circuit/chip designed to implement a wireless communication technology (e.g., LTE, NR). The transceiver 3126 may be coupled to the processor 3122 and may transmit and/or receive wireless signals via one or more antennas 3128. The transceiver 3126 may include a transmitter and/or a receiver. Transceiver 3126 may be used interchangeably with an RF unit. In the present invention, a wireless device may refer to a communication modem/circuit/chip.

Hereinafter, hardware elements of the wireless devices 3110 and 3120 will be described in more detail. Although not limited thereto, one or more protocol layers may be implemented by one or more processors 3112,3122. For example, one or more processors 3112,3122 may implement one or more layers (e.g., functional layers such as PHY, MAC, RLC, PDCP, RRC, SDAP). The one or more processors 31112,3122 may create one or more protocol data unit (PDU) or/and one or more service data unit (SDU) according to the descriptions, functions, procedures, proposals, methods and/or operational flowcharts disclosed herein. One or more processors 3112, 3122 may generate messages, control information, data, or information according to the description, function, procedure, proposal, method, and/or flow charts disclosed herein. The one or more processors 3112 and 3122 may generate a signal (e.g., a baseband signal) including PDUs, SDUs, messages, control information, data, or information according to the functions, procedures, proposals and/or methods disclosed in this document and provide them to one or more transceivers 3116 and 3126. One or more processors 3112, 3122 may receive signals (e.g., baseband signals) from one or more transceivers 3116 3126, and obtain PDU, SDU, message, control information data, and information according to the descriptions, functions, procedures, proposals, methods and/or flowcharts of operation.

The one or more processors 3112 and 3122 may be referred to as a controller, microcontroller, microprocessor, or microcomputer. The one or more processors 3112 and 3122 may be implemented by hardware, firmware, software, or a combination thereof. For example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in one or more processors 3112 and 3122. The descriptions, functions, procedures, suggestions, methods, and/or flowcharts of operations disclosed herein may be implemented using firmware or software, which may be implemented to include modules, procedures, functions, etc. Firmware or software configured to perform the descriptions, functions, procedures, proposals, methods, and/or flow charts disclosed herein may be included in one or more processors 3112, 3122, or stored in one or more memories 3114, 3124 and may be driven by the above processors 3112 and 3122. The descriptions, functions, procedures, proposals, methods, and/or flow charts disclosed herein may be implemented using firmware or software in the form of code, instructions, and/or sets of instructions.

One or more memories 3114 and 3124 may be coupled to one or more processors 3112 and 3122 and may store various types of data, signals, messages, information, programs, codes, instructions, and/or instructions. The one or more memories 3114 and 3124 may be comprised of ROM, RAM, EPROM, flash memory, hard drives, registers, cache memory, computer readable storage media, and/or combinations thereof. One or more memories 3114, 3124 may be located inside and/or external to one or more processors 3112, 3122. Also, the one or more memories 3114 and 3124 may be connected to the one or more processors 3112 and 3122 through various technologies such as wired or wireless connections.

The one or more transceivers 3116, 3126 may transmit user data, control information, radio signals/channels, etc. referred to in the methods and/or operation flowcharts of this document to one or more other devices. One or more transceivers 3116, 3126 may receive user data, control information, radio signals/channels, etc. referred to in the descriptions, functions, procedures, suggestions, methods, and/or flow charts, etc. disclosed herein from one or more other devices. For example, one or more transceivers 3116 and 3126 may be connected to one or more processors 3112 and 3122 and may transmit and receive wireless signals. For example, one or more processors 3112, 3122 may control one or more transceivers 3116, 3126 to transmit user data, control information, or wireless signals to one or more other devices. In addition, one or more processors 3112, 3122 may control one or more transceivers 3116, 3126 to receive user data, control information, or radio signals from one or more other devices. Further, one or more transceivers 3116, 3126 may be coupled with one or more antennas 3118, 3128, and the one or more transceivers 3116 and 3126 may be configured to transmit and receive user data, control information, radio signals/channels, etc. mentioned in the descriptions, functions, procedures, proposals, methods, and/or operation flowcharts disclosed in this document via the one or more antennas 3118, 3128. In this document, one or more antennas may be a plurality of physical antennas or a plurality of logical antennas (e.g., antenna ports). The one or more transceivers 3116 and 3126 may convert the received radio signal/channel, etc. from the RF band signal into a baseband signal to process the received user data, control information, radio signal/channel, etc. using the one or more processors 3112, 3122. The one or more transceivers 3116 and 3126 may convert user data, control information, radio signals/channels, etc. processed using the one or more processors 3112 and 3122 from a baseband signal to an RF band signal. To this end, one or more transceivers 3116, 3126 may include (analog) oscillators and/or filters.

Examples of Application of Wireless Devices to which the Present Disclosure May be Applied FIG. 32 illustrates another example of a wireless device to which the present disclosure may be applied. The wireless device may be implemented in various forms according to use-examples/services.

Referring to FIG. 32, the wireless devices 3100 and 3200 correspond to the wireless devices 3110 and 3120 of FIG. 31, and may be composed of various elements, components, units/units, and/or modules. For example, the wireless devices 3110 and 3120 may include a communication unit 3210, a control unit 3220, a memory unit 3230, and an additional element 3240. The communication unit may include communication circuitry 3212 and transceiver(s) 3214. For example, communication circuitry 3212 may include one or more processors 3112 and 3122 and/or one or more memories 3114 and 3124 of FIG. 31. For example, the transceiver(s) 3214 may include one or more transceivers 3116, 3126 and/or one or more antennas 3118, 3128 of FIG. 31. The control unit 3220 may be electrically connected to the communication unit 3210, the memory unit 3230, and the additional element 3240, and may control general operations of the wireless device. For example, the controller 3220 may control the electrical/mechanical operation of the wireless device based on the program/code/command/information stored in the memory unit 3230. In addition, the control unit 3220 may transmit the information stored in the memory unit 3230 to the outside (e.g., another communication device) through the communication unit 3210 and through a wireless/wired interface or may store information received from outside (e.g., another communication device) through the communication unit 3210 and through a wireless/wired interface) in the memory unit 3230.

The additional element 3240 may be variously configured according to the type of the wireless device. For example, the additional element 3240 may include at least one of a power unit/battery, an input/output unit (I/O unit), a driving unit, and a computing unit. Although not limited thereto, a wireless device may be implemented in the form of a robot (FIG. 30, 10000*a*), a vehicle (FIG. 30, 10000*b*-1, 10000*b*-2), an XR device (FIG. 30, 10000*c*), a mobile device (FIG. 30, 10000*d*), a home appliance (FIG. 30, 10000*e*), IoT device (FIG. 30, 10000*f*), digital broadcasting terminal, hologram device, public safety device, MTC device, medical device, fintech device (or financial device), security device, climate/environment device, an AI server/device (FIGS. 30 and 40000), a base station (FIGS. 30 and 20000), and a network node. The wireless device may be mobile or used in a fixed location depending on the use-example/service.

In FIG. 32, various elements, components, units/units, and/or modules in the wireless devices 3100 and 3200 may be entirely interconnected through a wired interface, or at least some of them may be wirelessly connected through the communication unit 3210. For example, in the wireless devices 3100 and 3200, the control unit 3220 and the communication unit 3210 are connected by wire, and the control unit 3220 and the first unit (e.g., 3230, 3240) may be connected wirelessly through the communication unit 3210. In addition, each element, component, unit/unit, and/or module in the wireless device 3100, 3200 may further include one or more elements. For example, the controller 3220 may include one or more processor sets. For example, the control unit 3220 may include a set of a communication control processor, an application processor, an electronic control unit (ECU), a graphic processing processor, a memory control processor, and the like. As another example, the memory unit 3230 may include random access memory (RAM), dynamic RAM (DRAM), read only memory (ROM), flash memory, volatile memory, and non-volatile memory, volatile memory, and/or a combination thereof.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present disclosure by coupling a part of the elements and/or technical features. The order of operations described in the embodiments of the present disclosure may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present disclosure may be implemented by various means, for example, hardware, firmware, software and the combination thereof. In the case of the hardware, an embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present disclosure may be implemented in a form such as a module, a procedure, a function, and so on that performs the functions or operations described so far. Software codes may be stored in the memory and driven by the processor. The memory may be located interior or exterior to the processor and may exchange data with the processor with various known means.

It will be understood to those skilled in the art that various modifications and variations can be made without departing from the essential features of the disclosure. Therefore, the detailed description is not limited to the embodiments described above but should be considered as examples. The scope of the present disclosure should be determined by reasonable interpretation of the attached claims, and all modification within the scope of equivalence should be included in the scope of the present disclosure.

The present disclosure has been described mainly with the example applied to 3GPP LTE/LTE-A/NR system, but may also be applied to various wireless communication systems except the 3GPP LTE/LTE-A/NR system.

What is claimed is:

1. A method of performing preconfigured uplink resource (PUR) transmission using a PUR by a user equipment (UE) in a wireless communication system, the method comprising:
   receiving, from a base station, PUR configuration information for the PUR transmission in a Radio Resource Control (RRC) connected state; and
   performing the PUR transmission to the base station based on the PUR configuration information in an RRC idle state,
   wherein the PUR configuration information includes channel information for an acknowledgement (ACK) or negative-acknowledgement (NACK) transmission from the UE to the base station,
   wherein the ACK or NACK transmission is in response to a downlink feedback for the PUR transmission, and the downlink feedback is transmitted from the base station to the UE, and
   wherein the downlink feedback corresponds to an uplink transmission using a previous preconfigured uplink resource for the PUR configuration.

2. The method of claim 1, further comprising:
   transmitting, to the base station, the ACK or NACK based on the channel information.

3. The method of claim 1, wherein:
   the channel information is information regarding a channel through which the ACK or NACK is transmitted, and
   the channel information includes information regarding a number of repetition of a transmission of the channel.

4. The method of claim 3, wherein:
   the channel information further includes information on a format of the channel and information on a resource index value of the channel.

5. The method of claim 3, wherein:
   the channel is a Physical Uplink Shared Channel (PUSCH) or a Physical Uplink Control Channel (PUCCH).

6. The method of claim 1, wherein:
   a transmission power for transmitting the ACK or NACK to the base station is determined by resetting regardless of a transmit power control (TPC) accumulation value.

7. The method of claim 1, wherein:
   the PUR configuration information includes at least one of information on a resource for the PUR transmission, information on a transmission period of the PUR transmission, information related to a transport block size (TBS) for the PUR transmission, or information related to a modulation coding scheme (MCS) for the PUR transmission.

8. A user equipment (UE) configured to perform preconfigured uplink resource (PUR) transmission using a PUR in a wireless communication system, the UE comprising:
   at least one transceiver;
   at least one processor; and
   at least one memory for storing instructions for operations executed by the at least one processor and coupled to the at least one processor,
   wherein the operations comprise:
   receiving, from a base station, PUR configuration information for the PUR transmission in a Radio Resource Control (RRC) connected state; and
   performing the PUR transmission to the base station based on the PUR configuration information in an RRC idle state; and
   wherein the PUR configuration information includes channel information for an acknowledgement (ACK) or negative-acknowledgement (NACK) transmission from the UE to the base station,
   wherein the ACK or NACK transmission is in response to a downlink feedback for the PUR transmission, and the downlink feedback is transmitted from the base station to the UE, and
   wherein the downlink feedback corresponds to an uplink transmission using a previous preconfigured uplink resource for the PUR configuration.

9. The UE of claim 8, wherein the operations further comprise:
   transmitting, to the base station, the ACK or NACK based on the channel information.

10. The UE of claim 8, wherein:
    the channel information is information regarding a channel through which the ACK or NACK is transmitted, and
    the channel information includes information regarding a number of repetition of a transmission of the channel.

11. The UE of claim 8, wherein:
    a transmission power for transmitting the ACK or the NACK to the base station is determined by resetting regardless of a transmit power control (TPC) accumulation value.

12. A method of receiving preconfigured uplink resource (PUR) transmission using a PUR by a base station in a wireless communication system, the method comprising:
    transmitting, to a user equipment (UE), PUR configuration information for the PUR transmission in a Radio Resource Control (RRC) connected state; and
    receiving, from the UE, the PUR transmission based on the PUR configuration information in an RRC idle state,
    wherein the PUR configuration information includes channel information for an acknowledgement (ACK) or negative-acknowledgement (NACK) transmission from the UE to the base station, wherein the ACK or NACK transmission is in response to a downlink feedback for the PUR transmission, and the downlink feedback is transmitted from the base station to the UE, and wherein the downlink feedback corresponds to an uplink transmission using a previous preconfigured uplink resource for the PUR configuration.

13. A base station configured to receive preconfigured uplink resource (PUR) transmission using a PUR in a wireless communication system, the base station comprising:

at least one transceiver;
at least one processor; and
at least one memory for storing instructions for operations executed by the at least one processor and coupled to the at least one processor,
wherein the operations comprise:
transmitting, to a user equipment (UE), PUR configuration information for the PUR transmission in a Radio Resource Control (RRC) connected state; and
receiving, from the UE, the PUR transmission based on the PUR configuration information in an RRC idle state; and
wherein the PUR configuration information includes channel information for an acknowledgement (ACK) or negative-acknowledgement (NACK) transmission from the UE to the base station,
wherein the ACK or NACK transmission is in response to a downlink feedback for the PUR transmission, and the downlink feedback is transmitted from the base station to the UE, and
wherein the downlink feedback corresponds to an uplink transmission using a previous preconfigured uplink resource for the PUR configuration.

14. An apparatus comprising at least one memory and at least one processor operatively coupled to the at least one memory,
wherein the at least one processor is configured to:
receive, from a base station, preconfigured uplink resource (PUR) configuration information for performing PUR transmission using a PUR in a Radio Resource Control (RRC) connected state; and
perform the PUR transmission to the base station based on the PUR configuration information in an RRC idle state,
wherein the PUR configuration information includes channel information for an acknowledgement (ACK) or negative-acknowledgement (NACK) transmission from the apparatus to the base station,
wherein the ACK or NACK transmission is in response to a downlink feedback for the PUR transmission, and the downlink feedback is transmitted from the base station to the apparatus, and
wherein the downlink feedback corresponds to an uplink transmission using a previous preconfigured uplink resource for the PUR configuration.

15. At least one non-transitory computer-readable medium storing at least one instruction, the at least one instruction executable by at least one processor comprising:
receiving, from a base station, preconfigured uplink resource (PUR) configuration information for performing PUR transmission using a PUR in a Radio Resource Control (RRC) connected state; and
performing the PUR transmission to the base station based on the PUR configuration information in an RRC idle state; and
wherein the PUR configuration information includes channel information for an acknowledgement (ACK) or negative-acknowledgement (NACK) transmission to the base station,
wherein the ACK or NACK transmission is in response to a downlink feedback for the PUR transmission, and the downlink feedback is transmitted from the base station, and
wherein the downlink feedback corresponds to an uplink transmission using a previous preconfigured uplink resource for the PUR configuration.

\* \* \* \* \*